(12) United States Patent
Chen et al.

(10) Patent No.: US 10,756,873 B2
(45) Date of Patent: Aug. 25, 2020

(54) CHANNEL QUALITY REPORT PROCESSES, CIRCUITS AND SYSTEMS

(71) Applicant: TEXAS INSTRUMENTS INCORPORATED, Dallas, TX (US)

(72) Inventors: Runhua Chen, Plano, TX (US); Eko Nugroho Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/792,940

(22) Filed: Jul. 7, 2015

(65) Prior Publication Data

US 2015/0312015 A1 Oct. 29, 2015

Related U.S. Application Data

(63) Continuation of application No. 14/181,942, filed on Feb. 17, 2014, now Pat. No. 9,094,172, which is a
(Continued)

(51) Int. Cl.
*H04L 5/00* (2006.01)
*H04L 1/00* (2006.01)
(Continued)

(52) U.S. Cl.
CPC ......... *H04L 5/0057* (2013.01); *H04B 7/0639* (2013.01); *H04B 17/24* (2015.01);
(Continued)

(58) Field of Classification Search
None
See application file for complete search history.

(56) References Cited

U.S. PATENT DOCUMENTS

| 8,094,733 B2 * | 1/2012 | Kwon | H04B 7/0689 |
| | | | 375/259 |
| 9,094,172 B2 * | 7/2015 | Chen | H04L 1/0026 |

(Continued)

FOREIGN PATENT DOCUMENTS

| EP | 1575234 | 9/2005 |
| EP | 1750407 | 2/2007 |
| WO | 2007112371 | 4/2007 |

OTHER PUBLICATIONS

LG Electronics, "CQI overhead reduction for MIMO in spatial domain"; 3GPP TSG RAN WG1 #48bis; R1-071544; Mar. 26-30, 2007; pp. 1-4.*

(Continued)

*Primary Examiner* — Robert C Scheibel
(74) *Attorney, Agent, or Firm* — Gregory J. Albin; Charles A. Brill; Frank D. Cimino

(57) ABSTRACT

An electronic device includes a first circuit (111) operable to generate at least a first and a second channel quality indicator (CQI) vector associated with a plurality of subbands for each of at least first and second spatial codewords respectively and generate a first and a second reference CQI for the first and second spatial codewords, and operable to generate a first and a second differential subbands CQI vector for each spatial codeword and generate a differential between the second reference CQI and the first reference CQI, and further operable to form a CQI report derived from the first and the second differential subbands CQI vector for each spatial codeword as well as the differential between the second reference CQI and the first reference CQI; and a second circuit (113) operable to initiate transmission of a signal communicating the CQI report. Other electronic devices, processes and systems are also disclosed.

6 Claims, 27 Drawing Sheets

Related U.S. Application Data continuation of application No. 12/327,463, filed on Dec. 3, 2008, now Pat. No. 8,699,602, and a continuation-in-part of application No. 12/188,767, filed on Aug. 8, 2008, now Pat. No. 8,179,775, and a continuation-in-part of application No. 12/254,738, filed on Oct. 20, 2008, now Pat. No. 8,942,164.

(60) Provisional application No. 61/013,380, filed on Dec. 13, 2007, provisional application No. 61/019,802, filed on Jan. 8, 2008.

(51) Int. Cl.
*H04L 25/03* (2006.01)
*H04B 17/24* (2015.01)
*H04B 7/06* (2006.01)
*H04L 25/02* (2006.01)

(52) U.S. Cl.
CPC .......... *H04L 1/0026* (2013.01); *H04L 1/0029* (2013.01); *H04L 5/0023* (2013.01); *H04L 5/0048* (2013.01); *H04L 25/03343* (2013.01); *H04L 25/0228* (2013.01); *H04L 2025/03808* (2013.01)

(56) References Cited

U.S. PATENT DOCUMENTS

| | | |
|---|---|---|
| 2004/0141466 A1 | 7/2004 | Kim et al. |
| 2005/0201295 A1 | 9/2005 | Kim et al. |
| 2006/0223449 A1 | 10/2006 | Sampath et al. |
| 2006/0233127 A1 | 10/2006 | Derryberry et al. |
| 2007/0026808 A1 | 2/2007 | Love et al. |
| 2007/0242770 A1 | 10/2007 | Kim et al. |
| 2008/0013610 A1 | 1/2008 | Varadarajan et al. |
| 2008/0043867 A1 | 2/2008 | Blanz et al. |
| 2008/0080641 A1* | 4/2008 | Kim ............... H04B 7/0632 375/299 |
| 2008/0165875 A1* | 7/2008 | Mundarath ......... H04B 7/0417 375/262 |
| 2008/0170523 A1 | 7/2008 | Han et al. |
| 2008/0207135 A1* | 8/2008 | Varadarajan ......... H04L 1/0029 455/69 |
| 2008/0273624 A1 | 11/2008 | Kent et al. |
| 2008/0305745 A1* | 12/2008 | Zhang ................ H04L 1/0026 455/67.11 |
| 2009/0060010 A1* | 3/2009 | Maheshwari ........ H04L 1/0029 375/211 |
| 2009/0109909 A1 | 4/2009 | Onggosanusi et al. |
| 2009/0116570 A1* | 5/2009 | Bala ................. H04L 1/0026 375/260 |
| 2009/0141648 A1 | 6/2009 | Imamura et al. |
| 2009/0262653 A1 | 10/2009 | Toda et al. |
| 2010/0110982 A1* | 5/2010 | Roh .................. H04B 7/0417 370/328 |
| 2011/0080968 A1* | 4/2011 | Seo ................. H04B 7/0417 375/267 |
| 2012/0051248 A1* | 3/2012 | Roh .................. H04B 7/0417 370/252 |

OTHER PUBLICATIONS

LG Electronics; "Spatial delta CQI in SU-MIMO"; 3GPP TSG RAN WG1 #50bis; R1-074213; Oct. 8-12, 2007; pp. 1-7.*
Roh, et al., "Efficient Methods of Reporting CQIs in MIMO Systems", Feb. 5, 2007, pp. 1-22.

* cited by examiner

CW1: SELECTED SUB-BANDS - FEEDBACK $CQI_{1,best-m}$

CW1: UNSELECTED SUB-BANDS - FEEDBACK $CQI_{1,wh}$

CW2: SELECTED SUB-BANDS - FEEDBACK $f_{diff}(CQI_{2,best-m}, CQI_{1,best-m})$

CW2: UNSELECTED SUB-BANDS - FEEDBACK $f_{diff}(CQI_{2,wb}, CQI_{1,wb})$

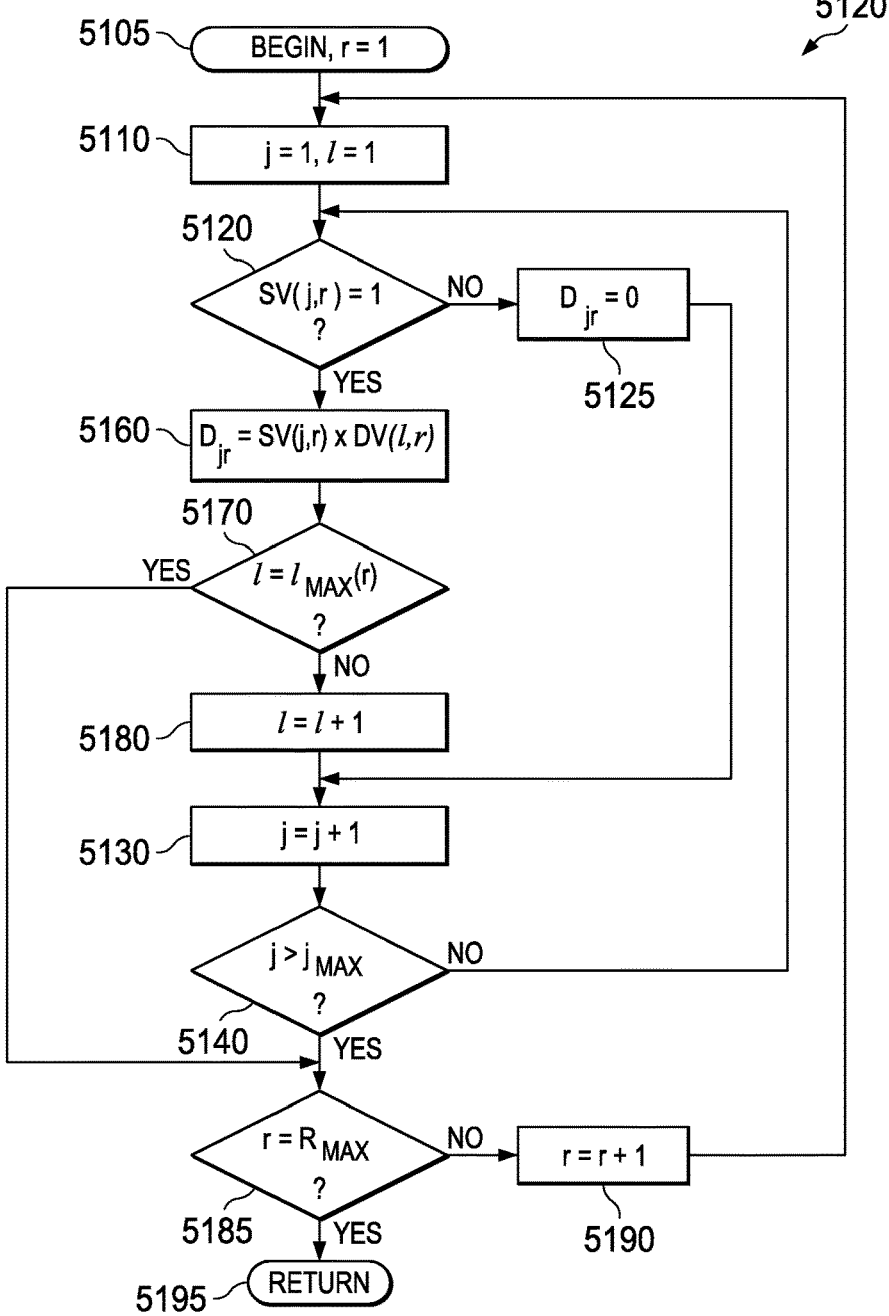
FIG. 43
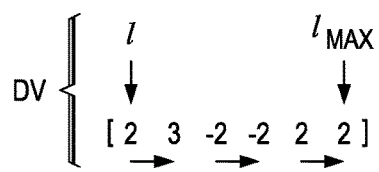

US 10,756,873 B2

CHANNEL QUALITY REPORT PROCESSES, CIRCUITS AND SYSTEMS

CROSS-REFERENCES TO RELATED APPLICATIONS

This application is a Continuation of application Ser. No. 14/181,942 filed Feb. 14, 2014, which is a Continuation of application Ser. No. 12/327,463 filed Dec. 3, 2008, now U.S. Pat. No, 8,699,602, which claims the benefit under 35 U.S.C. 119(e) of U.S. Provisional Application No, 61/013,380 entitled "CQI Feedback for MIMO-OFDMA Systems" filed on Dec. 13, 2007, and which is incorporated herein by reference in its entirety.

This application is a Continuation of application Ser. No. 14/181,942 filed Feb. 14, 2014, which is a Continuation of application Ser. No. 12/327,463 filed Dec. 3, 2008, now U.S. Pat. No. 8,699,602, which claims the benefit under 35 U.S.C. 119(e) of U.S. Provisional Application No. 61/019,802 entitled "CQI Feedback for MIMO-OFDMA Systems (update)" filed on Jan. 8, 2008, and which is incorporated herein by reference in its entirety.

This application is a Continuation of application Ser. No. 14/181,942 filed Feb. 14, 2014, which is a Continuation of application Ser. No. 12/327,463 filed Dec. 3, 2008, now U.S. Pat. No. 8,699,602, which claims the benefit under 35 U.S.C. 120 of U,S, Patent Application "Precoding Matrix Feedback Processes, Circuits and Systems," Ser. No. 12/188,767 filed Aug. 8, 2008, now U.S. Pat. No, 8,179.775, and which is incorporated herein by reference in its entirety.

U.S. Patent Application Publication 2008-0013610 "CQI Feedback For MIMO Deployments" of Jan. 17, 2008, and corresponding U.S. patent application Ser. No. 11/759,221 (TI-62585) fled Jun. 6, 2007, are each incorporated herein by reference in their entirety.

U.S. Patent Application Publication 2008-0207135 "CQI Feedback for OFDMA Systems" of Aug. 28, 2008, and corresponding U.S. patent application Ser. No. 12/036,066 (TI-64201) filed Feb. 22, 2008, are each incorporated herein by reference in their entirety, and to the extent applicable this application claims the benefit under 35 U.S.C. 120 thereof.

The present application is related to U.S. Provisional Application No. 60/974,345 (TI-65393PS) entitled "Scanning-based CQI feedback for OFDMA" filed on Sep. 21, 2007, and which is incorporated herein by reference in its entirety.

This application is a Continuation of application Ser. No. 14/181,942 filed Feb. 14, 2014, which is a Continuation of application Ser. No. 12/327,463 filed Dec. 3, 2008, now U.S. Pat. No. 8,699,602, which claims the benefit under 35 U.S.C. 120 of U.S. Patent Application "Differential CQI for OFDMA Systems," Ser. No. 12/254,738 filed Oct. 20, 2008, now U.S. Pat. No. 8,942,164, and which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

FIELD OF THE INVENTION

The present invention is directed, in general, to electronic circuits for supporting wireless communications, to various wireless systems, and to methods of operating the circuits and systems.

BACKGROUND OF THE INVENTION

A wireless network may employ orthogonal frequency division multiplexing (OFDM) or orthogonal frequency division multiple access (OFDMA). In a cellular wireless network, each cell employs a base station (designated by Node B or eNB) that communicates with user equipment (UE), such as a cell phone, a laptop, or a PDA. Base station eNB transmits reference signals or pilot signals to UE, which generates a channel estimate based on the reference signal, has impacted by interference and noise. The system bandwidth is divided into frequency-domain groups or subbands that encompass resource blocks RBs according to group size or subband size. An RB is the smallest allocation unit available in terms of frequency granularity allocated to UE by a base station scheduler module.

UE determines a channel quality indicator (CQI) for each RB or for each subband based on the channel estimation. The CQI metric is suitably a signal to interference noise ratio (SINR) after detection, the index to a supportable modulation and coding scheme, the index to a supportable code rate, a channel throughput measure, or other quality measure. UE feeds back the CQI for each subband or RB to eNB. More favorable CQI permits a higher data transfer rate of data streams by eNB to UE.

By using multiple transmit and multiple receive antennas with transmit pre-coding in a multi-input multi-output (MIMO) system, improved throughput and/or robustness are obtained. Pre-coding in a MIMO system involves determining and applying a linear or complex linear transformation for each RB to the data stream(s) allocated to the RB by an eNB scheduler prior to transmission via physical antennas. The number of independent data streams (number of spatial codewords) is termed the transmission rank. Denoting a P×R precoding matrix for each downlink RB as PM and the R independent data streams as an R-dimensional vector s, the transmitted signal via P physical antennas (P>=R) is written as: x=PM s. For a frequency division duplex FDD system where the uplink and downlink channels are not reciprocal, precoding matrices to contribute to the matrix PM are efficiently chosen at UE by indexing to a pre-determined set of matrices (pre-coding codebook). Based on the channel estimate, UE feeds back to the base station for each of its subbands or RBs, the precoding matrix index (PMI) and the CQI expected to occur when eNB uses the indexed precoding matrix to transmit data in an RB in a given subband.

A high level of operational overhead and uplink bandwidth is believed to have hitherto been involved when each of many UEs deliver feedback about many subbands to eNB. This can undesirably increase system processing delays and dissipation of power and energy which is of particular concern in mobile handset forms of UE. Accordingly, further ways of reducing the amount of communications feedback between user equipment and base station are desirable.

SUMMARY OF THE INVENTION

A form of the invention involves an electronic device that includes a first circuit operable to generate at least a first and a second channel quality indicator (CQI) vector associated with a plurality of subbands for each of at least first and second spatial codewords respectively and generate a first and a second reference CQI for the first and second spatial codewords, and operable to generate a first and a second differential subbands CQI vector for each spatial codeword and generate a differential between the second reference CQI and the first reference CQI, and further operable to form a CQI report derived from the first and the second differential subbands CQI vector for each spatial codeword as well as the differential between the second reference CQI and the first reference CQI; and a second circuit operable to initiate transmission of a signal communicating the CQI report.

Another form of the invention involves a CQI report scanning circuit including a first circuit operable to generate a CQI report derived from at least a first and a second channel quality indicator (CQI) vector associated with a plurality of subbands for each of at least first and second spatial codewords respectively, and a second circuit operable to configurably establish a scanning pattern for the CQI report across the spatial codewords and subbands and to initiate transmission of a signal communicating the CQI report according to the configurably established scanning pattern.

A further form of the invention involves a channel quality indicator (CQI) reporting circuit including a first circuit operable to generate at least a first and a second channel quality indicator (CQI) vector associated with a plurality of subbands for each of at least first and second spatial codewords respectively and a first and a second differential subbands CQI vector for each of the first and second spatial codewords respectively, and further operable to generate a CQI report based on a vector differential between the second differential subbands CQI vector and the first differential subbands CQI vector, and a second circuit operable to initiate transmission of a signal communicating the CQI report.

An additional form of the invention involves a MIMO wireless node for multiple-input, multiple-output (MIMO). The wireless node includes a receiver to receive at least one signal, each communicating a channel quality indicator (CQI) report for first and second spatial codewords associated with a user equipment wherein the CQI report is derived from a first reference CQI and a first and a second differential subbands CQI vector for each spatial codeword as well as a differential between a second reference CQI and the first reference CQI. A processing circuitry is coupled to the receiver and operable to reconstruct a first and second subbands CQI vector from the at least one signal associated with the CQI report.

Still another form of the invention involves a MIMO wireless node for multiple-input, multiple-output (MIMO). The wireless node includes a receiver to receive at least one signal, each communicating a compressed channel quality indicator (CQI) report associated with a user equipment for spatial codewords and subbands, and a processing circuitry coupled to the receiver and operable for reconstructing at least a first and a second CQI vector from said at least one signal according to a configurably established scanning pattern for processing the CQI report across the spatial codewords and subbands wherein each reconstructed CQI vector is associated with a plurality of subbands for each of at least first and second spatial codewords respectively.

Another additional form of the invention involves a MIMO wireless node for multiple-input, multiple-output (MIMO). The wireless node includes a receiver to receive at least one signal, each communicating a channel quality indicator (CQI) report associated with a user equipment for at least first and second spatial codewords and subbands. A processing circuitry is coupled to the receiver and operable for reconstruction of at least a first and a second CQI vector, associated with subbands for each of the at least first and second spatial codewords respectively, from the CQI report including information based on a vector differential between a second differential subbands CQI vector for the second spatial codeword and a first differential subbands CQI vector for the first spatial codeword.

Other forms of inventive electronic circuits, devices, processes and systems are also disclosed and claimed.

BRIEF DESCRIPTION OF THE DRAWINGS

For a more complete understanding of the present invention, reference is now made to the following descriptions taken in conjunction with the accompanying drawings, in which:

FIG. 3 shows resource blocks (RBs) associated with respective sub-bands and Channel Quality Indicator (CQI) values $S_1$-$S_5$, and FIG. 4 shows subbands with numbers $L_1$ through $L_M$ of resource blocks (RBs) associated with respective Channel Quality Indicator (CQI) values $S_1$-$S_M$.

FIGS. 10-20 and 24A-31B are diagrams of spatial codewords (streams) versus subbands for different CQI reporting processes.

FIG. 10 shows quantization by codeword, and FIG. 11 shows a process that generates pairwise differences across streams and quantizes differences.

FIG. 12 shows CQI wideband reporting for plural codewords, and FIG. 13 further shows spatial differential encoding of a wideband CQI across codewords.

FIG. 14 shows wideband CQI reporting combined with frequency differential CQI reporting for subbands on a codeword by codeword basis, and FIG. 15 further shows differential encoding of a wideband CQI across codewords.

FIG. 16 shows is wideband CQI reporting, spatial differential encoding of a wideband CQI across codewords, frequency differential CQI reporting for subbands for a first codeword, and differential encoding of CQI of a second codeword spatially differentially encoded (Delta Delta) relative to frequency differential encoding for the first codeword.

FIG. 17 shows CQI reporting for different codewords using pairwise differences in the frequency domain followed by quantization, and FIG. 18 further shows the reference subband of the second codeword encoded spatially differentially with respect to the reference subband of the first codeword.

FIG. 19 shows CQI reporting for different codewords using pairwise CQI differences for adjacent sub-bands followed by quantization, and with the reference subband of the second codeword encoded spatially differentially with respect to the reference subband of the first codeword, and further having differential coding across codewords of the pairwise differences (Delta Delta).

FIG. 20 shows CQI reporting for different codewords using differences relative to a reference subband followed by quantization, and with the reference subband of the second codeword encoded spatially differentially with respect to the reference subband of the first codeword, and further having differential coding across codewords of differences relative to reference (Delta Delta).

FIG. 21 shows Best-m CQI reporting of an average CQI for selected subbands and wideband CQI reporting for unselected subbands; FIG. 22 shows Best-m CQI reporting of individual CQI for selected subbands respectively, and wideband CQI reporting for unselected subbands; and FIG. 23 shows individual reporting of CQI for each subband.

FIGS. 24A and 24B are each a diagram of subbands in the frequency domain for different codewords showing Best-m frequency differential CQI reporting relative to a wideband CQI, and wideband CQI reporting for unselected subbands spatially differentially encoded across codewords, and in FIG. 24A the selected (Best-m) subbands have the same subband indices across codewords, and in FIG. 24B the selected (Best-m) subbands have different subband indices when compared across codewords.

FIGS. 31A and 31B are each a diagram of subbands in the frequency domain for different codewords showing Best-m individual frequency differential CQI reporting for selected subbands relative to an wideband CQI for the first codeword, spatially differentially encoded individual frequency differential CQI for a second codeword (Delta Delta) relative to the individual frequency differential CQI for the first codeword, and wideband CQI reporting for unselected subbands spatially differentially encoded across codewords, and in FIG. 31A the selected (Best-m) subbands have the same subband indices across codewords, and in FIG. 31B the selected (Best-m) subbands have different subband indices when compared across codewords.

FIG. 32 CQI reporting is in subband order, codeword by codeword. FIG. 33 CQI reporting is in codeword order, subband by subband. FIG. 34 CQI reporting is in mixed codeword and subband order. FIG. 35 CQI reporting is in subband order, codeword by codeword, wherein the number of subbands M varies with codeword index r.

FIG. 36 CQI reporting is across codewords wherein both the number of subbands M and the number of resource blocks per subband vary with codeword index r. FIG. 37 CQI reporting is across codewords wherein the number of resource blocks per subband vary with subband index j.

FIGS. 38, 39, 40 show different process embodiments of Delta Delta CQI reporting processes in UE, and processes in eNB to reconstruct the CQIs for subbands of codewords from the Delta Delta CQI report.

FIG. 41 shows a Best-m Average CQI reporting process in UE and a process to reconstruct the CQIs for selected subbands and unselected subbands of codewords from the Best-m CQI report for use by the eNB.

FIG. 41A shows a Best-m Average Delta Delta CQI reporting process in UE and a process to reconstruct the CQIs for selected subbands and unselected subbands of codewords from the Delta Delta CQI report for use by the eNB.

FIG. 42 shows a Best-m individual differential CQI reporting process in UE and a process to reconstruct the individual CQIs for selected subbands of codewords from the Best-m CQI report for use by the eNB.

FIG. 42A shows a Best-m Delta Delta individual differential CQI reporting process in UE and a process to reconstruct the individual CQIs for selected subbands of codewords from the Best-m Delta Delta CQI report for use by the eNB.

FIG. 43 is a flow diagram of a process for use in base station eNB to apply a scanning pattern and use a subband vector SV indicating selected individual subbands for Best-m CQI reporting involving multiple codewords in a MIMO system.

Corresponding numerals refer to corresponding parts in the various Figures of the drawing, except where the context may indicate otherwise. Some overlap of algebraic symbols with each other may occur, and the context makes their meaning clear.

DETAILED DESCRIPTION OF EMBODIMENTS

Figure 1:
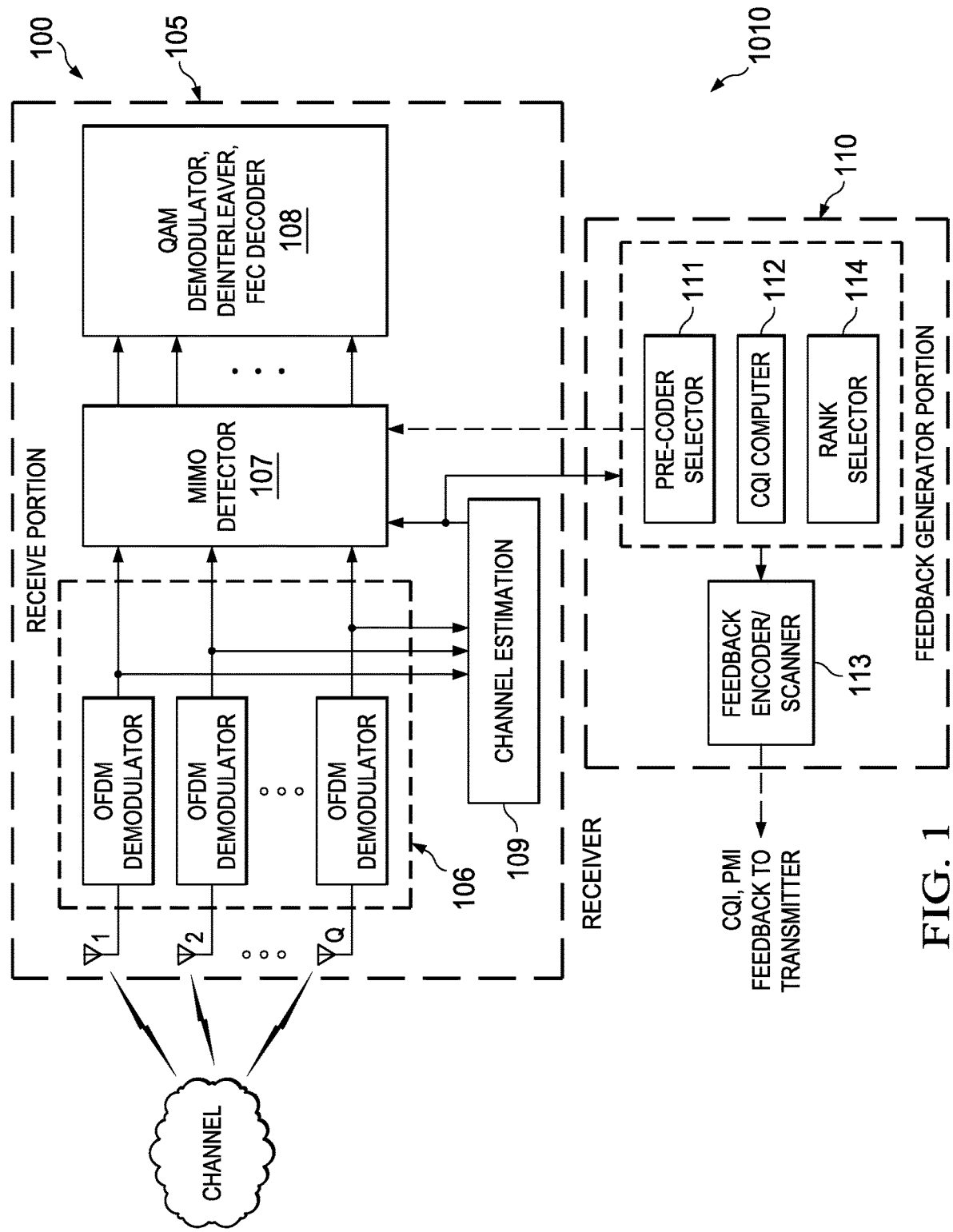
FIGS. 1 and 2 each provide a respective system block diagram of a MIMO OFDMA receiver and transmitter for UE or eNB improved as shown in the other Figures.

FIG. 1 illustrates a system diagram of a receiver 100 in an OFDM communications system. The receiver 100 is part of a mobile handset 1010 or otherwise located in a telecommunication unit of fixed or mobile type. The receiver 100 includes a receive portion 105 and a reporting or feedback generation portion 110. The receive portion 105 includes an OFDM module 106 having Q OFDM demodulators (Q is at least one (1) and equals or exceeds the number P of antennas) coupled to corresponding receive antenna(s), a MIMO detector 107, a QAM demodulator plus de-interleaver plus FEC decoding module 108 and a channel estimation module 109. The feedback portion 110 includes a precoding matrix selector 111, a channel quality indicator (CQI) computer 112, rank selector 114, and a feedback encoder 113.

Figure 2:
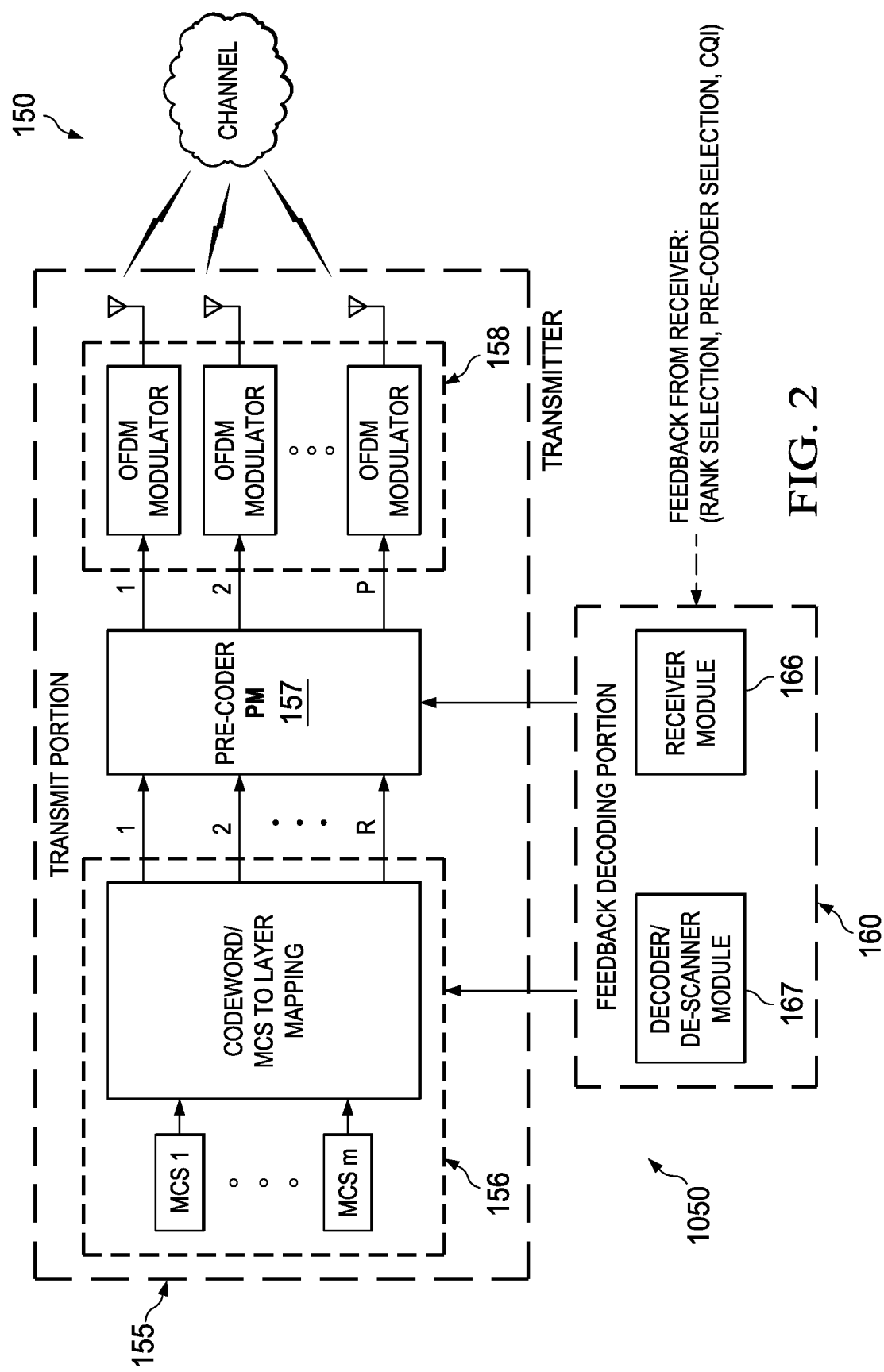

The receive portion 105 in FIG. 1 receives data from a transmitter 150 of FIG. 2 based on a precoding matrix selection that was determined by the receiver 100 in FIG. 1 and fed back to the transmitter of FIG. 2. In FIG. 1, the OFDM module 106 demodulates the received data signals and provides them to the MIMO detector 107, which employs channel estimation 109 and precoding matrix information to further provide the received data to the module 108 for further processing (namely QAM demodulation, de-interleaving, and FEC decoding). The channel estimation module 109 employs previously transmitted channel estimation pilot signals to generate the channel estimates for receiver 100. The precoding matrix information can be obtained via an additional downlink signaling embedded in the downlink control channel or in a reference signal. Alternatively, the receiver 100 can obtain the precoding matrix information from the previously selected precoding matrix. In addition, the two sources can also be used in conjunction with each other to further improve the accuracy.

In FIG. 1, the precoding matrix selector 111 determines the precoding matrix selection for the data transmission based on the channel/noise/interference estimates from block 109. This precoding matrix operation occurs in tandem with rank selector 114 determination of a preferred rank R for number of spatial code words to be accommodated. CQI is calculated based on the selected precoding matrix or its index (PMI) in a PMI codebook. The precoding matrix selection and CQI are computed for the next time the user equipment UE of FIG. 1 is scheduled by the transmitter (e.g., a base station FIG. 2) to receive data. In FIG. 1, the feedback encoder 113 then encodes the precoding matrix selection and the CQI information and rank R and feeds them back separately encoded to the transmitter before the data is transmitted. In one embodiment, the precoding matrix selection is jointly encoded to achieve feedback transmission compression. For improved efficiency, the precoding matrix selection and CQI are jointly encoded into one codeword.

Figure 42:
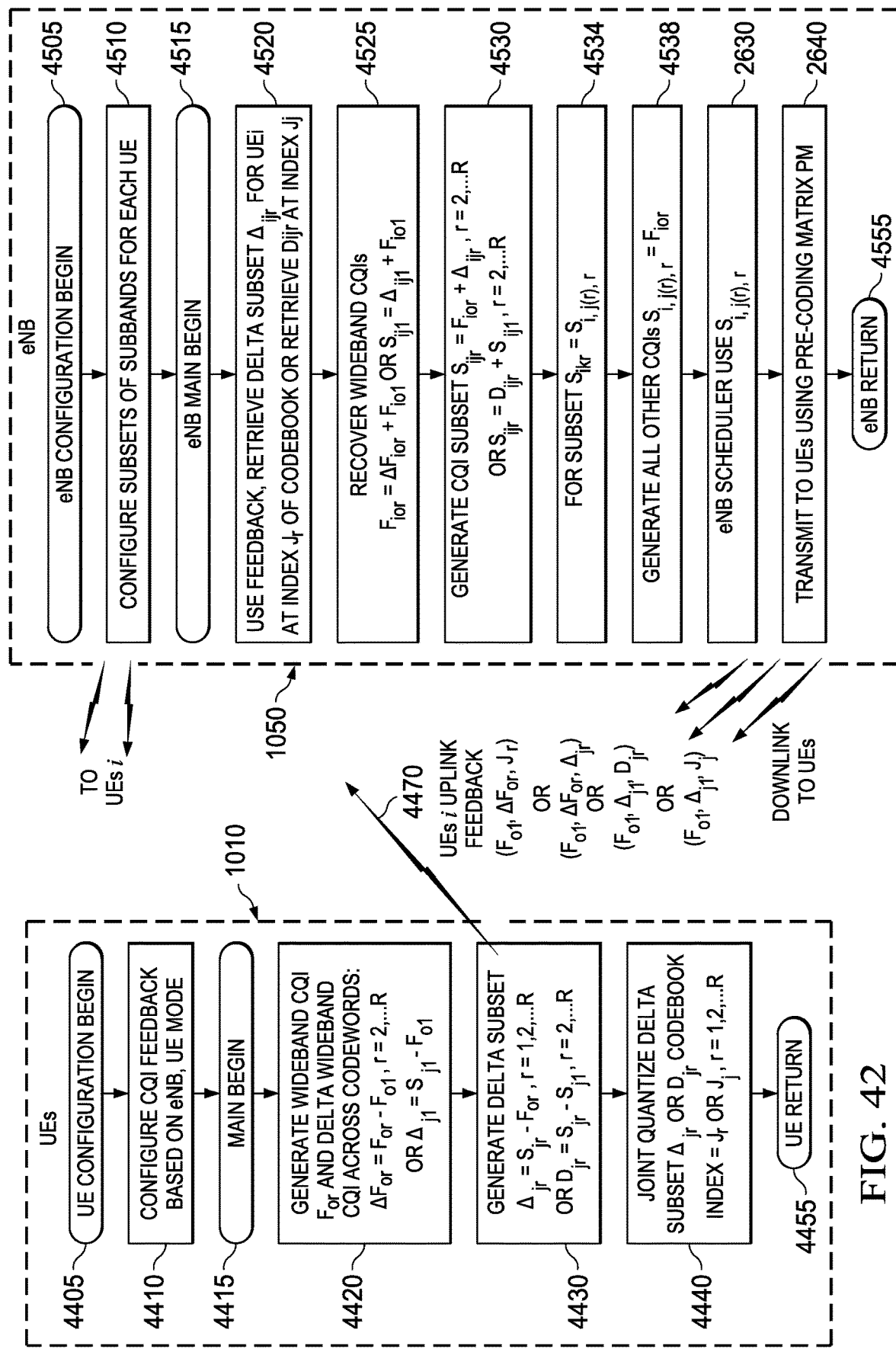

FIG. 2 illustrates a system diagram of a transmitter 150 such as for a base station eNB 1050 of FIG. 42 in an OFDM communication system. The transmitter 150 includes a transmit portion 155 and a feedback decoding portion 160. The transmit portion 155 includes a modulation and coding scheme (MCS) module 156, a pre-coder module 157 and an OFDM module 158 having multiple OFDM modulators that feed corresponding transmit antennas. The feedback decoding portion 160 includes a receiver module 166 and a decoder module 167.

The transmit portion 155 is employed to transmit data provided by the MCS module 156 to a receiver 100 based on pre-coding provided by the pre-coder module 157. The MCS module 156 takes codeword(s) and maps the codeword(s) to the R layers or spatial streams, where R is the transmission rank and at least one. Each codeword consists of FEC-encoded, interleaved, and modulated information bits. The selected modulation and coding rate for each codeword are derived from the CQI. A higher CQI implies that a higher data rate may be used. The pre-coder module 157 employs a precoding matrix selection obtained from the feedback decoding portion 160, wherein the precoding matrix selection corresponds to a grouping of frequency-domain resource blocks employed by the receiver 100 of FIG. 1. The receiver module 166 accepts the feedback of this precoding matrix selection, and the decoder module 167 provides them to the pre-coder module 157.

Once the R spatial stream(s) are generated from the MCS module 156, a precoding matrix is applied to generate P≥R output streams. Note that P is equal to R only if R>1 since P>1 and R≥1. The precoding matrix PM is selected by precoder module 157 from a finite pre-determined set of possible linear transformations or matrices, defined as the precoding matrix codebook, which corresponds to the set that is used by the receiver 100 of FIG. 1. Using pre-coding, the R spatial stream(s) are cross-combined linearly into P output data streams. For example, if there are 16 matrices in the precoding codebook, a precoding matrix index (PMI) corresponding to the index to one of the 16 matrices in the codebook for the subband (say 5, for example) is signaled from the receiver 100 by sending from UE of FIG. 1 to the eNB for use by transmitter 150 of FIG. 2 for the subband. The precoding matrix index PMI then tells the transmitter 150 which of the 16 precoding matrices to use.

Figure 3:
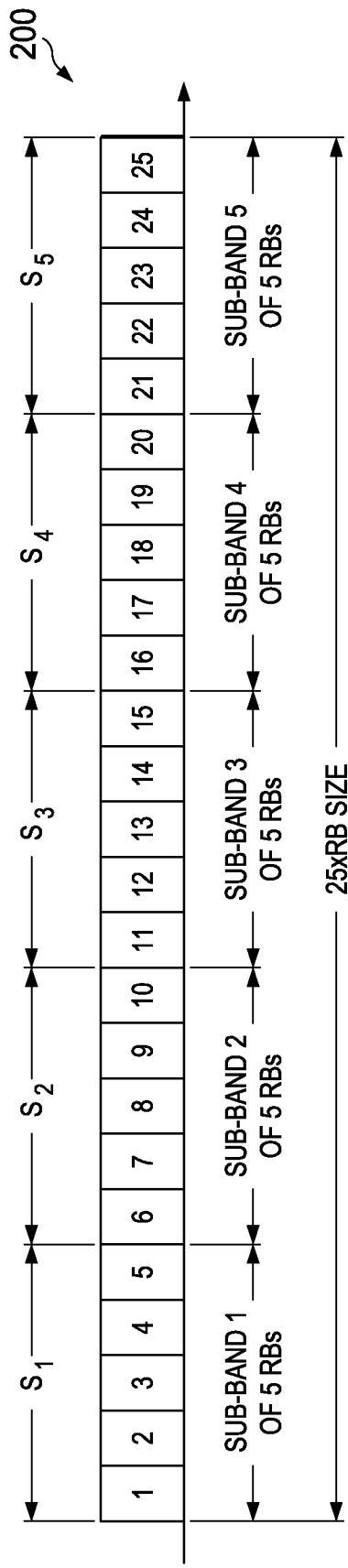
FIGS. 3 and 4 are each a frequency spectrum diagram.

FIG. 3 illustrates five subbands of five frequency-domain resource blocks wherein a precoding matrix selection provides a single precoding matrix for each subband, as shown. Compare FIG. 9. In the context of the 3GPP E-UTRA, each of the resource blocks represents 180 kHz of bandwidth (each RB consisting of 12 OFDM/OFDMA sub-carriers) thereby giving a 5-RB subband size of 900 kHz for each of five CQI-related reports and five precoding matrices selected respectively for the five sub-bands. This grouping provides a practical subband size for many applications.

As discussed in connection with FIGS. 3-4, the precoding matrix selection corresponds to a grouping of frequency-domain resource blocks RBs employed by the receiver 100 of FIG. 1. A subband of the operating bandwidth corresponds to a collection of one or more RBs. One sub-band is defined as the smallest unit for precoding matrix selection and reporting of precoding matrix and CQI. That is, the RBs are concatenated or grouped, thereby reducing the precoding matrix reporting overhead and the control channel overhead in the downlink that signals their allocated RBs to UEs that have been scheduled. The precoding matrix selection provides a single precoding matrix for each subband.

Actual selection of the precoding matrices depends on an optimality criterion, such as one related to channel quality indicator CQI, such as the sum throughput that a subband provides, mutual information, or worst case throughput or a specified maximum error rate for the subband or some other now-known or future optimality criterion.

Figure 4:
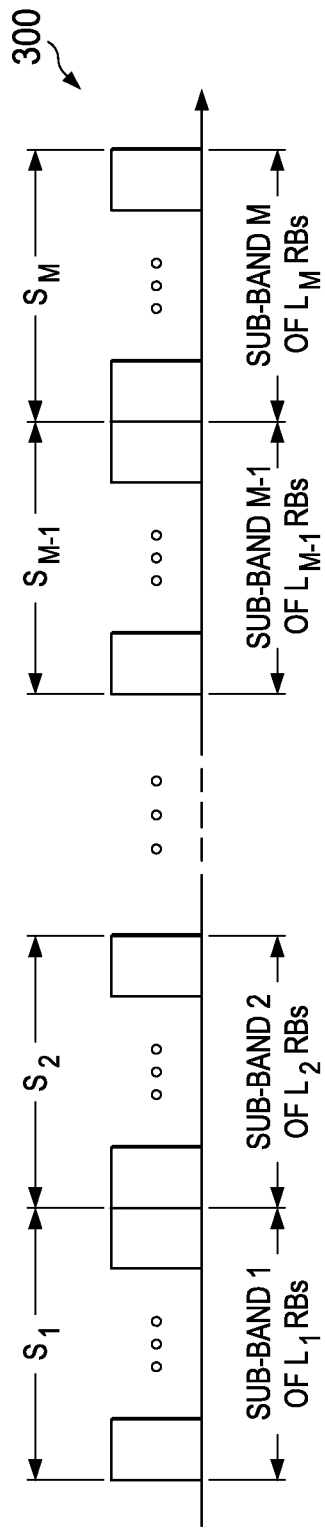

In FIG. 4, the grouping of the resource blocks RBs into subbands is variable or fixed depending on a level of signaling support available. For example, the grouping varies depending on the channel quality afforded by the resource blocks involved. Or, the grouping is fixed if the channel quality indicator CQI is high for the resource blocks involved. In one example, the subband size (the number $L_j$ of resource blocks within each subband j in FIG. 4) is fixed only throughout the entire communication session, or within each data frame. For faster variation, the downlink control channel is used to communicate the change in the grouping scheme. Slower variation can benefit from the downlink broadcast (common control) channel, which is transmitted less frequently, or higher layer signaling.

In general, the grouping scheme or the subband size used in UE in FIG. 1 is configurable by the network and/or the transmitter (base station of FIG. 2). It is also, possible, however, for the FIG. 1 receiver 100 (user equipment UE) to request the FIG. 2 transmitter 150 and/or the network to change the grouping scheme/size. This request is suitably conveyed via a low-rate feedback (e.g., sparse physical layer feedback or higher layer feedback signaling). This is relevant when the downlink interference characteristic is highly frequency selective.

Figure 5:
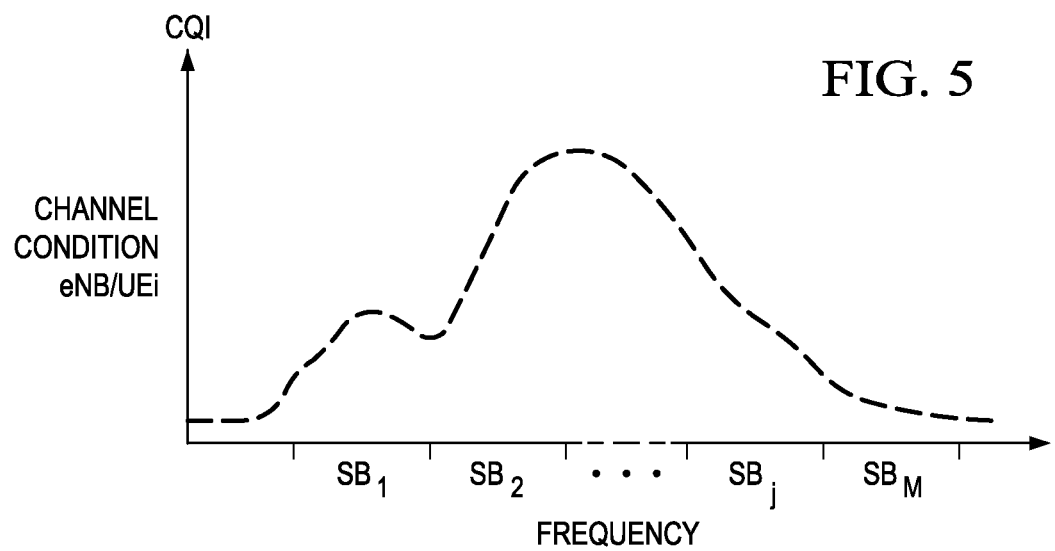
FIG. 5 is a hypothetical graph of channel quality indicator CQI versus frequency sub-bands.

FIG. 5 shows a hypothetical CQI variation in the frequency domain. Average CQI in each subband approximates the CQI for each RB in the subband.

Figure 6:
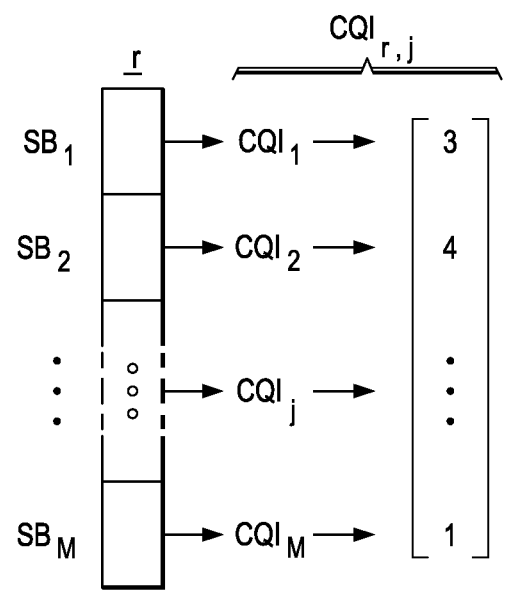
FIG. 6 illustrates a CQI vector $S=CQI_{r,j}$ of CQI values generated by a UE and associated with the frequency sub-bands j of FIG. 5 and various spatial streams or spatial codewords r.

FIG. 6 shows a vector average $CQI_1$, $CQI_2$, ... $CQI_3$, ... $CQI_M$ for subbands $SB_1$, $SB_2$, ..., $SB_j$, ... $SB_M$ respectively. The average $CQI_{r,j}$ indexed by each subband j and codeword r is reported either directly or in compressed form as discussed in detail elsewhere herein. (In the subscripting, a comma is sometimes used as a separator for clarity, and if no comma is present different lettered indices are still regarded as independent.) For compactness of notation a vector $S_{r,j}$ is used interchangeably to represent $CQI_{r,j}$. In FIG. 6, for spatial codeword r in a hypothetical numerical example, $CQI_{r,1}=3$, meaning that the channel quality indicator for the codeword r in subband 1 has a CQI value of 3. Analogously, $CQI_{r,2}=4$, etc. and $CQI_{r,M}=1$.

Figure 7:
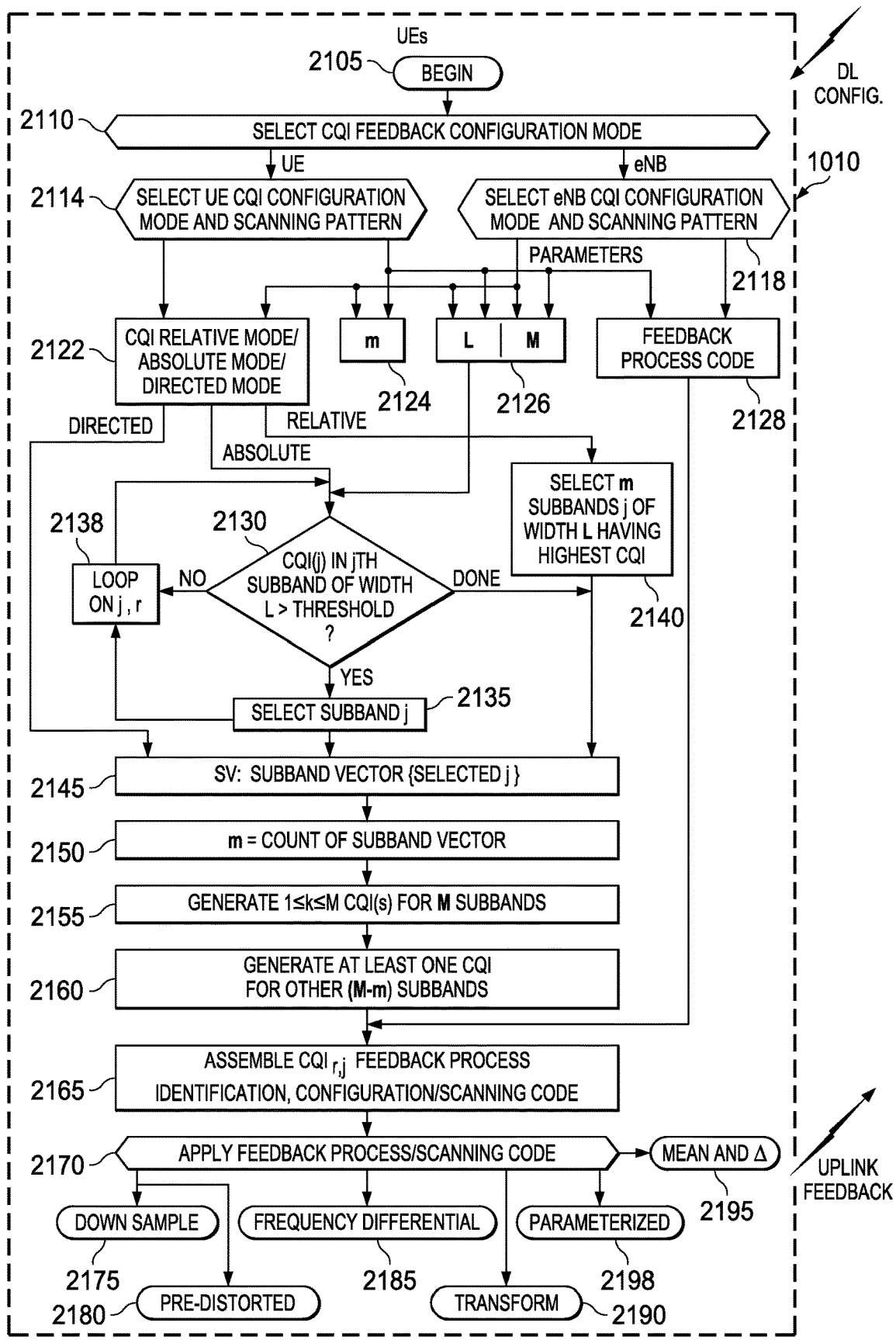
FIGS. 7 and 8 are respectively a flow diagram of a UE process in FIG. 7 having different CQI feedback or reporting modes, and an eNB process in FIG. 8 for establishing different CQI feedback modes and responding to the CQI report.
Figure 8:
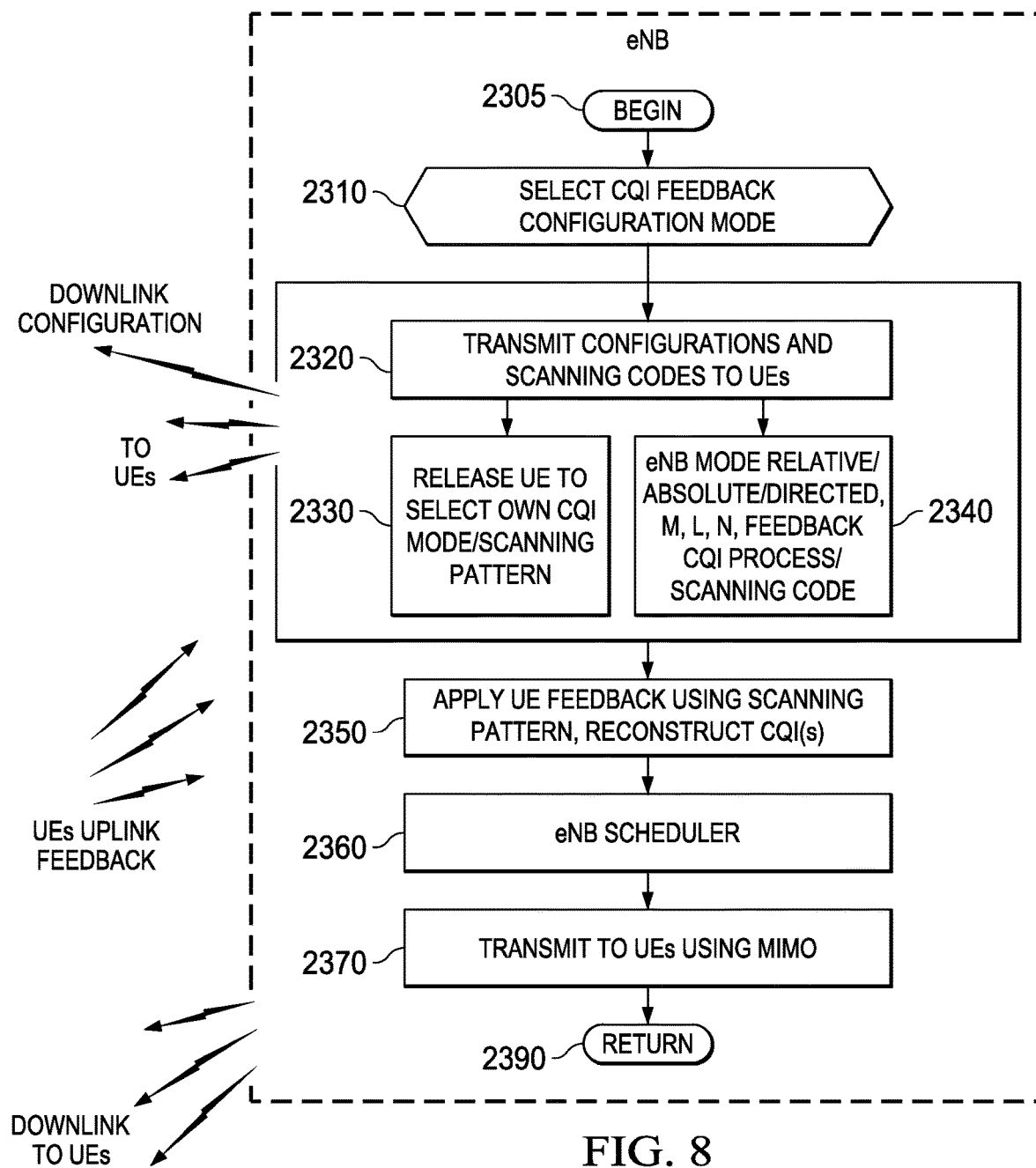

In FIG. 7, UE operation commences at a BEGIN 2105 and proceeds to select a hybrid CQI feedback configuration mode at a decision step 2110 which monitors configuration transmissions of FIG. 8 from eNB. In one example of UE logic for decision step 2110 in FIG. 7, a mode called UE Configuration Mode here is selected and operations go to a step 2114 to activate UE Configuration Mode unless base station eNB in FIG. 8 mandates otherwise. If base station eNB in FIG. 8 mandates otherwise as monitored in step 2110, then operations instead select a mode called eNB Configuration Mode here and branch to a step 2118 that activates the eNB Configuration Mode.

These modes, UE Configuration Mode and eNB Configuration Mode, respectively establish parameters and controls over hybrid CQI feedback that are responsive to UE itself or base station eNB depending on the applicable mode. The parameters and controls also define a scanning pattern or sequential feedback order in some embodiments, see e.g. FIGS. 32-37. For CQI feedback about all subbands, i.e. not Best-m feedback, a step 2128 establishes a configured CQI feedback mode configured by either UE or eNB for such CQI feedback and goes to step 2165.

For various forms of Best-m CQI feedback, i.e. involving selected and unselected subbands, the parameters and controls are established in some embodiments according to step 2122 for CQI Relative Mode or CQI Absolute Mode or CQI Directed Mode, step 2124 for a number m of selected subbands, step 2126 specifying total number M of subbands and a width granularity number L for m selected subbands, and a step 2128 specifying a Feedback Process Code for Best-m. Flow arrows couple each of steps 2114 and 2118 to each of steps 2122, 2124, 2126, 2128 so that the applicable UE Configuration Mode or eNB Configuration Mode establishes parameters and mode controls over hybrid CQI feedback.

If step 2122 establishes CQI Absolute mode, operations go to a loop having steps 2130, 2135, 2138. In FIG. 7, loop 2130, 2135, 2138 selects all CQI(j) such as SINR(j) in subband j that exceeds a predetermined threshold and such selection operationalizes the CQI Absolute mode. Note that SINR is an exemplary definition of CQI, whereas CQI can also be alternatively defined as the index to the highest supportable modulation and coding scheme, index to the highest supportable code rate, for instance. The loop uses the parameters M and L that were established in step 2126 to search all M subbands using width L. Step 2130 detects whether the threshold is exceeded by the SINR in a given sub-band j. If Yes in step 2130, then operations proceed to step 2135 to record a one (1) at a position j (current value of index j) in a subband vector SV(j) and then go to step 2138 to increment the index j and/or codeword index r. If No in step 2130, then operations instead record a zero (0) at position j in SV(j) and proceed to step 2138 to increment the index j. If incremented index j exceeds the number M of subbands, the loop is Done and operations proceed from step 2130 to a step 2145.

If step 2122 establishes CQI Relative mode, operations go to a step 2140 that selects a number m of subbands j of width L having, e.g., highest CQI (such as SINR, index to the highest supportable modulation and coding scheme, index to the highest supportable code rate), and such selection operationalizes the CQI Relative mode. Step 2140 uses the parameter m established in step 2124 and the parameters M and L that were established in step 2126, and searches all M subbands according to the number M established in step 2126. Operations proceed from step 2140 to step 2145.

If step 2122 establishes a CQI Directed mode under eNB Configuration Mode, operations go to step 2145 and directly load a subband vector SV(j) or SV(r,j) with a particular series of ones and zeros responsive to, and/or as directed and/or specified by base station eNB step 2310 or 2340 of FIG. 8. If step 2122 establishes a CQI Directed mode under UE Configuration Mode, operations go to step 2145 and directly load a subband vector SV2 with a particular series of ones and zeros as directed and/or specified by UE itself. In this way, particular subband(s) can be selected for UE to report respective CQI values for the subband(s).

At step 2145, a subband vector SV(j) or SV(r,j) is now constituted and has M elements forming a series of ones and zeros that represent whether each subband is selected or not. Next, a step 2150 counts the number of ones in subband vector SV to establish the resulting number m or m(r) of selected subbands resulting when the CQI Absolute Mode has been executed.

Note that defining the subband vector (SV) as a 1×M vector containing 1s and 0s is one exemplary method to indicate the position of the selected subbands. Alternatively, the position of the selected subbands is reported using compressed label or codebook index (e.g., bits joint quantized into fewer bits by UE codebook lookup using for example $\log_2(C_M^m)$ bits, where $C_M^m$ denotes number of combinations of M elements taken m at a time, m being the number of selected subbands).

A further step 2155 generates one or more CQI values ($k_1$ in number) for the number nm of selected subbands due to either CQI Relative or CQI Absolute mode. A step 2160 generates one or more CQI values ($k_2$ in number) to either individually or collectively describe the un-selected subbands that are M−m in number. A total number $k=k_1+k_2$ of CQI value(s) are generated to describe the M subbands, where $1<=k<=M$. (M is number of subbands.) The CQI value(s) generated in step 2160 for the un-selected subbands have a precision or accuracy that is less than the precision or accuracy of the CQI values for the number m of selected subbands generated in step 2155. This feature efficiently reduces the bits needed to communicate the CQI values for all M subbands as a whole.

Operations go from Best-m last step 2160 to a succeeding step 2165. For CQI feedback other than Best-m, operations go directly from step 2128 to step 2165 and bypass steps 2122 and 2130-2160.

Step 2165 assembles the CQI values into a CQI vector, to which is associated a Feedback Process Code from step 2128, a scanning code identifying a scanning pattern (e.g., from FIG. 32-37), mode specifiers from step 2122, an identification UE_ID of the UE, CQI, rank and any other relevant configuration information or representing-information not already communicated by UE in some other way or already stored at base station eNB. Then depending on the Feedback Process Code, a decision step 2170 flows operations sequenced according to the scanning code to any one (or more) of several CQI feedback processes for rank R>=1 described elsewhere herein, such as Down Sample 2175, Predistortion 2180, Frequency Differential 2185, Transform/Wavelet 2190, Mean and Delta 2195 and/or Parameterized 2198. Various embodiments of process and structure remarkably alter and modify these feedback processes into forms especially adapted for efficient MIMO CQI feedback involving subbands across code words for rank R>=2, as further described elsewhere herein. The CQI feedback output is transmitted from each UE to base station eNB on uplink UL. The transmission itself can represent a service request, or an explicit service request code can be included in the transmission.

In FIG. 8, base station eNB begins configuration in a step 2305, selects a CQI feedback configuration mode in a step 2310 and configures or allocates subsets of subbands for each UEi and establishes scanning codes in a step 2320. Base station eNB requests a CQI report from each UEi either in a CQI feedback mode and scanning pattern selected by UE with permission from eNB in a step 2330 or according to a CQI feedback process and scanning pattern that is initiated in a step 2340 by eNB. In Best-m CQI feedback, the amount of feedback is reduced because each UEi only reports CQI for the pertinent subbands identified or implied by the configuration established. Moreover, each UEi in some embodiments saves processing power and time by restricting channel estimations and channel quality determinations to those subbands and/or RBs configured for UEi by the eNB.

Computational burden or complexity of full encoding/decoding (compressing/decompressing) of CQI is acceptable and for some processes even entails only logic operations, numerical additions and shifts. The computational complexity increase is marginal compared to the benefit achieved from reducing the feedback overhead in the communications channel. With many UEs in a wireless communications system sending feedback to a base station, it is desirable to avoid any unnecessary congestion and instead provide intelligent and smartly compressed CQI feedback from each UE. Compressed CQI information is suitably sent in the uplink control channel in the form of control information, or sent together with uplink data in a physical uplink shared channel. CQI is one of or a combination of various feedback quantities such as (but not limited to) the signal-to-interference plus noise ratio (SINR), spectral efficiency, preferred data rate and modulation-coding scheme MCS, capacity-based or mutual information, and/or received signal power.

In FIG. 8, Node B at step 2350 applies the CQI feedback from the UEs according to the configured scanning pattern(s) and recovers or reconstructs the CQIs originally determined by each UEi. Base station eNB scheduler 2360 allocates or configures subband(s) customized for each applicable UEi such as to perform user selection of which UE to schedule on a given transmission bandwidth at a given time, see also FIG. 9. Further, for the selected UE, the node B determines a transmission rank, a coding scheme for different layers and a modulation scheme for each layer. Node B step 2370 establishes precoding matrix PM and transmits to the UEs using MIMO in a manner determined by the scheduler, whence a RETURN 2390 is reached.

In UE joint quantization, a codebook of all valid feedback difference vectors is chosen. One example of a codebook has a well-chosen set of vectors which approximate actual difference vectors D with high probability. Another example codebook has zero-sum sequences with optimized inter-element Euclidean distances established or revised by using, for example, the Lloyd algorithm.

Quantization of the CQIs can involve an absolute value of at least one CQI or an average CQI of the selected subbands. Averaging is performed based on any suitable function (e.g., arithmetic mean, geometric mean or exponential averaging) selected for the purpose. A differential value of the CQI with respect to a reference value is suitably included in the feedback either directly or in joint quantized form. The reference value is determined employing the CQIs of selected sub-bands or using all sub-bands. For example, an average CQI of all sub-bands, an average CQI of the selected sub-bands or the CQI of neighboring sub-bands are some suitable alternatives. Optionally, a single average CQI for unselected sub-bands is employed. Alternatively, this average CQI is calculated for all the sub-bands unless the average CQI across all sub-bands is used as a reference value. Other CQI compression schemes employed on the CQIs of the unselected sub-bands are applied in still other embodiments.

MIMO spatially differential CQI compression is used for feedback to a base station. Frequency-domain compression processes herein are suitably applied to one transmission stream's CQI. Then, the difference between the chosen stream's CQI and the other stream's CQI is computed on each sub-band, or on a configured set of subbands (e.g., wideband/mediam/mean CQI), or on a selected set of sub-bands (e.g., Best-m subbands). The difference CQI (also known as differential CQI) is then compressed using the techniques discussed.

Spatial differential CQI corresponding to the mean or center sub-band uses fewer bits than the first-stream CQI. Spatial differential CQI for the other sub-bands (frequency-domain differential or non-center sub-bands) can also realize some reduction in bits. Hence, it is also possible to apply the spatial differential only to the center sub-band or the wideband (e.g., mean) CQI across sub-bands.

The CQI difference is computed between the streams before compression. Alternatively, the base stream is first compressed and quantized and the difference of the other stream's CQI with respect to this quantized output is selected for further compression and quantization.

MIMO joint difference coding CQI compression is used for feed back to a base station as an extension of the mean and differential CQI compression approach. Here, the mean is computed across all sub-bands or a configured set of subbands and all streams. Then, for each (stream, sub-band) the difference with respect to the mean is fed back. This method is based on the spatial variation and the variation across frequencies both being small compared to the wideband CQI (e.g., mean), which is determined by the geometry of the UE.

Additionally, the compressed CQI feedback in some embodiments also includes corresponding positions of the selected sub-bands, such as sub-bands having best CQI.

The compressed CQI in some embodiments corresponds to a wavelet-based CQI that provides a wavelet based on orthogonalizing a basis vector for a mean and differential CQI. In other words, the compressed CQI is generated by a transform that multiplies by two or more (e.g., orthogonal) basis vectors to generate two or more transform coefficients for UE to feed back to Node B. The transform is suitably applied according to various alternatives: 1) multiply-accumulate across the CQI vector of FIG. 5, one codeword at a time, 2) multiply-accumulate spatially across code words, one subband at a time, 3) perform two-dimensional transform, or 4) perform other suitable transform.

In some other embodiments, the compressed CQI corresponds to a hierarchical granularity refinement CQI that provides difference-based wavelet coefficients chosen in time for a recursively divided set of sub-bands.

In one embodiment, the compressed CQI corresponds to a codebook index from a codebook with entries including a plurality of CQI vectors of absolute CQI values across sub-bands (CQI profiles). Or, the compressed CQI corresponds to an index for a codebook element that is closest to an actual differential CQI vector. In that case, the codebook elements approximate differential CQI vectors to which actually-generated differential CQI vectors are compared to select the index as compressed output (joint quantized) for feedback from UE to eNB. Alternatively, the compressed CQI corresponds to a basis function representing at least one sub-band CQI selected from a set of sub-band CQIs for the transmission bandwidth.

For MIMO CQI feedback, the compressed CQI suitably corresponds to each of a set of compressed CQIs for each sub-band that is determined independently for each of a plurality of spatial transmission streams. Or the compressed CQI instead corresponds to a spatially differential CQI for each sub-band that is determined as a difference CQI between a referenced one of a plurality of spatial transmission streams and each remaining one of the plurality of spatial transmission streams. Alternatively, the compressed CQI corresponds to a joint difference CQI for each sub-band that is determined as a difference CQI between each of a plurality of spatial transmission streams and a wideband CQI across the plurality of spatial streams for a set of sub-bands.

Figure 9:
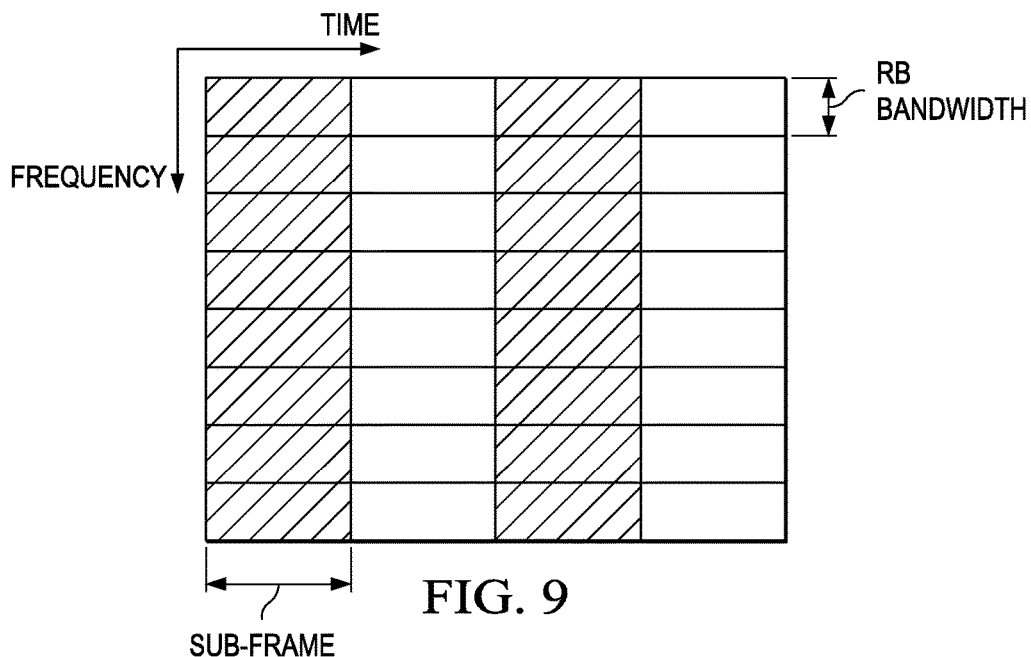
FIG. 9 is a frequency versus time diagram of resource blocks RB of FIG. 3 or FIG. 4 in OFDMA communication.

In FIG. 9, in an orthogonal frequency division multiple access (OFDMA) communication system the total operating bandwidth is divided into non-overlapping resource blocks (RB), and transmissions from user equipments (UEs) occur in an orthogonal, not mutually interfering, manner. Each RB can potentially carry data to a different UE, or each UE gets a well-chosen set of resources where it has a high signal-to-interference and noise ratio (SINR) so that the spectral efficiency of the transmission is maximized according to the operating principle of a scheduler.

To enable near-optimum frequency domain scheduling, each UE feeds back the SINR or channel quality indicator (CQI) it experiences, potentially for each RB or for a set of RBs, to its serving base station (Node B). Efficient CQI feedback or reporting embodiments herein beneficially compress the amount of overhead incurred. CQI information across multiple RBs can be highly correlated, and some embodiments explicitly establish the precoding matrix PM to not only effectuate high correlation among RBs or sub-bands in the same codeword (spatial information stream) but also high correlation between corresponding RBs or sub-bands across codewords or spatial information streams. Such channel correlation is leveraged in specific methods and structures herein to reduce the CQI feedback overhead in the uplink (UL) communication from UEs to their serving Node B (base station eNB).

In multiple-input, multiple-output (MIMO) OFDMA systems, multiple spatial layers, or codewords (CW), can be transmitted simultaneously in the same frequency spectrum. CQI report for MIMO systems involves feeding back: 1) the optimal transmission rank, i.e., the number R of spatial layers to be multiplexed, 2) the channel quality indicator (CQI) for each codeword across RBs or subbands, and 3) precoding matrix index (PMI) across RBs for precoding based closed-loop MIMO.

CQI quantization and feedback for MIMO-OFDMA systems is described in more detail herein. Note that here CQI means the channel quality indicator of each codeword, and is distinct from the precoding matrix index PMI. Moreover, some embodiments herein now provide methods and structure embodiments in PMI feedback, where sufficient analogy exists to permit their application to PMI.

Consider an OFDMA system with operating bandwidth divided into N resource blocks (RBs). A resource block has a set of adjacent sub-carriers (tones). A 3GPP LTE system with 5 MHz bandwidth has N=25 RBs, each of 180 kHz, for a total operating bandwidth of 4.5 MHz after allowing the remaining 0.5 MHz bandwidth to be used for band edge interference protection. For scheduling purposes, the RBs are concatenated into larger subbands thereby fundamentally reducing the CQI reporting overhead and the control channel overhead in the downlink that signals to the scheduled UEs their allocation. In FIG. 4, one sub-band consists of L RBs, where L is a positive integer. Let M sub-bands exist within the system bandwidth. In some embodiments or configurations, all the M sub-bands are composed of the same number L of RBs as in FIG. 3. In some other embodiments or configurations, different sub-bands j have different numbers L(j) of RBs as in FIG. 4, such as when N is not a multiple of L. In a MIMO OFDMA system with a rank R>1, the number M of subbands j for each spatial codeword r in some embodiments is independent of codeword index r=1, 2, . . . R. In some other embodiments, the number M of subbands varies with codeword index r such that M=M(r) and number N of resource blocks RBs is expressed by $$N = \sum_{r=1}^{R} \sum_{j=4}^{M(r)} L(j, r).$$

The worst-case channel profile may result in insignificant CQI variation within M sub-bands. Note that operation across RBs is a special case with L=1. Since the channel CQI profile of FIG. 5 may vary over time, it is also beneficial to configure the sub-band size (the parameter L) semi-statically either by the Node-B or the network. The Node-B can signal the change in L to the UE via higher layer signaling or broadcast channel. While it is beneficial to have multiple possibilities for L, the number of possibilities can also be kept small for simplicity and economy.

Based on the channel and interference/noise variance estimates, the UE computes signal-to-interference-noise ratio (SINR) for all the sub-carriers. From this quantity, the channel quality indicator (CQI) for each sub-band is suitably derived, which will be denoted as $S_{11}$, $S_{12}$, ... $S_{1M}$, $S_{21}$, $S_{22}$, ... $S_{2M}$, $S_{R1}$, $S_{R2}$, ... $S_{RM}$, where $S_{rj}$ denotes the CQI of the r-th codeword on the j-th sub-band. Note that CQI can be defined as other performance metrics (e.g. mutual information, received signal strength). The number of codewords that are transmitted simultaneously is the rank, denoted as R.

Some background on CQI feedback for wireless systems is found in U.S. Patent Application Publication 2008-0207135 "CQI Feedback for OFDMA Systems" of Aug. 28, 2008, and corresponding U.S. patent application Ser. No. 12/036,066 (TI-64201) filed Feb. 22, 2008, which are each incorporated herein by reference. When each sub-band has only one CQI value to be fed back, CQI quantization is performed in the frequency domain. Such single codeword channel quality indicator SCW-CQI feedback has a set of sub-bands SB, defined for CQI $S_j$ related UE operations, which is semi-statically configured by higher layers.

FIG. 7 illustrates three types of CQI feedback processes, among others: 1) wideband feedback wherein a single wideband CQI is reported by regarding the entire OFDMA bandwidth as one subband, 2) UE-selected sub-band feedback, and 3) eNB configured sub-band feedback.

UE-selected sub-band CQI feedback involves self-configuration of the feedback method by UE itself. Out of the total M sub-bands, UE selects m sub-bands. The value of m can be configured by UE or eNB in case multiple m values are allowable in a given network system. Various alternative criteria are suitably applied in choosing the m sub-bands. For example, the m sub-bands are selected with the highest CQI value(s), or the m highest SINRs, or the m highest throughputs. Or a number of subbands are selected such that performance is within a performance-target range exceeding a CQI threshold. UE computes two CQI values. CQI value 1 corresponds to the wideband CQI, and CQI value 2 corresponds to a single CQI assuming transmission only over the m selected sub-bands. CQI value 1 is reported to eNB with high resolution, for example using 4 or 5-bits. CQI value 2 is encoded differentially relative to CQI value 1 and is fed back with lower resolution using fewer bits x, e.g., 2 or 3-bits, taking into account the fact that differential CQI is likely in actual system operation to have a smaller dynamic range and thus utilizes fewer bits. The position of the selected m sub-bands is reported by UE to eNB, with either a bitmap (e.g., M-bits 1011010 indicating each subband in spectrum order by a subband vector SV corresponding to a given bit position as selected (one) or not selected (zero)), or a compressed label or codebook index (e.g., bits joint quantized into fewer bits by UE codebook lookup using for example $\log_2(C_M^m)$ bits, where $C_M^m$ denotes number of combinations of M elements taken m at a time). When the number of sub-bands M is small, using bitmap provides simpler encoding by UE and may result in somewhat higher acceptable feedback overhead. When the number of sub-bands M is large, a compressed label or codebook index can be more efficient in terms of UE feedback overhead. eNB recovers the bitmap, i.e. a subband vector SV, by using the compressed label or codebook index to access a corresponding SV codebook at eNB.

In eNB configured CQI feedback, one wideband CQI is reported using a high CQI resolution (e.g., 4 or 5 bits). Each sub-band CQI in the sub-band CQI set S is encoded differentially relative to the wideband CQI, and fed back to eNB. Fewer bits (e.g., 2 or 3-bits) are suitably used in differential CQI feedback, taking into account the smaller dynamic range of the differential CQI which is probable in actual system operation. Note that here differential quantization is performed in frequency domain. Note here that "sub-band set" refers to the set of sub-bands configured by higher layers.

For MIMO-OFDMA systems, there are multiple codewords (layers, MCW). Spatially distinct MIMO information streams are likely to have a correlation so that CQI feedback bandwidth savings are realized.

Figure 10:
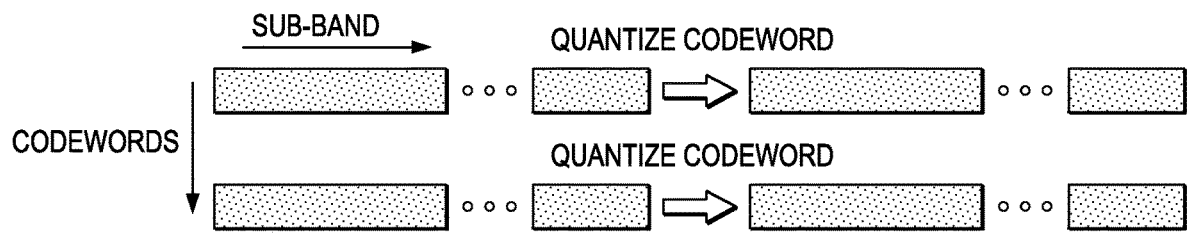

In FIG. 10, one process for MIMO-OFDMA CQI feedback performs separate CQI feedback on different spatial codewords, where CQI of each codeword is independently quantized and reported. In other words, the CQI of a first MIMO channel and a CQI of a second spatially distinct MIMO channel are independently quantized and reported. Although all codewords use the same single codeword (SCW)-CQI feedback process on each codeword (spatial information stream), some embodiments apply different SCW-CQI feedback algorithms on different codewords.

Figure 11:
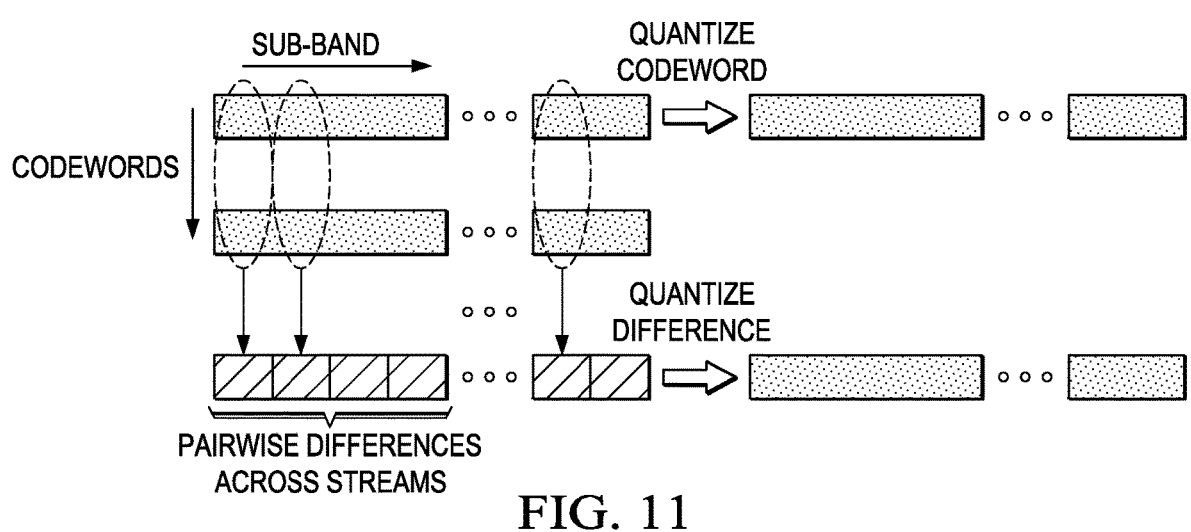

In FIG. 11, another alternative applies differential CQI feedback in the spatial domain. First, the spatial difference (delta CQI(j,r)) between the r-th codeword's CQI and a reference codeword's CQI is computed on each sub-band j, where codeword index r=1, . . . R. The reference-codeword's CQI and the delta-CQI are then represented independently and reported to eNB. When the CQI in codeword 1 is correlated with CQI in codeword 2 pairwise on same sub-band index j across spatial streams represented by codeword index r values, the differences provide further beneficial compression for MIMO. The reference CQI is fed back with high CQI resolution (e.g., 4 or 5-bits), and the differential CQI is fed back with fewer bits (e.g., 2 or 3-bits) because of its smaller dynamic range.

Depending on the type of CQI, the differential CQI can be defined in several ways. For example, in a first way (1), if the CQI represents a quantized signal-to-noise ratio (SNR) or signal-to-interference+noise-ratio (SINR), differential CQI is defined, for instance, in terms of the difference between the CQI of interest relative to a reference CQI. The reference CQI is quantized and represented as a binary codeword. At the same time, the differential CQI is quantized and represented as a shorter binary codeword. The difference is taken before or after quantization.

Alternatively, in a second way (2), if the CQI represents some measure of (discrete) spectral efficiency (e.g. transport block size per RB, modulation and coding scheme, spectral efficiency), differential CQI is defined in terms of the difference in the indexing between the CQI of interest and the index of the reference CQI. Here, the term "indexing" refers to the index of a particular CQI value in a CQI table (e.g. the decimal equivalent of the binary codeword representation). Compared to the difference in the CQI value itself, the difference in CQI indexing is more suited in this case since the spacing in the spectral efficiency table need not be uniform.

Note that any codeword can serve as the reference codeword for performing spatial differential feedback. Moreover, the reference codeword is beneficially established as the codeword that minimizes the dynamic range of the differential CQI of other codewords. A smaller dynamic range in the spatial domain can lead to higher CQI feedback reliability, or reduce the number of bits in reporting differential CQI. In addition, different codewords or sub-bands in some embodiments are chosen as reference codewords or sub-bands for the CQI feedback purposes.

Any combination, variation, or generalization of different processes herein is suitably applied in the CQI feedback for MIMO OFDMA. The following Figures and description detail various embodiments for MIMO CQI feedback in the context of wideband CQI feedback, UE-selected or eNB selected feedback modes. Note that the description of some embodiments discusses two codewords R=2 without limitation since embodiments are suitably also applied in systems with more than two codewords R>2.

Figure 12:
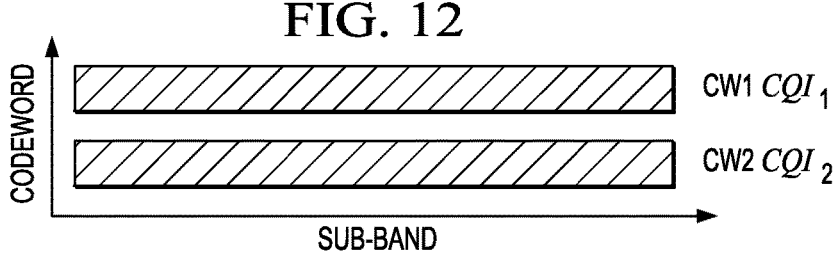

In FIG. 12, independent wideband CQI feedback for different spatial codewords feeds back a single wideband CQI for each of the codewords. The wideband CQI of each codeword has high CQI resolution (e.g., 4 or 5-bits).

Figure 13:
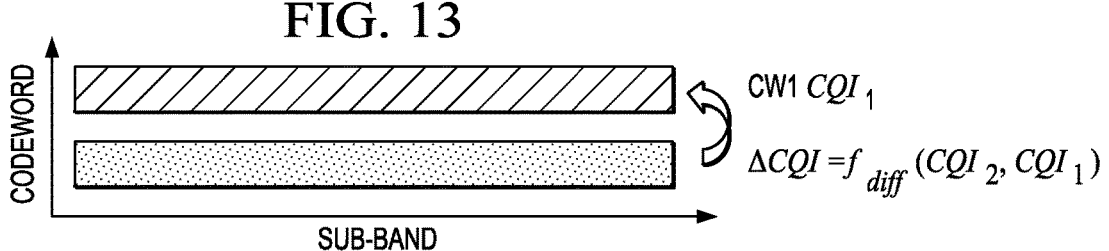

In FIG. 13, spatial differential feedback is used in wideband CQI feedback. The wideband CQI designated $CQI_1$ of the first codeword CW1 serves as the differential reference. $CQI_2$, the wideband CQI of the second codeword CW2, is encoded differentially and reported relative to $CQI_1$ for CW1. Fewer bits are suitably used in reporting differential CQI (e.g. 2 or 3 bits), where $\Delta CQI = f_{diff}(CQI_2, CQI_1)$.

Note that the difference function $f_{diff}(\ )$ is specified in different embodiments and implemented any of a variety of ways. For example, given two multibit values a and b, the difference function suitably rounds off the difference a minus b represented by $f_{diff}(a,b) = RND(a-b)$ Rounding RND is any appropriate rounding function such as one that rounds to the nearest value expressed in the fewer number of bits to be supported. Another form of difference function operates by using the values a and b as input values and performing a table lookup that outputs a table value to which the input values are mapped by the contents of the table. Depending on the form in which the CQI is expressed (decibels dB, ratio of signal power/noise power, index to the supportable modulation and coding schemes, index to the supportable spectral efficiency) the difference function can be chosen based on an exponential difference log[exp(a)−exp(b)] or an arithmetic difference a-b or some other difference mapping.

Three approaches for differential CQI report for MIMO-OFDMA system are categorized here:

1) Frequency differential CQI report only: In this case, differential CQI report is calculated only in the frequency domain, where CQI report for different codewords is performed independently. For each codeword, the subband CQI is encoded differentially with respect to a reference CQI (e.g., the medium/mean/wideband CQI of the same codeword). The reference CQI is reported with high resolution (e.g., 4-5 bits) and the subband differential CQI, which usually has a smaller dynamic range than the reference CQI, is suitably reported with lower resolution (e.g., 2-3 bits).

2) Spatial differential CQI report only: In this case, differential CQI report is calculated in the spatial domain. For instance, one codeword is selected as the reference codeword wherein its reference CQI value is reported with high resolution (e.g., 4 or 5 bits). Then CQI of the remaining spatial codewords is encoded differentially with respect to the reference CQI of the reference codeword and suitably reported with lower resolution (e.g., 2-3 bits). Note that spatial differential CQI can be computed for both subband CQI and/or wideband CQI, i.e., subband CQI is encoded differentially with respect to the subband CQI of the reference codeword, and/or wideband CQI is encoded differentially with respect to the wideband CQI of the reference codeword (spatial delta).

3) Hybrid frequency differential and spatial differential CQI report: a combination of the above two approaches is also possible, where differential CQI calculation is performed in both spatial and frequency domain. In this scheme, it is not precluded that some CQI identities (e.g., subband CQI for each codeword) are reported with frequency differential CQI report (e.g., encoded differentially with respect to the wideband CQI of the same codeword), and some other CQI identifies (e.g., wideband CQI of different codewords) are reported with spatial differential CQI report (e.g., encoded differentially with respect to the wideband CQI of a reference codeword).

In one form of SCW-CQI feedback, the wideband CQI is reported as the reference. CQI of each sub-band is encoded differentially with respect to the wideband CQI and reported to eNB. For MIMO CQI feedback with multiple codewords, several process and structure embodiments are provided here.

Figure 14:
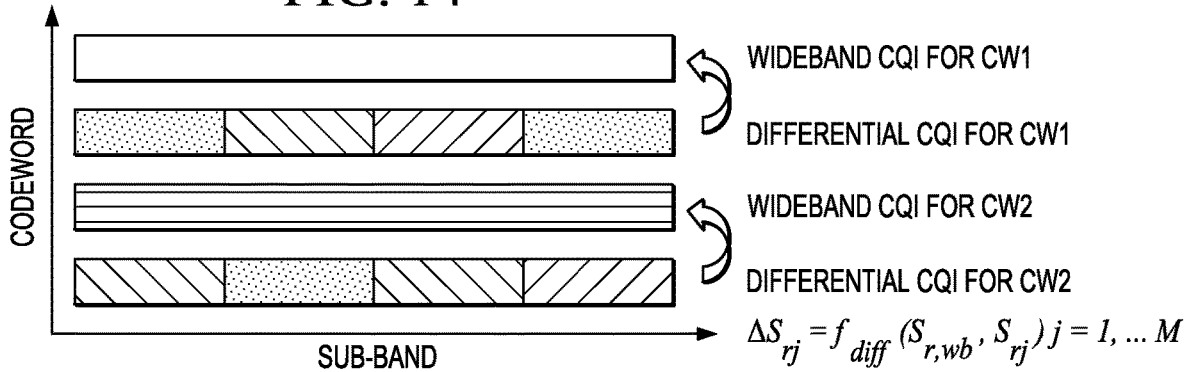

One category of embodiments for MIMO are entitled Spatial Differential CQI Reporting. In FIG. 14, each codeword computes its wideband CQI, where the wideband CQI of the r-th codeword is denoted by $S_{r,wb}$. Each wideband CQI is reported to eNB with high resolution (e.g., 4 or 5 bits). Then for the j-th sub-band of the r-th codeword, CQI $S_{rj}$ is encoded differentially with respect to the wideband CQI $S_{r,wb}$. The differential CQI $\Delta S_{rj} = f_{diff}(S_{r,wb}, S_{rj})$, j=1, . . . M, and r=1, . . . R, is reported to eNB, preferably with fewer bits (e.g., 2 or 3-bits).

It is believed that hitherto, CQI feedback methodology has responded to system constraints by applying the differential wideband CQI feedback approach of FIG. 13 as an alternative to subband-specific differential CQI feedback of FIG. 14 or FIG. 11, for instance. The wideband alternative of FIG. 13 provides a limited amount of CQI feedback on its own terms and thus gives an appearance of feedback bit-efficiency and sufficiency individually. Analogously, the alternative of FIG. 11 or 14 provides a more granular amount of CQI feedback on its own terms and thus gives an appearance of wider feedback coverage sufficiency individually. However, such alternative-process methodologies each insufficiently respond to the need for CQI feedback that is both highly efficient in terms of CQI feedback bits per subband per codeword and provides more extensive CQI feedback coverage of subbands and codewords.

Some of the embodiments herein solve this problem by recognizing that these hitherto alternatively-treated CQI feedback processes should not be treated as alternatives but instead as complementary parts of a comprehensive CQI reporting solution as taught herein. Accordingly, subband-specific CQI reporting in FIG. 15 delivers such a comprehensive CQI reporting solution combining complementary parts wherein subband-specific CQIs for a given codeword are encoded differentially relative to the wideband CQI or other reference CQI (mean, median, etc.) for that codeword, and the wideband CQI (or other reference CQI) for all but one of the codewords are encoded differentially relative to the wideband CQI (or other reference CQI) for the remaining codeword. In this way, both the bit-efficient feedback of differentially encoded wideband CQIs for the codewords and the bit-efficient feedback of differentially encoded subband-specific CQIs for the codewords complement one another in the FIG. 15 embodiment and other analogous embodiments herein to provide both enhanced bit-efficiency and more extensive CQI coverage of subbands and codewords for MIMO.

Figure 15:
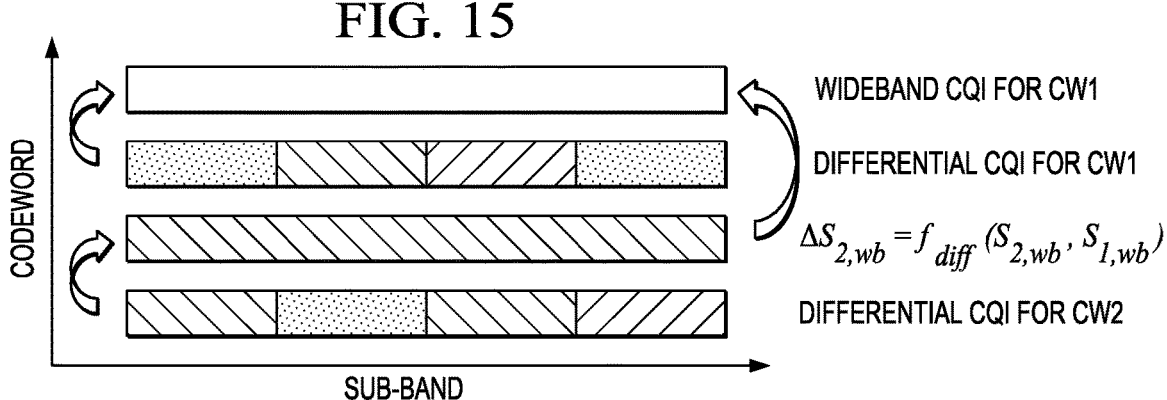

In FIG. 15, the wideband CQI of codeword 2 is encoded differentially relative to the wideband CQI of codeword 1 (CW1). In this embodiment, instead of feeding back the absolute value of wideband CQI $S_{2,wb}$, the process feeds back its spatial differential $\Delta S_{2,wb} = f_{diff}(S_{2,wb}, S_{1,wb})$ relative to the first codeword's wideband CQI $S_{1,wb}$. The all sub-band CQI of codeword 2 is reported differentially, after generating it using $S_{2,wb}$ itself as the reference. That frequency differential CQI $\Delta S_{rj} = f_{diff}(S_{r,wb}, S_{rj})$, j=1, ... M, is reported to eNB, with fewer bits, and is one example of a differential subbands CQI vector that is generated for each codeword r=2, ... R.

Figure 16:
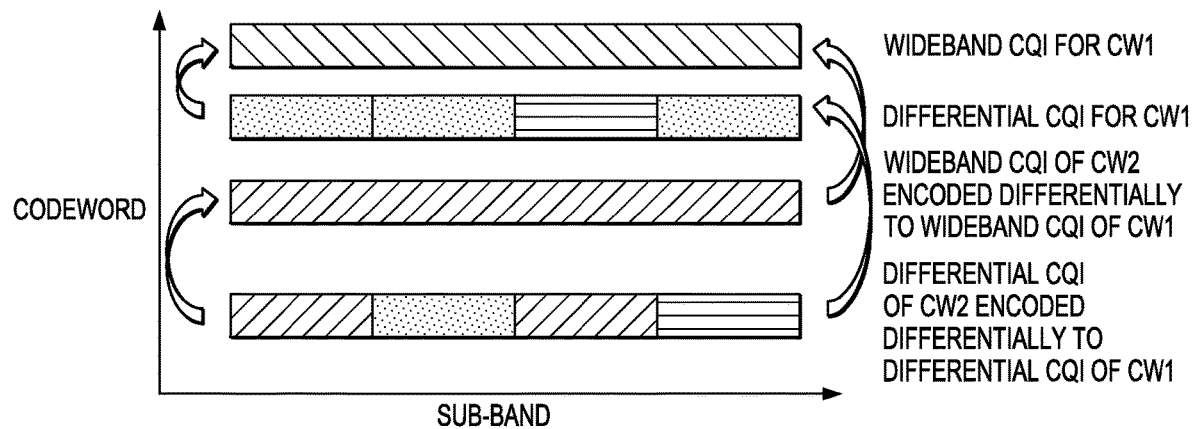

In FIG. 16, a process embodiment performs additional differential reporting between the differential CQI sequences of each codeword. For example, denote the differential CQI sequence of codeword 1 CW1 as $\{\Delta S_{11}, \Delta S_{12}, \ldots \Delta S_{1M}\}$, differential CQI sequence of codeword 2 as $\{\Delta S_{21}, \Delta S_{22}, \ldots \Delta S_{2M}\}$. Instead of feeding back $\{\Delta S_{21}, \Delta S_{22}, \ldots \Delta S_{2M}\}$, the process feeds back $f_{diff}(\{\Delta S_{21}, \Delta S_{22}, \ldots \Delta S_{2M}\}, \{\Delta S_{11}, \Delta S_{12}, \ldots \Delta S_{1M}\})$ or $f_{diff}(\Delta S_{2,j}, \Delta S_{1,j})$ where the subtraction of vectors between codewords is performed element-wise by subband j. This is one example of a spatial differential between a frequency differential subbands CQI vector and another frequency differential subbands CQI vector, wherein the differential between them is also called a Delta Delta herein.

Note that the definition of differential CQI can be the same or different for different differential quantities. Also, the difference function $f_{diff}()$ for computing the differential of the differential CQI in some embodiments can be specified differently than difference function $f_{diff}()$ for computing the differential CQIs for purposes of the subtraction of vectors. Note that "subtraction" refers to a suitably specified difference function for the element wise operation, and is not limited to particular definition of subtraction.

In FIG. 16, remarkably, wideband CQI of CW2 is encoded differentially to wideband CQI of CW1 and furthermore the frequency differential subbands CQI vector for CW2 is encoded spatially differentially to the frequency differential subbands CQI vector of CW1. Note that here the differential CQI sequence (in frequency domain) is computed over the sub-band CQI set S, e.g., that is semi-statically configured by higher layer to include all the sub-bands, or only a sub-set of the sub-bands in the system bandwidth.

Delta Delta ($\Delta\Delta$) is likely to have desirably reduced dynamic range compared to $\Delta S_{r,j}$ when there is substantial positive correlation between $\Delta S_{1,j}$ and $\Delta S_{2,j}$, for instance. Reduced dynamic range facilitates effective compression. Favorable UE geometry, high wideband SINR for all codewords, and favorable precoding matrix PM at eNB each contribute to a high positive correlation between $\Delta S_{1,j}$ and $\Delta S_{2,j}$ (i.e., correlation between differential CQIs for different codewords r). Accordingly, some embodiments operate eNB so that precoding matrix PM is checked or even optimized for delivery of favorable wideband SINR for all codewords. If favorable SINR is not achieved at a given MIMO rank R>1, then the rank R is decremented or otherwise reduced and precoding matrix PM is recomputed until favorable SINR is achieved at a lower MIMO rank or until the rank is reduced to one, R=1.

Figure 17:
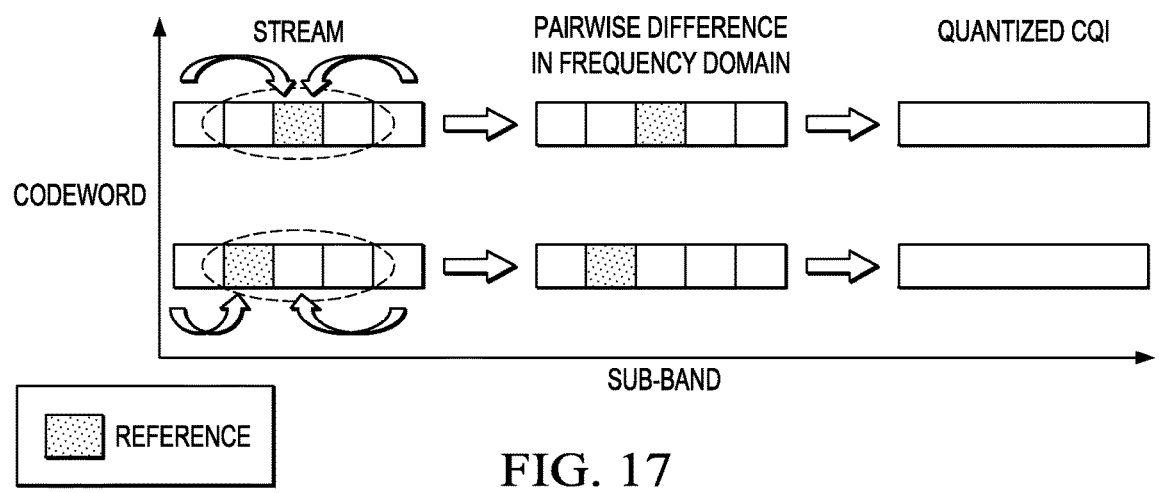

In FIG. 17, Frequency Differential Reporting, e.g., for eNB-configured or UE-configured CQI Reporting, performs quantization on each codeword independently. For the r-th codeword, the process selects the k-th sub-band as the reference, shown in contrasting color for each codeword or stream in FIG. 17. (Also, as illustrated, that k-th reference subband may vary as a function k(r) from codeword to codeword.) A determination of the reference subband for instance is that subband which has the CQI which most closely approximates the mean CQI or median CQI over all subbands for codeword r. Further, the process generates the pairwise differences $\Delta S_{rj} = f_{diff}(S_{rj}, S_{rk})$, j=1, ... M, between all other sub-bands CQI $S_{rj}$ in the frequency domain and the reference sub-band CQI $S_{rk}$ for each codeword so that r=1 ... R. The reference CQI $S_{rk}$ and its position k is quantized and reported as a quantized CQI with high resolution (e.g. 4 or 5-bits for CQI $S_{rk}$ and $\log_2 M$ bits for the position k), where the differential subbands CQI vector $\Delta S_{rj} = f_{diff}(S_{rj}, S_{rk})$ is quantized and reported to eNB using lower resolution (e.g., 2 or 3-bits). Note that in some embodiments the definition of differential CQI is the same for different differential quantities such that the specified definition is the same regardless of sub-band index j and given codeword r, and in some other embodiments the specified definition is different for one or more subbands j and/or one or more codewords r.

Figure 18:
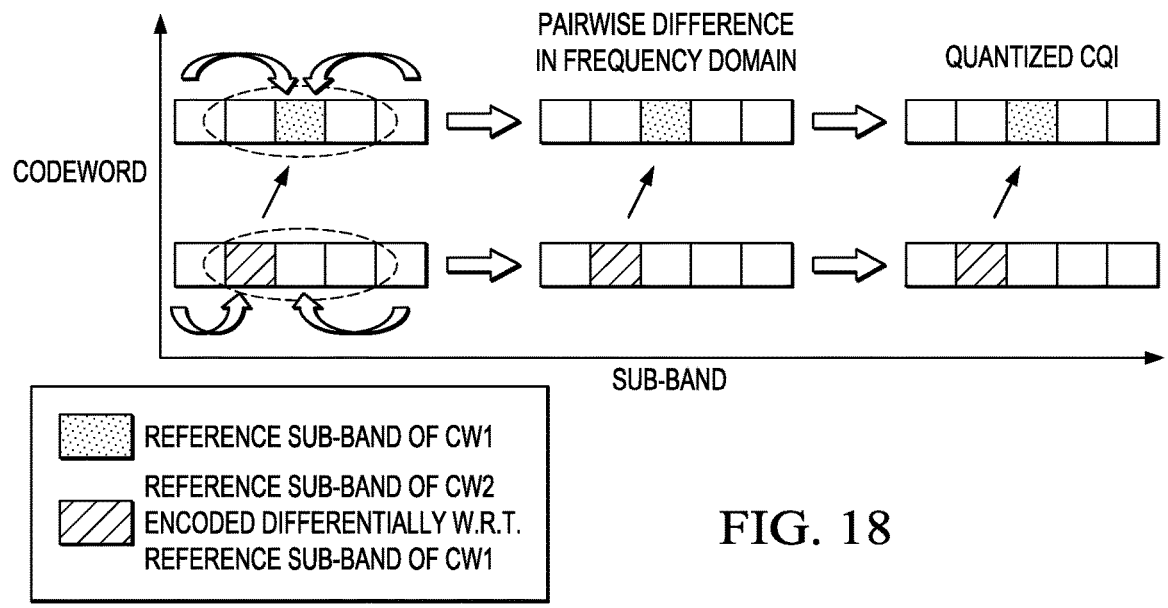

In FIG. 18, the CQI $S_{2,k}$ of the reference sub-band k of the second or higher codeword (r=2) is also spatially differentially encoded relative to the reference CQI $S_{1k}$ of codeword 1. This differential encoding is expressed by $\Delta S_{rk} = f_{diff}(S_{rk}, S_{1k})$, r=2 ... R. The process generates pairwise differences $\Delta S_{rj} = f_{diff}(S_{rj}, S_{rk})$, j=1, ... M, between all other sub-bands CQI $S_{rj}$ in the frequency domain and the reference sub-band CQI $S_{rk}$ for each codeword so that r=1 ... R. The reference CQI $S_{1k}$ and its position k is quantized and reported as a quantized CQI with high resolution (e.g. 4 or 5-bits for CQI $S_{1k}$ and 2 or 3-bits for the differential encoding $\Delta S_{rk} = f_{diff}(S_{rk}, S_{1k})$, r=2 ... R, and $\log_2 M$ bits for the position k(r), r=1 ... R), and further the differential subbands CQI vector $\Delta S_{rj} = f_{diff}(S_{rj}, S_{rk})$ is quantized and reported to eNB using lower resolution (e.g., 2 or 3-bits).

Figure 19:
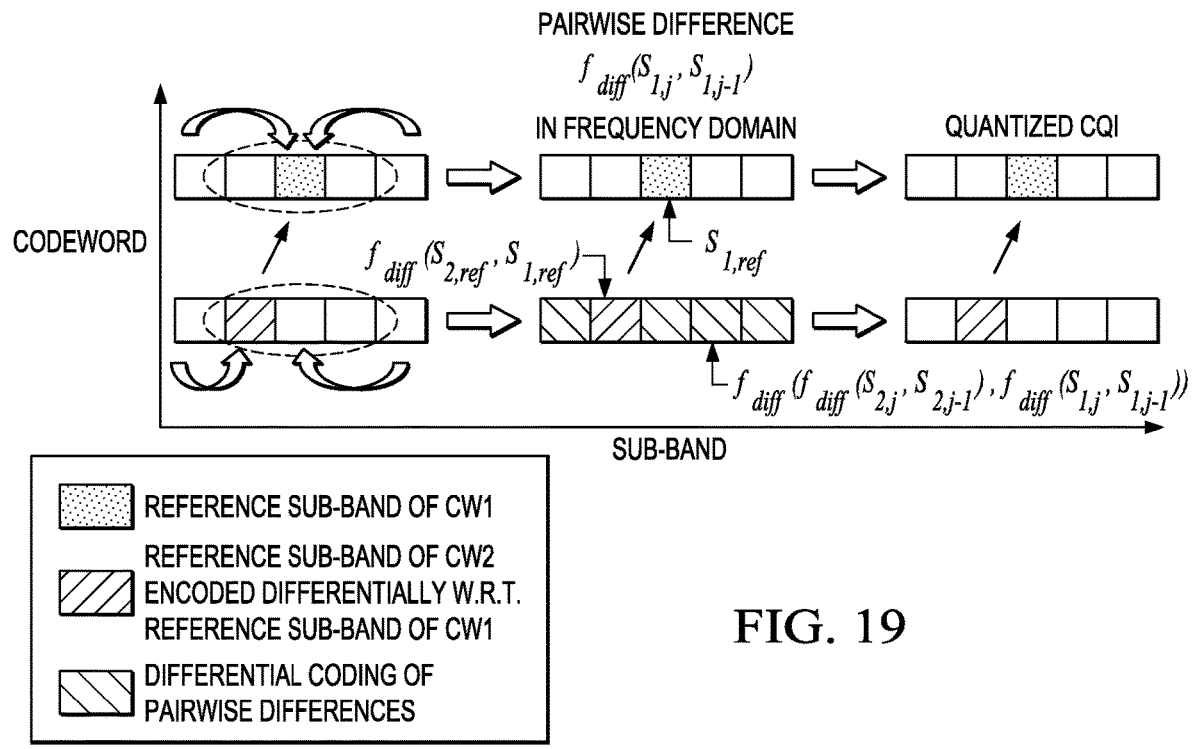

In FIG. 19, pairwise differences of the adjacent subbands for each codeword are generated by the CQI reporting process. The CQI $S_{2k}$ of the reference sub-band k of the second or higher codeword (r=2) is also differentially encoded relative to the reference CQI $S_{1k}$ of codeword 1. This differential encoding is expressed by $\Delta S_{rk} = f_{diff}(S_{rk}, S_{1k})$, r=2 . . . R and k(r) is the reference subband index ref of FIG. 19. The process generates pairwise differences of the adjacent subbands $\Delta S_{rj} = f_{diff}(S_{rj}, S_{r,j-1})$, j=2 . . . M, and r=1 . . . R. The reference CQI $S_{1k}$ and its position k is quantized and reported as a quantized CQI with high resolution (e.g. 4 or 5-bits for CQI $S_{1k}$ and 2 or 3-bits for the differential encoding $\Delta S_{rk} = f_{diff}(S_{rk}, S_{1k})$, r=2 . . . R, and $\log_2$ M bits for the position k(r), r=1, . . . R), and further the differential subbands CQI vector $\Delta S_{rj} = f_{diff}(S_{1j}, S_{1,j-1})$ is quantized for the first codeword CW1 and reported to eNB using lower resolution (e.g., 2 or 3-bits). A differential encoding of the differential CQI(s) (Delta Delta) is quantized for the second codeword CW2, and any other codewords CW3, etc. The Delta Delta is given by $\Delta\Delta S_{rj} = f_{diff}(f_{diff}(S_{rj}, S_{r,j-1}), =f_{diff}(S_{rj}, S_{r,j-1}))$ for j=2, . . . M, and r=2, . . . R. The Delta Delta is fed back for each higher codeword CW2, etc., using lower resolution (e.g., 2 or 3-bits).

Figure 20:
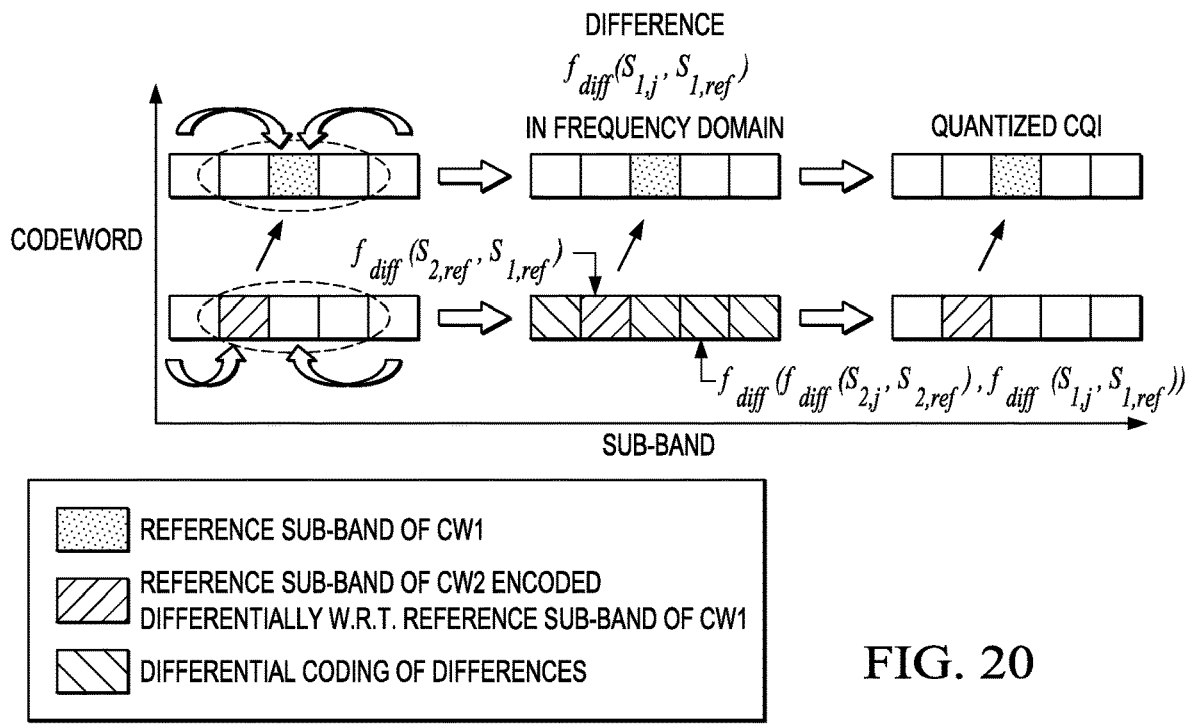

In FIG. 20, pairwise differences of the subbands relative to a reference for each codeword are generated by the CQI reporting process. The CQI $S_{2,k}$ of the reference sub-band k (or mean or median or wideband CQI) of the second or higher codeword (r=2) is also differentially encoded relative to the reference CQI $S_{1k}$ of codeword 1. This differential encoding is expressed by $\Delta S_{rk} = f_{diff}(S_{rk}, S_{1k})$, r=2 . . . R and k(r) is the reference subband index ref of FIG. 20. The process generates pairwise differences of the subbands relative to the reference $\Delta S_{rj} = f_{diff}(S_{rj}, S_{rk})$, j=1, . . . M, and r=1 . . . R. The reference CQI $S_{1k}$ and its position k is quantized and reported as a quantized CQI with high resolution (e.g. 4 or 5-bits for CQI $S_{1k}$ and 2 or 3-bits for the differential encoding $\Delta S_{rk} = f_{diff}(S_{rk}, S_{1k})$, r=2 . . . R, and $\log_2$ M bits for the position k(r), r=1, . . . R), and further the differential subbands CQI vector $\Delta S_{rj} = f_{diff}(S_{1j}, S_{1k})$ is quantized for the first codeword CW1 and reported to eNB using lower resolution (e.g., 2 or 3-bits). A differential encoding of the differential CQI(s) (Delta Delta) is quantized for the second codeword CW2, and any other codewords CW3, etc. The Delta Delta is represented by the expression $\Delta\Delta S_{rj} = f_{diff}(f_{diff}(S_{rj}, S_{rk}), =f_{diff}(S_{1j}, S_{1k}))$ for j= . . . M, and r=2, . . . R. The Delta Delta is fed back for each higher codeword CW2, etc., using lower resolution (e.g., 2 or 3-bits).

In this section, several embodiments of UE-selected CQI reporting for MIMO-OFDMA systems are described wherein selected subbands are identified.

Figure 21:
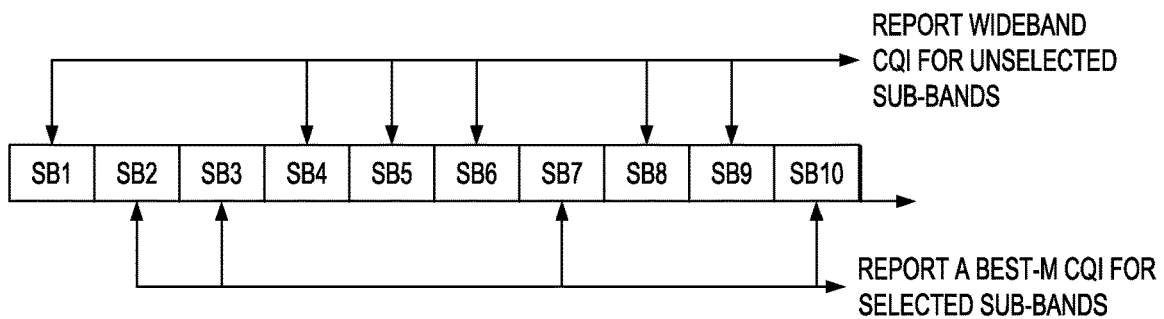
FIGS. 21, 22, 23 are each a diagram of subbands in the frequency domain, where

In FIG. 21, a hypothetical illustration of 10 subbands for a codeword CW1 shows application of a criterion that selects subbands SB 2, 3, 7, 10 and reports a $CQI_{r,best-m}$ for those subbands collectively. A wideband CQI is reported for the unselected subbands SB 1, 4-6, 8-9 collectively.

Figure 22:
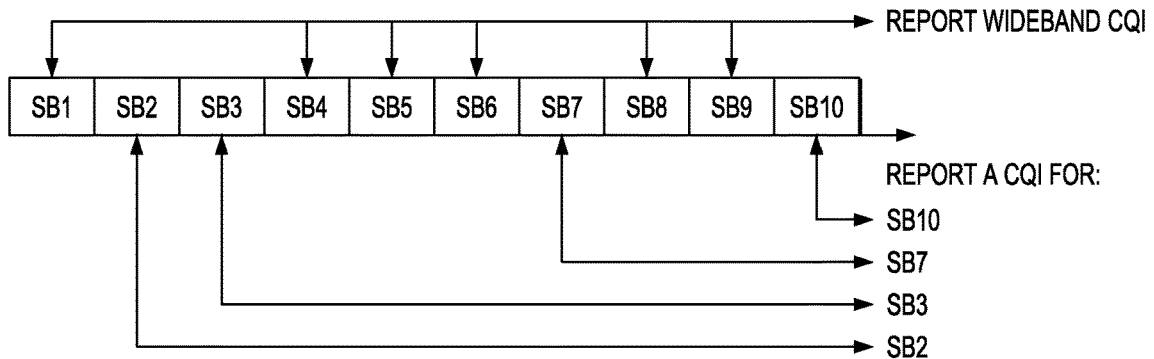

In FIG. 22, a hypothetical illustration of 10 subbands for a codeword CW1 shows application of a criterion that selects subbands SB 2, 3, 7, 10 and reports a $CQI_{r,j(SV(j)=1)}$ for those subbands individually. A wideband CQI is reported for the unselected subbands SB 1, 4-6, 8-9 collectively.

Figure 23:
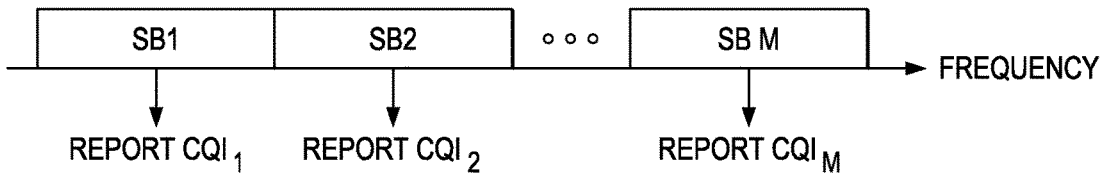

In FIG. 23, a process for CQI reporting individually reports the CQI for each subband or selected subband in order of its frequency or in accordance with a configured scanning pattern, see, e.g., FIGS. 30-35.

In a category of embodiments called Joint Sub-band Selection on different codewords, the same set of sub-bands is selected for CQI reporting each of the codewords. The A-suffixed FIGS. 24A-31A each depict Joint Sub-band Selection on different codewords for respective embodiments. Because different codewords select the same set of sub-bands, a single indication of their position suffices for all codewords. Selection of a sub-band is based on a performance metric defined over all codewords, and the result of the selection is represented by SV(j)=1 if a given subband j is selected and otherwise SV(j)=0. Alternatively, the location of the m selected subbands is jointly reported using compressed label using $\log_2(C_M^m)$ bits. Some examples of different implementations for the performance metric are 1) maximizing the sum throughput, summed over all codewords, 2) maximizing the arithmetic/exponential average CQI over all codewords, 3) maximizing the mean CQI over all codewords, and 4) minimizing the difference between CQIs of different codewords.

One category of embodiments involves Independent Subband Selection on different codewords as in B-suffixed FIGS. 24B-31B. For each codeword, the process performs sub-band selection independently. For the r-th codeword (r=1, . . . R), the m sub-bands are selected using a selection criterion. The selection criterion is suitably based on the optimization of a given performance metric, for example, the maximum SINR, the maximum CQI, the maximum mutual information, or the minimization of a distance measure to a specific performance (SINR, capacity) constraint. Selection of a sub-band is based on the results of applying the given performance metric, and the selection is represented by SV(r, j)=1 if a particular subband j is one of the selected subband(s) for codeword r and otherwise SV(r, j)=0. Alternatively, the location of the m selected subbands is jointly reported using compressed label using $\log_2(C_M^m)$ bits. The number m of selected m sub-bands is fixed, semi-statically configured or dynamically configured, depending on embodiment and any dynamically changing bandwidth requirements. The number m of selected sub-bands m, is the same number for all codewords for simplicity, but some embodiments can vary the number m(r) to be different for some or all codewords. Each different codeword r potentially has different subband positions j of its selected sub-bands. Accordingly, the reporting process for each codeword feeds back the indication of the position of the associated selected sub-bands respectively, see subband vector SV(r,j) of FIG. 7 and FIG. 43.

After UE selects the set of sub-bands on each codeword, sub-band CQI reporting is performed according to any one or more of the following embodiments. An embodiment designated Best-m Average is described as follows. For the r-th codeword (r=1, 2 . . . R), two CQI values are computed. $CQ_{r,wb}$ corresponds to the wideband/mean/medium CQI of codeword r and is reported to eNB with high resolution. $CQI_{r,best-m}$ is measured or generated as CQI based on transmission only over the m selected sub-bands as a whole. Or $CQI_{r,best-m}$ can be computed using a collective measure such as the arithmetic average, or the exponential average, or the mean, or the maximum or minimum, of the CQIs of the m selected sub-bands of the r-th codeword. In terms of feeding back $CQI_{r,best-m}$, either its absolute value can be reported as in FIG. 21 or its frequency difference relative to the wideband CQI ($\Delta CQI_r = f_{diff}(CQI_{r,best-m}, CQI_{r,wb})$) in Joint Sub-band Selection FIG. 24A and Independent Sub-band Selection FIG. 24B can be reported. Note that the definition of differential CQI could be the same or different for different differential quantities.

Figure 24A:
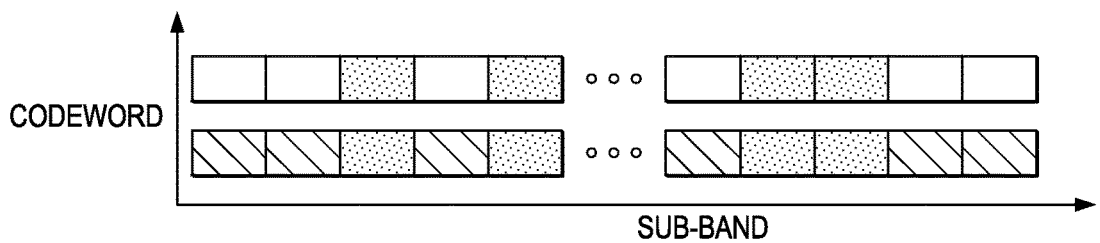
Figure 24B:
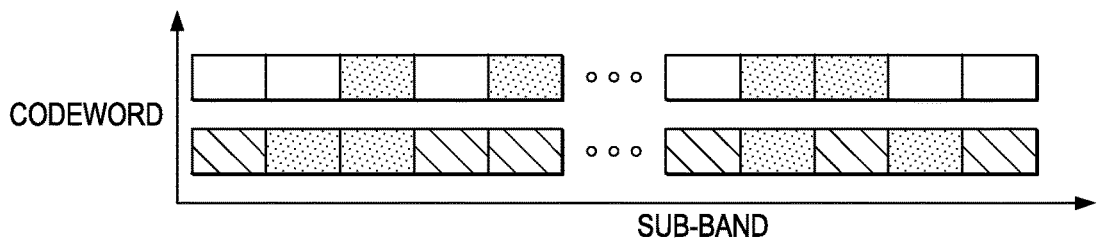

In the case of Independent Sub-Band Selection, the process for different codewords can choose different sub-bands, therefore an indication of the positions SV(r,j) of the selected sub-bands is reported for each codeword, e.g., FIG. 24A, FIG. 7 and FIG. 43. On the other hand, when a process embodiment for different codewords chooses the same set of sub-bands, then one vector indicating the positions SV(j) of the selected sub-bands is reported, e.g., in FIG. 24B, FIG. 7 and FIG. 43.

A type of Best-m Average embodiment also performs additional CQI quantization in spatial domain. As an example, the wideband CQI of codeword 2 $CQI_{2,wb}$ is encoded differentially with respect to the wideband CQI of codeword 1 ($CQI_{1,wb}$), hence further reduces the reporting overhead. The CQI $S_{2,wb}$ of the wideband CQI of the second or higher codeword (r=2) is thus differentially encoded relative to the wideband CQI $S_{1,wb}$ of codeword 1. This differential encoding is expressed by $\Delta S_{r,wb} = f_{diff}(S_{r,wb}, S_{1,wb})$, r=2 . . . R and wb is the wideband CQI of FIGS. 24A and 24B. Note that the definition of differential CQI can be specified the same or different for different differential quantities. Similarly, different codewords can perform sub-bands selection independently and choose different sub-bands (e.g. FIG. 24B), or perform sub-bands selection jointly and choose the same sub-bands (e.g., FIG. 24A). In the Independent case, a respective indication SV(r,j) of the positions of the sub-bands selected is reported for each codeword by operations in FIG. 7. For the Joint case one vector SV(j) indicating the best m sub-bands position is reported common to all codewords by operations in FIG. 7.

Figure 25A:
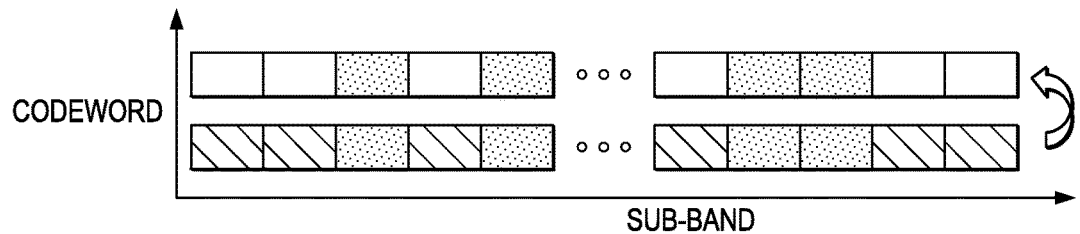
FIGS. 25A and 25B are each a diagram of subbands in the frequency domain for different codewords showing Best-m frequency differential average CQI reporting relative to a wideband CQI for the first codeword, spatially differentially encoded frequency differential CQI for a second codeword (Delta Delta) relative to the frequency differential CQI for the first codeword, and wideband CQI reporting for unselected subbands spatially differentially encoded across codewords, and in FIG. 25A the selected (Best-m) subbands have the same subband indices across codewords, and in FIG. 25B the selected (Best-m) subbands have different subband indices when compared across codewords.
Figure 25B:
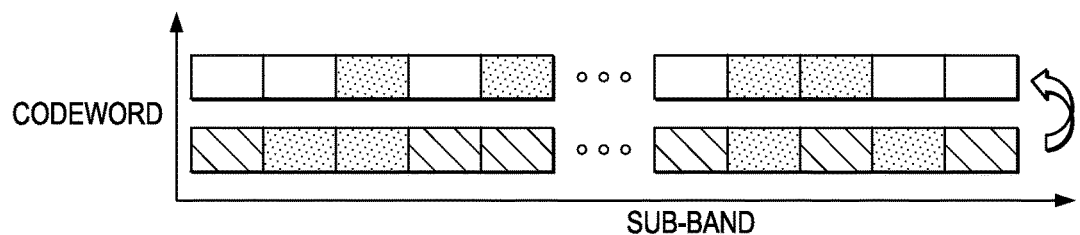

In FIGS. 25A and 25B, a spatial differential encoding of the frequency differential CQI(s) (Delta Delta) is quantized for the second codeword CW2, and any other codewords CW3, etc. The Delta Delta is given by $\Delta\Delta S_r = f_{diff}(f_{diff}(S_{r,best-m}, S_{r,wb}), = f_{diff}(S_{1,best-m}, S_{1,wb}))$ for r=2, . . . R. The Delta Delta is fed back for each higher codeword CW2, etc., using lower resolution (e.g., 2 or 3-bits). The report includes wideband CQI $S_{1,wb}$ (e.g., 4-5 bits) and differential encoding $f_{diff}(S_{1,best-m}, S_{1,wb})$ (e.g., 2-3 bits) for CW1. Also reporting for each higher codeword has differential encoding $\Delta S_{r,wb} = f_{diff}(S_{r,wb}, S_{1,wb})$, r=2 . . . R using lower resolution (e.g., 2-3 bits), and Delta Delta $\Delta\Delta S_r = f_{diff}(f_{diff}(S_{r,best-m}, S_{r,wb}), = f_{diff}(S_{1,best-m}, S_{1,wb}))$ for r=2 . . . R using lower resolution (e.g., 2-3 bits). Joint Sub-band Selection in FIG. 25A or Independent Sub-band Selection FIG. 25B can be reported. In the Independent case, a respective indication SV(r,j) of the positions of the sub-bands selected is reported for each codeword by operations in FIG. 7, whereas for the Joint case only one indication SV(j) of the sub-bands position is reported common to all codewords by FIG. 7 operations. Note that the definition of differential CQI is specified the same or different for different differential quantities.

Another category of embodiments called Best-m Individual Reporting of FIGS. 26A-28B, 30A/30B,31B differs from Best-m Average of FIGS. 24A-25B. In Best-m Individual Reporting, one CQI is fed back for each selected sub-band as in FIG. 22, instead of feeding back a Best-m average CQI for all m selected sub-bands as in FIG. 21. In Best-m Individual Reporting, first, a wideband CQI is reported to eNB with high resolution. Then the process feeds back the individual CQI of each selected sub-band, either the absolute value (actual value without differencing) or its differential value relative to the wideband CQI. An indication of the position of the m selected sub-bands is sent to eNB as well. Note that the definition of differential CQI is specified the same or different for different differential quantities. Similarly, different codewords can perform sub-bands selection independently and choose different sub-bands (e.g., B-suffixed FIGS. 26B-31B), or perform sub-bands selection jointly and choose the same sub-bands (e.g., A-suffixed FIGS. 26A-31A).

Figure 26A:
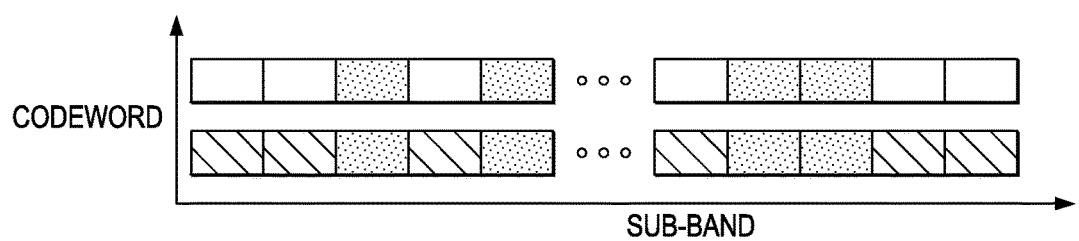
FIGS. 26A and 26B are each a diagram of subbands in the frequency domain for different codewords showing Best-m individual frequency differential CQI reporting for selected subbands relative to an wideband CQI, and wideband CQI reporting for unselected subbands by codeword, and in FIG. 26A the selected (Best-m) subbands have the same subband indices across codewords, and in FIG. 26B the selected (Best-m) subbands have different subband indices when compared across codewords.
Figure 26B:
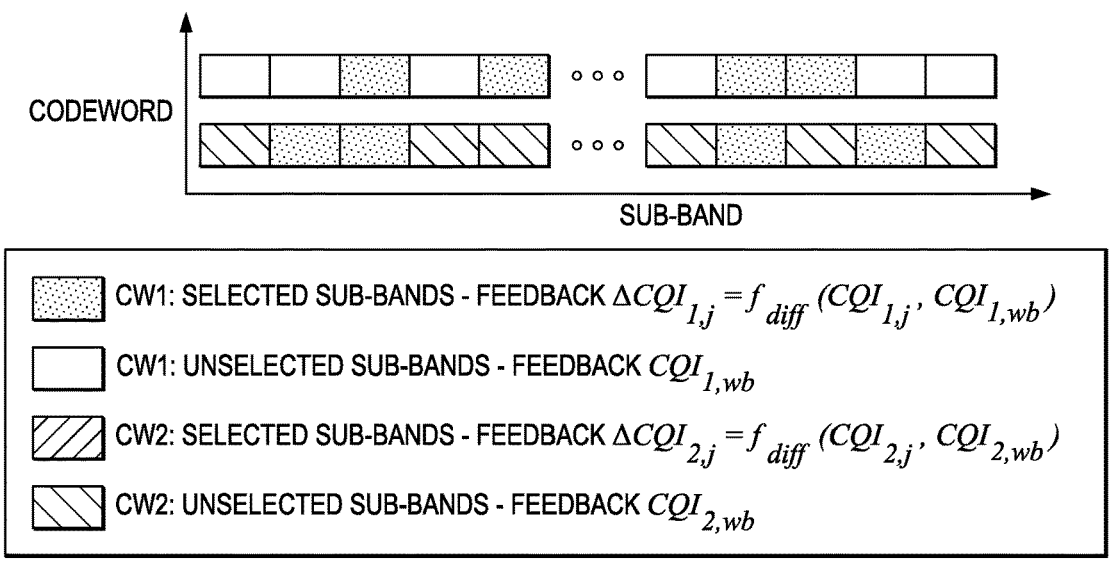

Best-m Individual Reporting of FIGS. 26A-26B feeds back individual differential CQIs designated $\Delta S_{r,j} = f_{diff}(S_{r,j}, S_{r,wb})$, r=1 . . . R using lower resolution (e.g., 2-3 bits) for each selected subband j in the Best-m set for each codeword CW1, CW2, etc. Reporting for the unselected subbands is less numerous and provided as wideband $CQI_{r,wb}$, $CQI_{r,wb}$, etc. at higher resolution (e.g., 4-5 bits) for unselected subbands for each codeword CW1, CW2, etc.

Figure 27A:
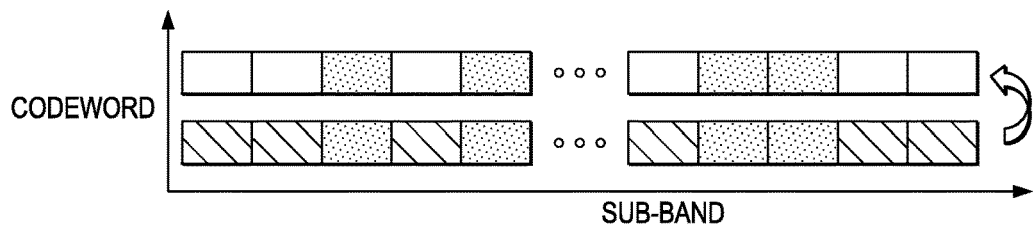
FIGS. 27A and 27B are each a diagram of subbands in the frequency domain for different codewords showing Best-m individual frequency differential CQI reporting for selected subbands relative to an wideband CQI, and wideband CQI reporting for unselected subbands spatially differentially encoded across codewords, and in FIG. 27A the selected (Best-m) subbands have the same subband indices across codewords, and in FIG. 27B the selected (Best-m) subbands have different subband indices when compared across codewords.
Figure 27B:
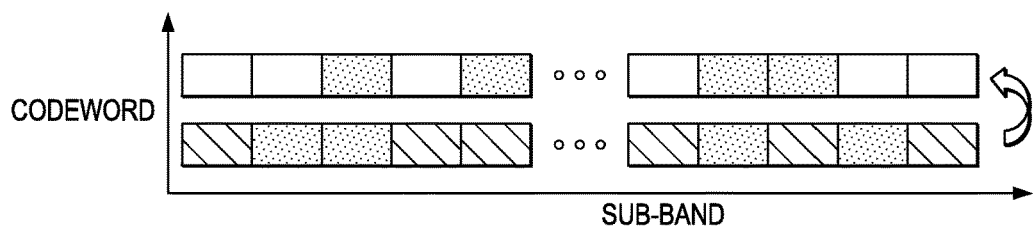
Figure 27B:
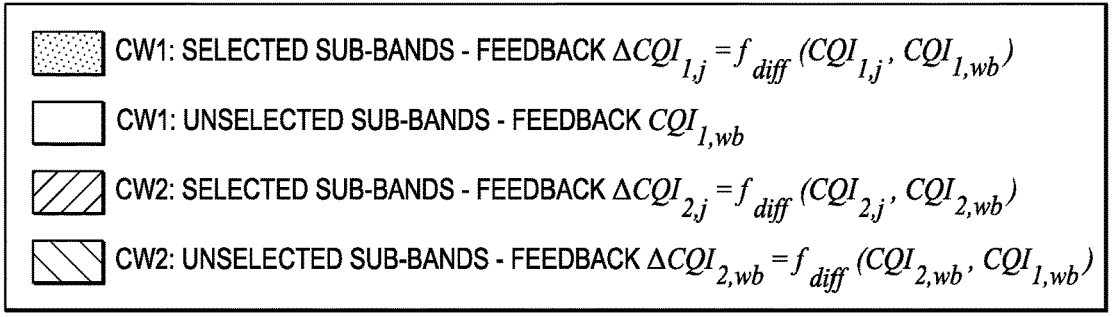

In FIGS. 27A and 27B, Best-m Individual embodiments also perform additional CQI quantization in spatial domain. Best-m Individual Reporting here feeds back individual differential CQIs designated $\Delta S_{r,j} = f_{diff}(S_{r,j}, S_{r,wb})$, r=1 . . . R using lower resolution (e.g., 2-3 bits) for each selected subband j in the Best-m set for each codeword CW1, CW2, etc. Reporting for the unselected subbands is less numerous and provided for first codeword CW1 as wideband $CQI_{r,wb}$, at higher resolution (e.g., 4-5 bits) for unselected subbands for codeword CW1. Wideband $CQI_{r,wb}$ of unselected subbands for codewords r=2, . . . M is encoded spatially differentially with respect to the wideband $CQI_{r,wb}$ of codeword CW1, and sent back using fewer bits (e.g., 2-3 bits/codeword) and hence further reduces the feedback overhead. This differential encoding is expressed by $\Delta CQI_{r,wb} = f_{diff}(CQI_{r,wb}, CQI_{r,wb})$, r=2 . . . R and wb is the wideband CQI of FIGS. 27A and 27B. Note that the definition of differential CQI is specified the same or different for different differential quantities. Similarly, different codewords can perform sub-bands selection independently and choose different sub-bands (e.g. FIG. 27B), or perform sub-bands selection jointly and choose the same sub-bands (e.g., FIG. 27A). In the Independent case, a respective indication SV(r,j) of the positions of the sub-bands selected is reported for each codeword by operations in FIG. 7. For the Joint case only one indication SV(j) of the best nm sub-bands position is reported common to all codewords is reported for each codeword by operations in FIG. 7.

Figure 28A:
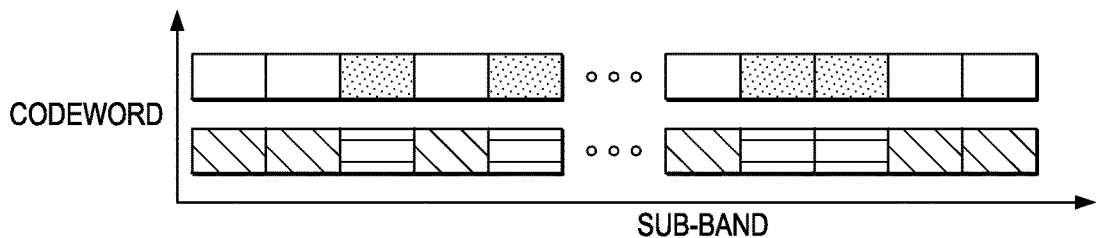
FIGS. 28A and 28B are each a diagram of subbands in the frequency domain for different codewords showing Best-m individual frequency differential CQI reporting for selected subbands relative to an wideband CQI for the first codeword (Delta), individual spatial differential CQI for selected subbands of a second codeword relative to the individual CQI for the selected subbands of the first codeword (spatial Delta), and wideband CQI reporting for unselected subbands spatially differentially encoded across codewords, and in FIG. 28A the selected (Best-m) subbands have the same subband indices across codewords, and in FIG. 28B the selected (Best-m) subbands have different subband indices when compared across codewords.
Figure 28B:
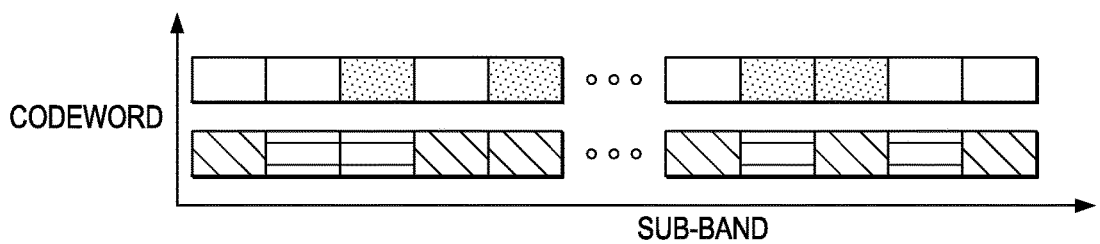
Figure 28B:
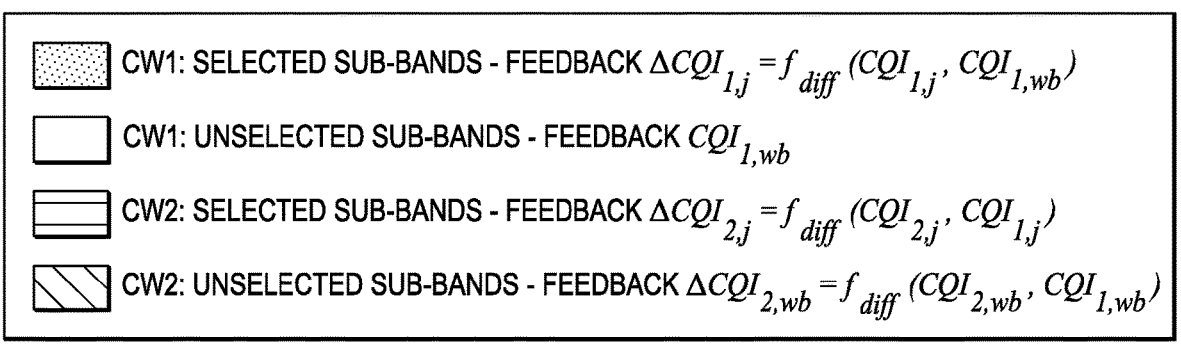

In FIGS. 28A and 28B, Best-m Individual embodiments perform still further additional CQI quantization in spatial domain. Best-m Individual Reporting here feeds back individual differential CQIs designated $\Delta CQI_{r,j} = f_{diff}(CQI_{r,j}, CQI_{r,wb})$, for codeword CW1 using lower resolution (e.g., 2-3 bits) for each selected subband j in the Best-m set for codeword CW1. For the higher codewords, however, Best-m Individual Reporting here feeds back individual spatial cross-differential CQIs designated $\Delta CQI_{r,j} = f_{diff}(CQI_{r,j}, CQI_{r,j})$, using lower resolution (e.g., 2-3 bits) for each selected subband j in the Best-m set for each codeword CW2, etc. Reporting for the unselected subbands is less numerous and provided for first codeword CW1 as wideband $CQI_{r,wb}$, at higher resolution (e.g., 4-5 bits) for unselected subbands for codeword CW1. Wideband $CQI_{r,wb}$ of unselected subbands for codewords r=2, . . . M is encoded differentially with respect to the wideband $CQI_{r,wb}$ of codeword CW1, and sent back using fewer bits (e.g., 2-3 bits/codeword) and hence keeps the feedback overhead down. This differential encoding is expressed by $\Delta CQI_{r,wb} = f_{diff}(CQI_{r,wb}, CQI_{r,wb})$, r=2 . . . R and wb is the wideband CQI of FIGS. 28A and 28B.

In FIGS. 28A and 28B, Best-m Individual with Spatial Differential Reporting embodiments perform spatial cross-differential CQI reporting in conjunction with Best-m individual reporting. The wideband CQI of codeword 2 is fed back differentially relative to the wideband CQI of codeword 1, reporting $\Delta CQI_{r,wb} = f_{diff}(CQI_{r,wb}, CQI_{r,wb})$. Moreover, the individual CQI of the selected m sub-bands of codeword 2 is encoded differentially with respect to the individual CQI of the m sub-bands of codeword 1, i.e., individual spatial cross-differential CQIs. Note that the definition of differential CQI is specified the same or different for different differential quantities. Similarly, different codewords can perform sub-bands selection independently and choose different sub-bands (e.g. FIG. 28B), or perform sub-bands selection jointly and choose the same sub-bands (e.g., FIG. 28A). In the Independent case, a respective indication SV(r,j) of the positions of the sub-bands selected is reported for each codeword by operations in FIG. 7. For the Joint case only one indication SV(j) of the best m sub-bands position is reported common to all codewords is reported for each codeword by operations in FIG. 7.

Figure 31A:
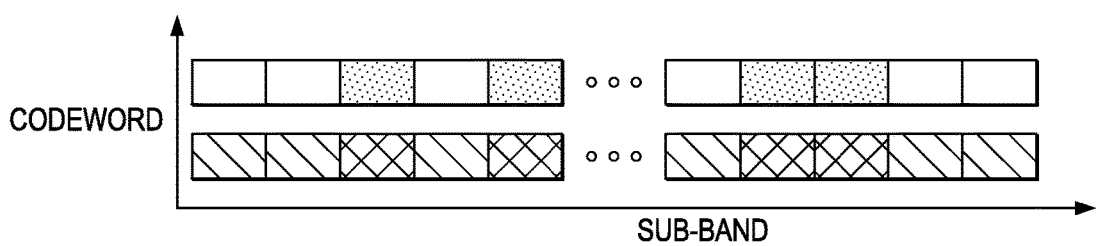
Figure 31B:
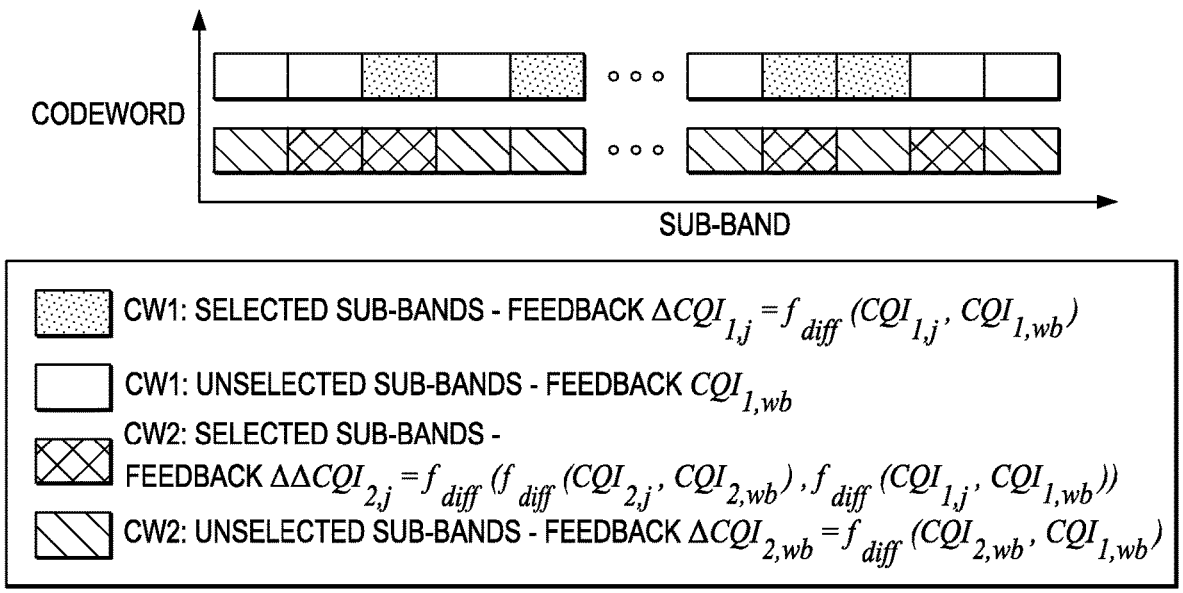

In FIGS. 31A and 31B, a differential encoding of the differential CQI(s) (Delta Delta) is quantized for the second codeword CW2, and any other codewords CW3, etc. The Delta Delta is given by $\Delta\Delta CQI_r = f_{diff}(f_{diff}(CQI_{r,j}, CQI_{r,wb}), f_{diff}(CQI_{r,j}, CQI_{r,wb}))$ for $r=2, \ldots R$. The Delta Delta is fed back for each higher codeword CW2, etc., using lower resolution (e.g., 2 or 3-bits). The report includes wideband CQI designated $CQI_{r,wb}$ (e.g., 4-5 bits) and differential encoding $f_{diff}(CQI_{r,j}, CQI_{r,wb})$ (e.g., 2-3 bits per Best-m subband) for CW1. Also reporting for each higher codeword has differential encoding $\Delta S_{r,wb} = f_{diff}(S_{r,wb}, S_{1,wb})$, $r=2 \ldots R$ for unselected subbands using lower resolution (e.g., 2-3 bits). Further, the Delta Delta for selected subbands j is fed back as $\Delta\Delta CQI_r = f_{diff}(f_{diff}(CQI_{r,j}, CQI_{r,wb}), f_{diff}(CQI_{r,j}, CQI_{r,wb}))$ for $r=2, \ldots R$ using lower resolution (e.g., 2-3 bits). Joint Sub-band Selection in FIG. 31A or Independent Sub-band Selection FIG. 31B can be reported. In the Independent case, a respective indication SV(r,j) of the positions of the sub-bands selected is reported for each codeword by operations in FIG. 7. For the Joint case only one indication SV(j) of the best nm sub-bands position is reported common to all codewords is reported for each codeword by operations in FIG. 7. Note that the definition of differential CQI is specified the same or different for different differential quantities.

Figure 29A:
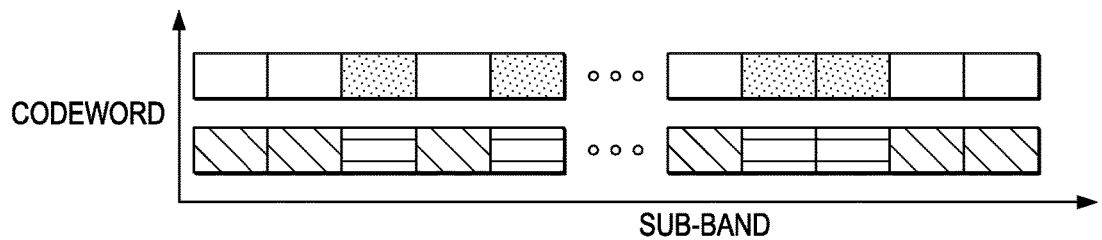
FIGS. 29A and 29B are each a diagram of subbands in the frequency domain for different codewords, showing wideband CQI report for unselected subbands of the first codeword, wideband CQI report for unselected subbands of the second codeword encoded spatially differentially with respect to the wideband CQI of the first codeword (spatial delta), best-m average CQI report for selected subbands of the first codeword, and best-m average CQI report for selected subbands of the second codeword encoded spatially differentially with respect to the best-m average CQI of the first codeword (spatial delta), and in FIG. 29A where the selected (best-m) subbands have the same subband indices across codewords, and in FIG. 29B where the selected (best-m) subbands have different subband indices when compared across codewords.
Figure 29B:
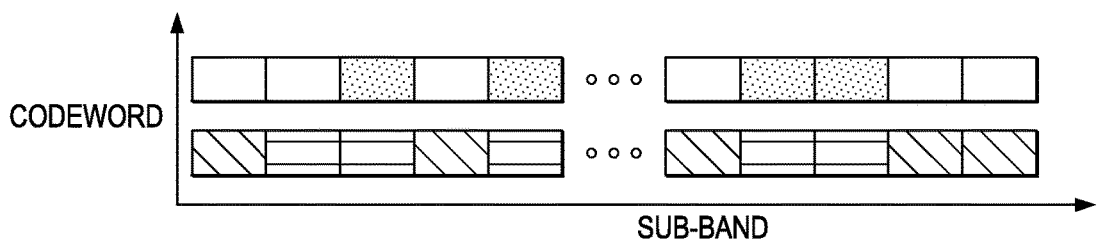
Figure 30A:
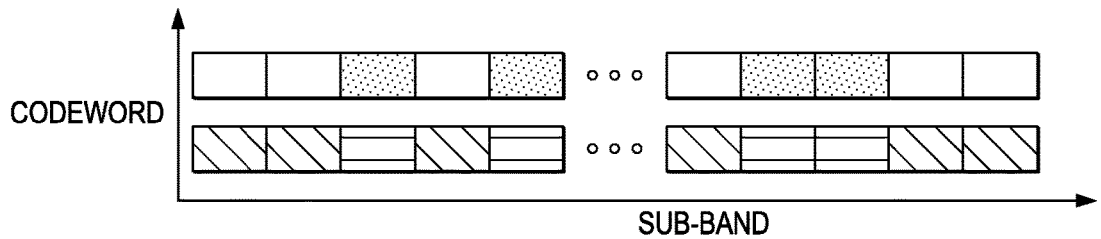
FIGS. 30A and 30B are each a diagram of subbands in the frequency domain for different codewords, showing wideband CQI report for unselected subbands of the first codeword, wideband CQI report for unselected subbands of the second codeword encoded spatially differentially with respect to the wideband CQI of the first codeword (spatial delta), Best-m individual CQI report for each of the selected subbands of the first codeword, and Best-m individual CQI report for each of the selected subbands of the second codeword encoded spatially differentially with respect to the Best-m individual CQI of the corresponding subband of the first codeword (spatial delta), and in FIG. 30A where the selected (Best-m) subbands have the same subband indices across codewords, and in FIG. 30B where the selected (Best-m) subbands have different subband indices when compared across codewords.
Figure 30B:
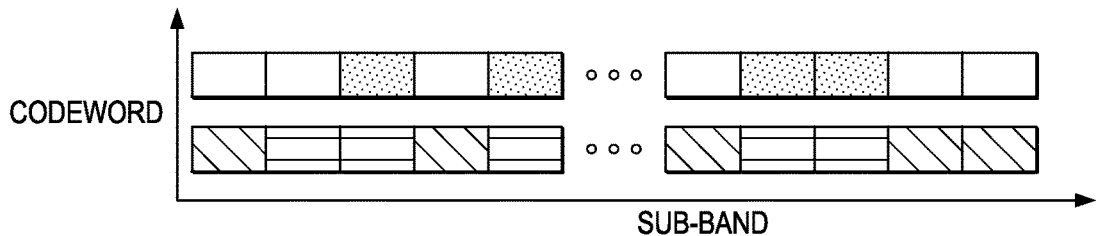

Another category of embodiments performs spatial differential CQI quantization without frequency CQI quantization, where an example is given in FIGS. 29A-29B for UE-selected (best-m) average and FIGS. 30A-30B for UE-selected (best-m) individual reporting.

FIGS. 29A-29B are examples of best-m UE-selected average CQI report with spatial differential quantization and without frequency-domain quantization. In brief, spatial differential reporting is performed between the wideband CQIs of different codewords, and between the best-m average CQI (UE-selected) between different codewords, preferably using fewer bits (e.g., 2-3 bits). In addition, the wideband CQI and best-m average CQI (UE-selected) of the reference codeword is also fed back with high resolution (e.g. 4-5 bits). For instance, consider a MIMO-OFDMA system with two spatial codewords. FIGS. 29A and 29B are each a diagram of subbands in the frequency domain for different codewords, showing wideband CQI report for unselected subbands of the first codeword, wideband CQI report for unselected subbands of the second codeword encoded differentially with respect to the wideband CQI of the first codeword (spatial delta), best-m average CQI report for selected subbands of the first codeword, and best-m average CQI report for selected subbands of the second codeword encoded differentially with respect to the best-m average CQI of the first codeword (spatial delta), and in FIG. 29A where the selected (best-m) subbands have the same subband indices across codewords, and in FIG. 29B where the selected (best-m) subbands have different subband indices when compared across codewords.

Note that in FIGS. 29A-29B no frequency differential CQI compression is performed. However it is not precluded to perform additional frequency differential CQI compression, for example by reporting the best-m average CQI of the selected subbands of the first codeword encoded differentially with respect to the wideband CQI of the first codeword. Similarly, such frequency differential CQI report can also be applied to the remaining codeword ($r=2, \ldots R$).

FIGS. 30A-30B are examples of best-m UE-selected individual CQI report with spatial differential quantization and without frequency-domain quantization. In brief, spatial differential reporting is performed between the wideband CQIs of different codewords, and between the best-m individual CQI (UE-selected) for each of the selected subband between different codewords, preferably using fewer bits (e.g., 2-3 bits). In addition, the wideband CQI and best-m individual CQI (UE-selected) for each of the selected subbands of the reference codeword is also fed back with high resolution (e.g. 4-5 bits). For instance, consider a MIMO-OFDMA system with two spatial codewords, FIGS. 30A and 30B are each a diagram of subbands in the frequency domain for different codewords, showing wideband CQI report for unselected subbands of the first codeword, wideband CQI report for unselected subbands of the second codeword encoded differentially with respect to the wideband CQI of the first codeword (spatial delta), Best-m individual CQI report for each of the selected subbands of the first codeword, and Best-m individual CQI report for each of the selected subbands of the second codeword encoded differentially with respect to the Best-m individual CQI of the corresponding subband of the first codeword (spatial delta), and in FIG. 30A where the selected (Best-m) subbands have the same subband indices across codewords, and in FIG. 30B where the selected (Best-m) subbands have different subband indices when compared across codewords. Additionally, it is not precluded to perform additional frequency differential CQI compression to the first codeword (i.e. the reference codeword), by reporting the Best-m individual CQI of each of the selected subbands of the first codeword encoded differentially with respect to the wideband CQI of the first codeword. Similarly, such frequency differential CQI report can also be applied to the remaining codeword ($r=2, \ldots R$).

Description now turns to FIGS. 32-37 for embodiments that include Scanning-based selective sub-band CQI Reporting herein. Having an efficient CQI reporting process addresses problems such as how to keep feedback overhead low and simplify control signaling design in both the UEs and eNB, while maintaining and communicating accurate CQI information for downlink scheduling by eNB. Various embodiments as described herein provide solutions. In orthogonal frequency division multiple access (OFDMA) communication systems the total operating bandwidth is divided into multiple resource blocks (RBs), as shown in FIG. 9, where transmissions from user equipments (UEs) occur in an orthogonal, not mutually interfering, manner. More typically, each UE will get a well-chosen set of RBs, where it has a high signal-to-interference and noise ratio (SINR) so that the spectral efficiency of the transmission is maximized according to the operating principle of a scheduler. By scheduling each UE on RBs where it has high SINR, the data rate transmitted to each UE, and hence the overall system throughput, can be optimized according to the scheduling principle or policy employed.

In some embodiments, the system bandwidth is divided into several subbands, where each sub-band consists of n RBs. A scanning pattern is established and configuration data or instructions are provided in both UE and eNB or provided in one of them (UE or eNB) and communicated to the other (eNB or UE) prior to CQI feedback according to the scanning pattern. The CQI reporting according to the scanning pattern in some embodiments covers or communicates information about the entire bandwidth scanned. Using the scanning pattern, the UE selects one or several sub-bands at a given feedback instant. The CQI(s) corresponding to the selected sub-band(s) are reported to eNB. The process efficiently compresses the CQI(s) at any feedback instant, and the selected sub-bands are reported, resulting in a low overhead. CQI reporting covers the entire system bandwidth, or such part of the system bandwidth as is specified or configured for CQI reporting according to the scanning pattern, after a certain time period during which the scanning process is operative. Where the entire system bandwidth is covered, eNB has CQI information about the entire system bandwidth and can perform scheduling more accurately. Uplink overhead is reduced because only scanned sub-bands report their CQIs. CQI accuracy and granularity is adaptively configurable by optimizing the scanning pattern.

For example, the scanning process scans the system bandwidth according to a scanning pattern, to select one or several sub-bands. Large feedback overhead of systems lacking compression is substantially reduced. Substantial reduction of feedback overhead per sub-band makes engineering compromises unnecessary that only partially cover the system bandwidth in the CQI reporting, and instead allows the amount of CQI reporting to be increased so that the entire system bandwidth is covered in the CQI report. CQI information is quantized and compressed, hence the uplink feedback overhead is reduced. Uplink feedback and control signaling design is simplified due to the lower CQI feedback overhead, which consequently results in a better uplink feedback and control channel coverage. Some embodiments confer enhanced flexibility in adaptive configuration of the CQI feedback granularity, frequency, and overhead, and enable easier and more fully acceptable trade-off of feedback overhead and throughput. UE executes the scanning process in a feedback generation module according to the scanning pattern. eNB receives and interprets the report sent by the UE either according to eNB scanning configuration or by parsing the CQI report to determine the scanning pattern. eNB reconstructs the CQI of each subband for each spatial codeword according to the scanning configuration. In this way, a set of scanning-based selected sub-band CQI reporting embodiments are provided to efficiently feed back the CQI information over the entire system bandwidth. Uplink overhead is consequently decreased, uplink control signaling design is simplified and improved, uplink feedback coverage and control channel coverage are improved over subbands and codewords and over time, and efficient performance and overhead trade-offs are enabled.

To enable near-optimum frequency domain scheduling of UEs in the RBs of the operating bandwidth, each UE feeds back the SINR or channel quality indicator (CQI) it experiences, potentially for each RB or for combination of each RB, to its serving base station (Node B). Efficient CQI reporting embodiments herein beneficially compress the amount of overhead incurred and leverage the existence of substantial correlation of CQI feedback across multiple RBs.

In connection with FIGS. 32-37, 1, 2, 7, and 8, description here involves scanning-based CQI reporting embodiments for systems such as OFDMA to address problems such as CQI feedback burden on system scheduling and on speed in the network and CQI feedback-related latency in UE and in eNB. Scanning-based CQI feedback embodiments described herein help ameliorate and solve these problems by organizing, coordinating, parallelizing and/or pipelining the CQI feedback processing as taught herein to obtain lower latency and higher system speed and relax constraints that might otherwise lead to poor compromises in the communication system design. Scanning-based CQI reporting embodiments can have less reporting overhead than without any CQI compression.

Using a configurable scanning pattern, parallelizing and pipelining of the CQI report processing are facilitated by making the index order of operations more uniform from block to block in UE and coordinated with the index order of operations in eNB. The index order of operations is called a scanning pattern over subband/codeword indices (j, r). In this way, various UE operations that can include CQI generation, differencing, writing (storing) and reading (loading), and transmission of the CQI feedback in UEi are coordinated by using a same configurable scanning pattern. Correspondingly in eNB, the same scanning pattern is applied in eNB uniformly for one or more of the various operations pertaining to UEi respectively. These eNB operations can include CQI reception, writing (storing) and reading (loading) of CQI feedback information in decompression and decoding for low latency recovery of UEi $CQI(r,j)=S_{i,r,j}$ and to facilitate scheduling in eNB. For example, the eNB receives the encoded CQI feedback and on-the-fly de-differences that CQI feedback from a given UEi by the same scanning pattern in eNB as the sequential order by which that CQI feedback streams into eNB and similar or same as was used in the given UEi. Various embodiments are described with different sub-band formations and scanning patterns. The scanning-based CQI report embodiments are also described in the context of multiple codewords (e.g. MIMO multi-antenna system).

Based on the channel and interference/noise variance estimates for sub-bands, the UE computes signal-to-interference-noise ratio (SINR) or other channel quality indicator (CQI) for each RB which is denoted as S1, S2, . . . , SN. Note that CQI in some embodiments uses other performance metrics such as the recommended transport format (modulation-and-coding scheme MCS), mutual information, and/or received signal strength.

In one example of a scanning-based selective sub-band CQI report embodiment, the entire bandwidth is divided into M sub-bands, each of which is comprised of several adjacent or scattered RBs. The number L of RBs in any sub-band varies between 1 and some maximum number Lmax. Different sub-bands can have different number of RBs. For a particular sub-band, in some embodiments its number of RBs can vary over time. Note that the RBs in a particular sub-band are not necessarily adjacent to each other. In other words, one sub-band is a set of scattered RBs. Comparing to FIG. 3, in one example, sub-band SB1 instead contains RBs 1, 3, 5, 7, 8 for instance. In another scattered-RB example, SB1 contains RBs 1, 6, 11, 16, 21.

Responding to the scanning-based CQI report from the UE, the Node B performs further processing by collecting the CQI reports over multiple sub-frames of FIG. 9. For instance, in one process embodiment the Node B performs link adaptation and scheduling in every sub-frame based on the CQI reports corresponding to the latest P sub-frames (where a complete frequency-domain CQI is obtained in P sub-frames). That is, the Node B reconstructs the frequency-domain CQI across the system bandwidth by collecting the reports from multiple sub-frames. Some other reconstruction techniques are used, e.g. interpolation, in some other embodiments.

In the scanning-based CQI report, one or several sub-bands are chosen out of the total M sub-bands. CQIs of RBs in the selected sub-bands are then fed back to the eNB. Selection of sub-bands is performed according to a specific scanning-pattern. In the following examples, several scanning patterns for embodiments are described, assuming without loss of generality a 5 MHz system with 25 RBs, divided into 5 sub-bands.

In a Sequential Scanning pattern herein, each sub-band contains a set of adjacent RBs. In sequential scanning, the k-th CQI feedback reports CQI of the j-th sub-band according to a pattern RB#, k+L(j−1) for which k 1, 2, . . . L is repeated for each j=1, 2, . . . M according to a scanning process loop executed by processor or other circuit with the sequential scanning pattern. Each subband contains a set of adjacent RBs. For example, and referring to FIG. 3:

Subframe 1: sub-band 1 is selected, with RBs 1-5 reported.
Subframe 2: sub-band 2 is selected, with RBs 6-10 reported.
Subframe 3: sub-band 3 is selected, with RBs 11-15 reported.
Subframe 4: sub-band 4 is selected, with RBs 16-20 reported.
Subframe 5: sub-band 5 is selected, with RBs 21-25 reported.

Some embodiments perform reporting according to a permuted version of the above pattern wherein UE sequentially feeds back sub-band $N_1$, $N_2$, $N_3$, $N_4$, $N_5$, where $\{N_1, N_2, N_3, N_4, N_5\}$ is any arbitrary permutation, repetition, subset of the set $\{1, 2, 3, 4, 5\}$.

In Down-Sampled Scanning herein, The UE feeds back quantized versions of every L-th CQI. In down-sampled CQI reporting, a sub-band is composed of a set of distributed RBs, e.g. every fifth RB in the example below, and down-sampling of the frequency spectrum has a specified offset k that is incremented to feedback RB#=L(j−1)+k, where j=1, 2, . . . M is repeated for each k=1, 2, . . . L by a process loop executed by processor or other circuit according to the down-sampled scanning pattern. For example, and referring to FIGS. 3-4:

Subframe 1: sub-band 1 is selected, with RBs 1, 6, 11, 16, 21 reported.
Subframe 2: sub-band 2 is selected, with RBs 2, 7, 12, 17, 22 reported.
Subframe 3: sub-band 3 is selected, with RBs 3, 8, 13, 18, 23 reported.
Subframe 4: sub-band 4 is selected, with RBs 4, 9, 14, 19, 24 reported.
Subframe 5: sub-band 5 is selected, with RBs 5, 10, 15, 20, 25 reported.

Here too, for some embodiments, the sub-bands indices $\{N_1, N_2, N_3, N_4, N_5\}$ are any permutation, repetition or subset of the set $\{1, 2, 3, 4, 5\}$.

In Dynamic Sub-band Selection herein, the sub-band selected at any particular time instant departs from a strict, static, or predetermined pattern. A sub-band is fed back at any time, if necessary, for example triggered by a feedback command from either UE or eNB. In some embodiments, the Best-m CQI subbands are identified and scanned first in the scanning pattern spatially across codewords in a given Best-m subband and then by a successive Best-m subband. In some other embodiments, one sub-band can have a higher feedback frequency than the other sub-bands.

Any combination, subset, extension, and/or variation of the above embodiments are further embodiments. For example, Sequential Scanning and Down-Sampled Scanning are combined by performing down-sampling across sub-bands. Using the above example of 25 RBs and assuming 12 sub-bands (with each sub-band having 2 RBs except for the last one with 3 RBs), see FIG. 4, the down-sampling is performed across sub-bands as follows (transmission across 4 sub-frames):

Subframe 1: sub-bands 1, 5, 9 are fed back.
Subframe 2: sub-bands 2, 6, 10 are fed back.
Subframe 3: sub-bands 3, 7, 11 are fed back.
Subframe 4: sub-bands 4, 8, 12 are fed back.

Note that all the Figures and numerical values are exemplary and for illustrative purposes. Various embodiments generalize for any size of sub-band, different number of RBs within the system bandwidth, different RB sizes, etc.

In Dynamic Sub-band Formation, the RBs included in any sub-band are dynamically or adaptively configured over time, instead of choosing a fixed set. For example, at a particular feedback instant, one sub-band contains RBs 1-5. At another feedback instant, in some embodiments, this sub-band contains another set of RBs, for example RB 1, 2, 7 9 10. In some embodiments, configuration establishes at least one subband that includes two or more smaller-size sub-bands.

In multiple-input, multiple-output (MIMO) OFDMA systems, UE determines 1) the optimal transmission rank, i.e., the number of spatial streams or codewords to be multiplexed and 2) the CQI for each stream on each RB. The transmission rank R is assumed the same on all RBs, giving the same number of CQIs to be fed back per RB. Some scanning-based CQI reporting embodiments for MIMO systems are described next.

In Spatially Independent Scanning-based Reporting herein, the CQIs for different streams (spatial codewords) are independently fed back with the scanning mechanism see FIG. 10 and any of FIGS. 32-37, for instance. The scanning patterns, number of sub-bands, number and indices of RBs in each sub-band are different or identical, for different spatial codewords.

In FIG. 11 for Spatially Differential Reporting herein, first, the difference between the second stream's CQI and the first stream's CQI is computed on each RB or subband. The first-stream's CQI and the delta-CQI are quantized independently using the scanning-based mechanism and fed back according to a scanning pattern of any of FIGS. 32-37, for instance.

In FIG. 14 for Joint Difference Coding herein, an extension of mean and delta CQI method is applied. Here, the mean is computed across all RBs, or selected sub-bands, and all streams or a particular stream. Then, for each (stream, sub-band) the difference with respect to the mean is fed back according to a scanning pattern of any of FIGS. 32-37, for instance. This method is based on the spatial variation and the variation across frequencies being both small compared to the mean, which is determined by the geometry of the UE.

Scanning-based CQI reporting for OFDMA can have a variety of embodiments, some of which are non-exhaustively outlined in TABLE 1.

TABLE 1

SCANNING-BASED CQI REPORTING OUTLINE

1. For system with a single codeword (SISO, MISO, SIMO)
   a. Sequential scanning pattern
   b. Down-sampled scanning pattern
   c. Dynamic sub-band formation
   d. Any combination or variation of the above schemes
2. For system (MIMO) with multiple codewords
   a. Spatially independent scanning-based reporting
   b. Spatially differential reporting
   c. Joint difference encoding.

Further in FIGS. 32-37 for MIMO-OFDMA, CQI is a 2-dimensional matrix in both frequency domain and space domain. With scanning-based CQI reporting, at each feedback instant, CQI of a particular space-frequency grid is reported. The pattern according to which the space-frequency grid is selected can be configured by eNB or UE, and is endowed with a fixed configuration or is semi-statically or adaptively configured. A scanning pattern is designed to cover the entire frequency-space domain for feedback purposes over a specified period. Put another way, the scanning pattern covers the frequency-space domain by transmitting a CQI report in more or less compressed form based on CQI of exhaustive non-overlapping (mutually exclusive) proper subsets $\{CQI(SB_j, CW_r)\}$ or averages over such subsets of the set of CQI having all indices j, r that encompass the frequency-space domain. Scanning-based CQI reporting supports either single-codeword SCW CQI feedback (one-dimensional, 1-D) or multiple-codeword CQI feedback (two-dimensional, 2-D in the space-frequency domain) as taught herein. In the 2-D CQI feedback case, eNB/UE transforms the 2-D space-frequency CQI into a 1-D CQI, and then the scanning patterns of FIGS. 32-37 are used.

Figure 32:
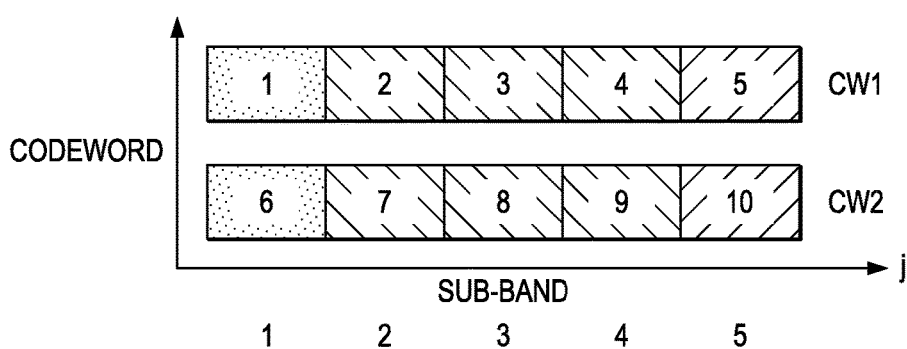
FIGS. 32-37 are each a diagram of codewords versus subbands enumerating a process sequence for scanning-based CQI reporting.

In FIG. 32, Scanning feedback is performed first in the frequency domain, and then in the spatial domain. At the beginning, the $1^{st}$ codeword is selected, and scanning feedback is performed in the frequency-domain for this codeword. After codeword 1 has been scanned, codeword 2 is selected and its CQI is fed back according to a scanning feedback pattern. In some embodiments different codewords use different scanning feedback patterns in the frequency domain. FIG. 32 depicts two codewords and five sub-bands j per codeword, and the number (1, 2, . . . 10) denotes the feedback instant or sequential enumeration for which a sub-band is scanned and reported. In another embodiment, frequency differential CQI report is applied, where for example $CQI_{r,j}$ is differentially encoded with respect to a reference CQI (e.g. adjacent subband CQI, or wideband/medium/mean CQI) of the r-th codeword. In yet another embodiment, spatial differential CQI report is applied, where for example $CQI_{r,j}(r=2, . . . R)$ is encoded differentially with respect to $CRI_{1,j}$ and reported using fewer bits (e.g., 2-3 bits).

Figure 33:
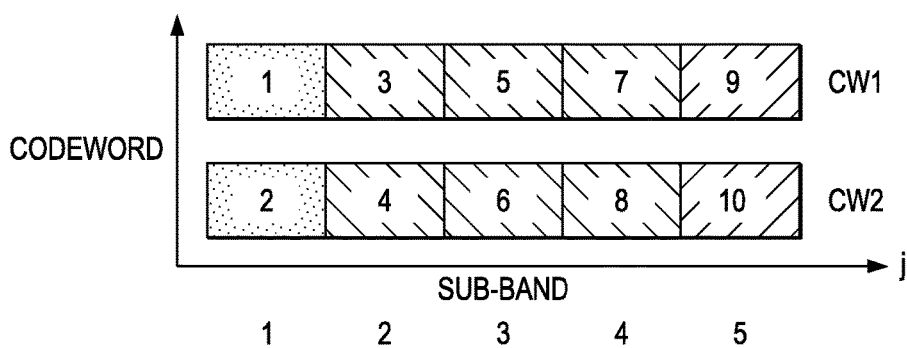

In FIG. 33, Scanning feedback is performed first in the spatial domain r, and then in the frequency domain j. At the beginning, a sub-band j is selected, and scanning feedback is performed in the spatial-domain r to feed back CQI (r=1, j), CQI(r=2,j). Then the next sub-band j+1 is selected according the scanning reporting pattern in the frequency domain, and its spatial CQI vector CQI(r=1, j+1), CQI(r=2,j+1) is scanned and fed back, and so on. Some embodiments use a different spatial-domain scanning reporting pattern, for different sub-bands j. FIG. 33 shows two codewords and five sub-bands, like FIG. 32, and the number (1, 2, . . . 10) enumerates each feedback instant or sequential enumeration for which a sub-band is scanned, but in a different scanning pattern or scanning order in FIG. 33 than the order in FIG. 32. Similarly, it is not precluded to perform spatial/frequency differential CQI quantization in addition to the scanning based reporting.

A static or semi-statically configured scanning embodiment of FIG. 32 or FIG. 33 is useful, for example, with the dynamic Best-m CQI reporting for enhancing bit-efficiency of the feedback. Since the scanning pattern is configured already, a flag bit is simply added to a CQI reporting value for a selected subband and omitted otherwise. Indeed, when the same selected subbands for every codeword are established as the Best-m subbands as in A-suffixed FIGS. 25A-28A, such embodiment confers additional CQI report bits-per-subband bit-efficiency. This is because the Best-m subband index j positions can be identified by inserting a flag bit the first time each position is used, and then the CQI report for the Best-m subbands for all the other codewords can be identified by parsing the CQI report according to the already-configured scanning pattern.

Figure 34:
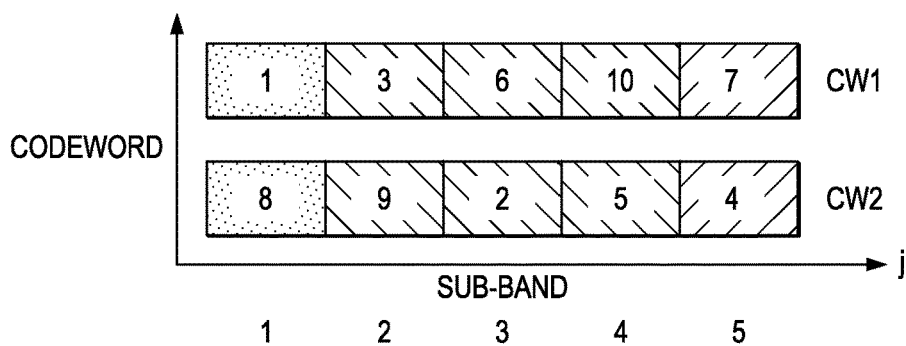

In FIG. 34, the scanning reporting process is a combination of the scanning reporting processes shown in, FIGS. 32 and 33. The scanning reporting pattern can be overwritten at any time, where the CQI of a spatial codeword at a sub-band is given more priority and scheduled to be fed back prior to other subbands in the space-frequency grid. For example, suppose Best-m CQI reporting is configured for the best two (m=2) sub-bands of each codeword. CQI report data for these Best-m subbands are scanned out spatially in the dynamic scanning pattern 1, 2, 3, 4 (numerals inside subband boxes of FIG. 34) prior to scanning out the unselected subbands CQI. Notice that the enumeration of the scanning order inside the subband boxes is distinct from the left-to-right enumeration of subband index j values legended below the horizontal j-index axis of each of FIGS. 32-37. In FIG. 34, for codeword CW1, CQIs for subbands j=1 and j=2 are the hypothetically-best ones (m=2), and are scanned first and third in the scanning pattern. For codeword CW2, CQIs for subbands j=3 and j=5 are the hypothetically-best ones, and are scanned second and fourth in the scanning pattern.

Figure 35:
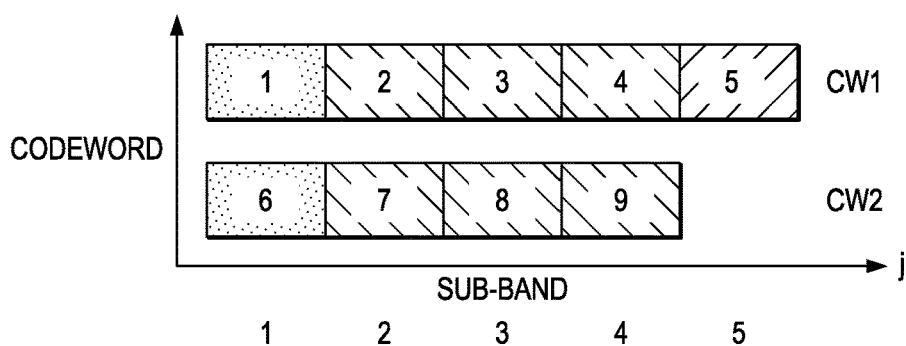

In FIG. 35, the scanning feedback process handles codewords having different numbers of subbands j per codeword. Scanning reporting is performed first in the frequency domain, and then in the spatial domain. At the beginning, the first codeword is selected, and scanning reporting pattern portion 1-5 is performed in the frequency-domain for this codeword. After codeword 1 has been scanned, codeword 2 is selected and its CQI is fed back according to a scanning reporting pattern portion 6-9. In some embodiments, different scanning reporting patterns in the frequency domain are applied for different codewords.

Figure 36:
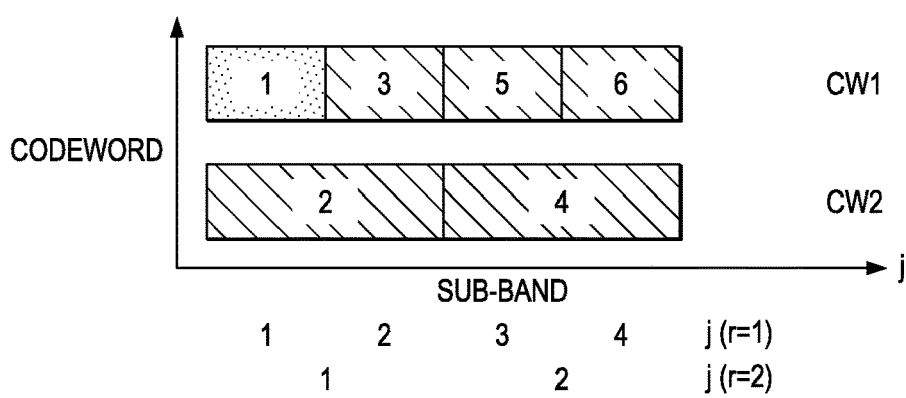

In FIG. 36, another scanning feedback process handles codewords not only having different numbers of subbands per codeword, but also varying widths of subbands varying with codeword index r. Codeword CW1 has four subbands, and codeword CW2 as two subbands each twice as wide as any one subband for CW1. Scanning reporting is performed first in the spatial domain r, and then in the frequency domain j. At the beginning, a sub-band j is selected, and scanning reporting is performed in the spatial-domain r to feed back CQI(r=1, j=1), CQI(r=2,j=1). Then the next sub-band j+1 is selected according the scanning reporting pattern in the frequency domain, and its spatial CQI vector CQI(r=1, j+1), CQI(r=2, j+1) is scanned and fed back. After the less numerous subbands for CW2 are scanned, then the subbands 5 and 6 for CW1 are scanned. The order of scanning feedback is 1, 2, 3, 4, 5, 6.

Figure 37:
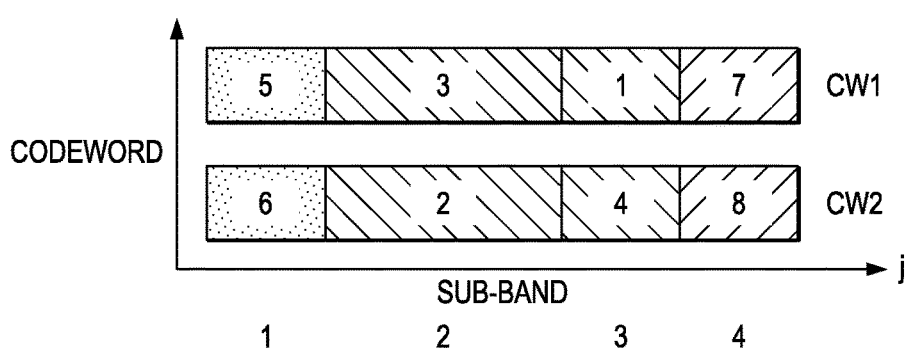

In FIG. 37, yet another scanning reporting process handles codewords having corresponding numbers M of subbands per codeword, but varying widths L of subbands j among the subbands for each codeword. Each codeword has four subbands, and one of the subbands (j=2, scanning element 3) is wider than the other subbands for codeword CW1 and one of the subbands (j=2, scanning element 2) is wider than the other subbands for codeword CW2. Scanning reporting weaves cross-wise in the spatial domain r, relative to the frequency domain j. The order of scanning reporting is 1, 2, 3, 4, 5, 6, 7, 8 as illustrated in FIG. 37.

Note that any of the various described scanning-based CQI reporting structures and methods of FIGS. 32-37 and other scanning embodiments described herein are applicable to scanning-based CQI reporting of CQIs, differentially encoded CQIs (Deltas), differentially encoded CQI differences (Delta Deltas), codebook indices for joint quantization of CQI, Deltas, and/or Delta Deltas, as described herein and/or as shown in any of the Figures herein, and further applicable to any combination of any one, some or all of the foregoing.

Generalizing from FIGS. 32-37, a scanning pattern $P_i$ herein for UEi is a mapping from a sequence of the counting numbers (e.g., s=1, 2, 3, . . . N, where N=RM) to a two-dimensional discrete index value space (r, j) for the subbands j of each codeword r, where $1 \leq r \leq R$ and $0 \leq j \leq M$. (Index j=0 is suitably used for CQI information pertaining to a CQI reference value for a given codeword. The subband index values $1 \leq j \leq M$ are used to index subband CQI values, CQI differences, and Delta Delta values by subband.) UE reads out its computational storage, for instance, the CQIs, CQI differences, or Delta Delta values in any of the vectors or matrices described herein according to the scan pattern configured suitably to the reporting process used in UEi. Conversely, eNB writes directly or indirectly to its computational storage, such as directly to processor registers for instance, the CQI differences and/or Delta Delta values and CQIs in any of the vectors or matrices described herein according to the scan pattern configured suitably to the reporting process used in UEi. In some embodiments, the scanning process includes a scanning loop over a one-dimensional scanning pattern index (e.g., s=1, 2, 3, . . . N, where N=RM) in the loop kernel has a mapping function from the one-dimensional scanning pattern index to generate indices r, j in a two-dimensional discrete index value space (r,j) for the subbands j of each codeword r, where $1 \leq r \leq R$ and $0 \leq j \leq M$. The loop kernel further includes a computation and/or read or write to storage that involves variables as a function of the indices in two-dimensional discrete index value space (r,j).

eNB performs computations to recover the CQI values $S_{i,r,j}$ in sequential computational order as shown for eNB in each of the embodiments of FIGS. 38-42A. Accordingly, eNB very rapidly and with reduced latency recovers the CQI values $S_{i,r,j}$ in sequential computational order when the scanning pattern $P_i$, delivers CQI report information from the UEi in a manner parallel to the sequential computational order in eNB shown in any given one of those embodiments. In a first aspect, UEi and eNB use the same scanning pattern $P_i$, so that communication occurs intelligibly between them. In a second aspect, a scanning code is exchanged between UEi and eNB (or vice versa) that identifies a scanning pattern $P_i$. Scanning pattern $P_i$ identified by the scanning code confers high speed and low latency not only for UE sequential computational order used to generate CQI values $S_{i,r,j}$, and difference and/or compress them, and transmit the difference/compressed form of CQI report from UE but also for eNB to recover the CQI values $S_{i,r,j}$ swiftly and with reduced latency in eNB. Scanning patterns may be different for different UEi such as for different ranks. In some embodiments, eNB keeps a history of the scanning codes, and UEi saves bits by omitting the scanning code from the CQI report when the scanning code is the same as the scanning code for the same scanning pattern used next-previously.

Figure 39:
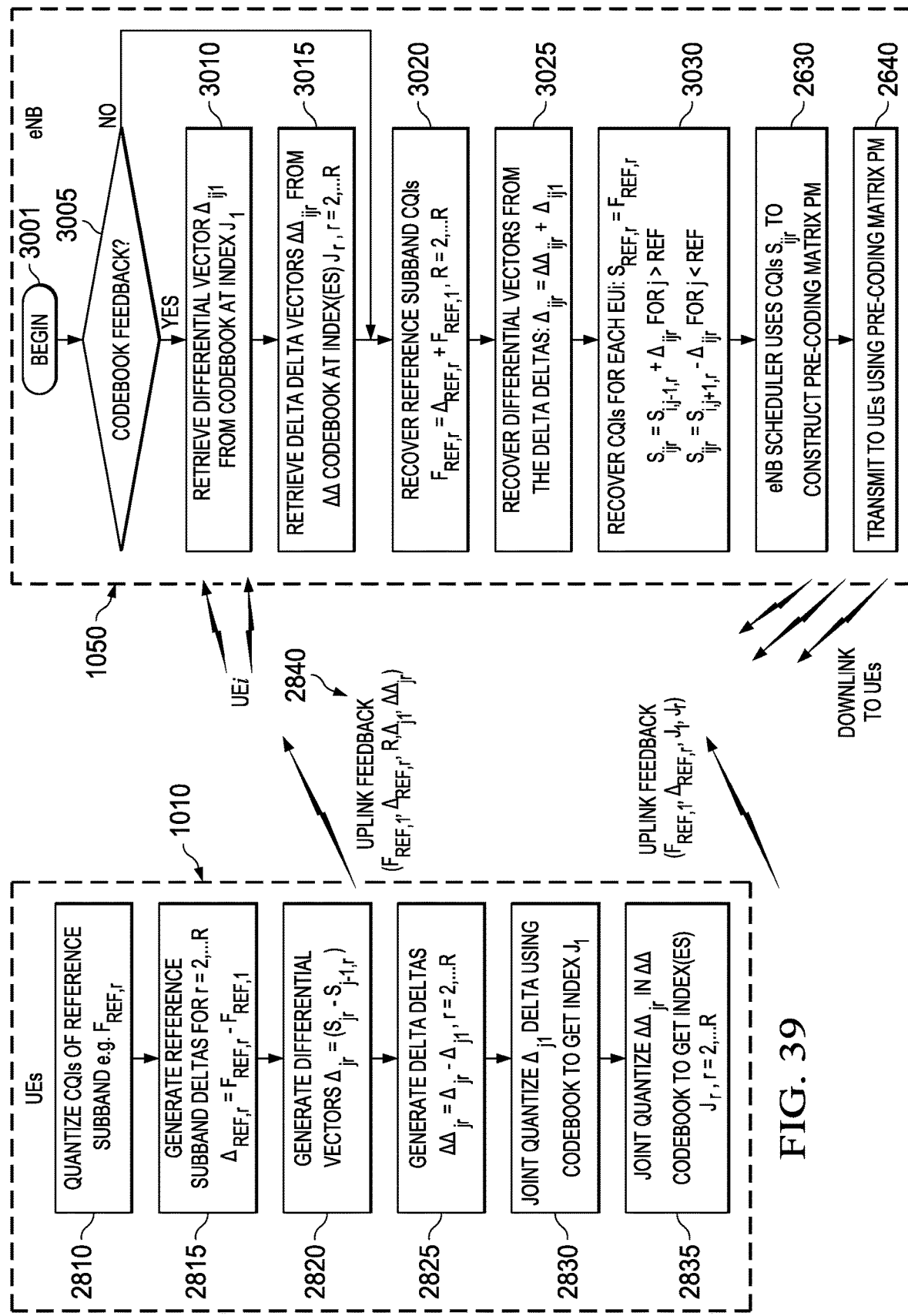

For example, scanning order for reporting of pairwise differences $S_{r,j} - S_{r,j-1}$ for low UE and eNB latency suitably starts with the reference subband $S_{r,\ REF}$ and then works backwards through the subbands to subband j=1, and then works forward through the subbands from the reference position to subband j=M. That way, step 3030 of FIG. 39 is rapidly performed with low latency. A limited number of scanning pattern possibilities may exist for this reporting process, such as 1) working backwards and then forwards through subbands one codeword at a time, or 2) working forwards and backwards through subbands one codeword at a time, or 3) zig-zagging to progressively build backwards and forwards. On the other hand, in mean-Delta feedback, the scanning pattern for reporting of pairwise differences $S_{r,j} - F_{r,\ 0}$ may have more alternative pattern possibilities. Then the feedback process code indicates Mean-Delta reporting, and a scanning code is provided to signify which scanning pattern is being applied.

UE CQI computer 112 (FIG. 1) generates a CQI report derived from at least a first and a second channel quality indicator (CQI) vector associated with a plurality of subbands for each of at least first and second spatial codewords respectively. UE feedback encoder/scanner 113 is configurable by either of FIG. 7 steps 2114 and 2118 in response to a scanning code provided by either UE or eNB respectively. (An example of the scanning code is the last digit of the Figure number 32-37 herein where those Figures illustrate various scanning patterns.) In FIG. 7, step 2165 includes the scanning code to send as a confirmation to eNB. UE feedback encoder/scanner 113 configurably establishes a scanning pattern for CQI reporting across the spatial codewords and subbands by reading them out as defined by the scanning pattern and initiates transmission of a signal communicating the CQI report according to the configurably established scanning pattern.

UE CQI computer 112 generates a first and a second reference CQI for the first and second spatial codewords respectively. UE feedback encoder/scanner 113 initiates transmission of information representing at least one of the first or second reference CQI at the beginning of or prior to executing the configurably established scanning pattern. In one example of Best-m feedback UE CQI computer 112 predetermines at least one selected subband for each spatial codeword and the first reference CQI includes a CQI for unselected subbands for the first codeword and the second reference CQI includes a CQI for unselected subbands for the second codeword. UE feedback encoder/scanner 113 in some embodiment executes the configurably established scanning pattern for CQI reporting for each selected subband prior to CQI reporting for unselected subbands. In this way the eNB scheduler has access to the CQI feedback for the selected subbands as soon as possible.

FIGS. 38-41, 41A, 42, 42A show process flow diagrams for embodiments of UE and eNB. The flow diagrams approximately correspond to FIGS. 16, 19, 20, 24/25, 24/25, 27/28, 27/28.

Figure 38:
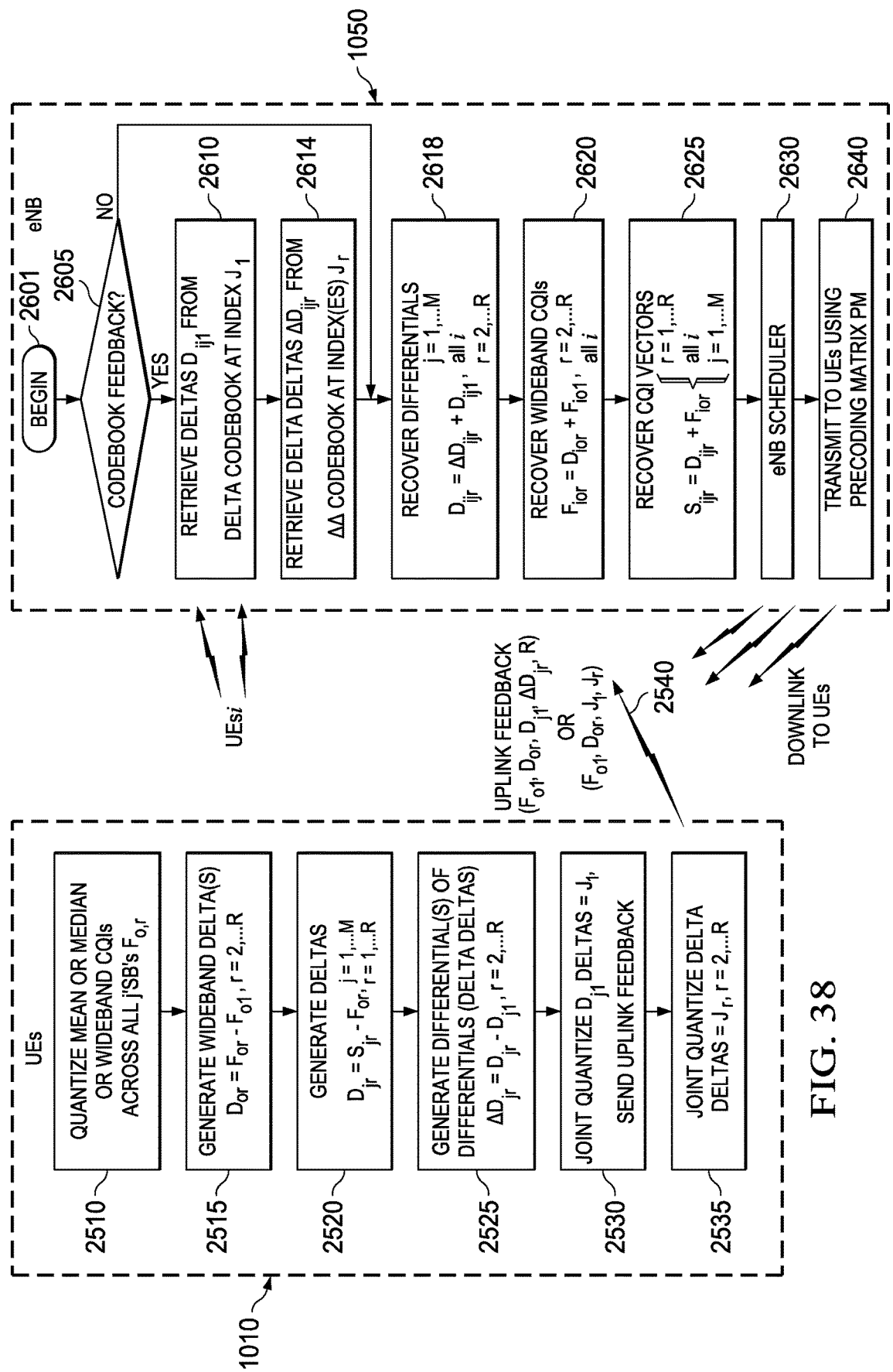
FIGS. 38-41, 41A, 42, 42A are each a pair of side-by-side flow diagrams of a user equipment UE and a base station eNB.

In FIG. 38, a process flow for Mean-Delta and Delta Delta CQI reporting can be compared with FIG. 16. In the UE, a step 2510 quantizes the mean or median or wideband CQIs $F_{0,r}$ across all subbands collectively for each codeword r. Then a step 2515 generates wideband Deltas $D_{0,r}=F_{0,r}-F_{0,1}$ for codeword index values r=2, ... R. Next a step 2520 generates subband deltas $D_{j,r}=S_{j,r}-F_{0,r}$ individually for each of the subband index values j=1, 2, ... M and for codeword index values r=1, ... R. A succeeding step 2525 generates differentials of the differentials (Delta Deltas) $\Delta D_{j,r}=D_{j,r}-D_{j,1}$, for each of the subband index values j=1, 2, ... M and codeword index values r=2, ... R. In FIG. 38, a further step 2530 sends uplink feedback 2540. Uplink feedback 2540 includes CQI feedback vector $(F_{0,1}, D_{0,r}, D_{j,1}, D_{j,1}, \Delta D_{j,r}, R)$ respectively representing wideband CQI for codeword CW1; wideband Deltas for codeword index values r=2, ... R; subband Deltas for codeword CW1; Delta Deltas for codeword index values r=2, ... R; and the rank value R. In FIG. 38, an alternative form of uplink feedback 2540 includes a CQI feedback vector $(F_{0,1}, D_{0,r}, J_1, J_r)$. The elements of this feedback vector respectively represent wideband CQI for codeword CW1; wideband Deltas for codeword index values r=2, ... R; joint quantized vector subband Deltas $D_{j,1}$ compressed and delivered by step 2530 as a codebook index $J_1$ for codeword CW1. Moreover, step 2535 compresses and delivers the Delta Deltas delivered as R−1 respective codebook indices $J_r$ determined by joint quantizing each of R−1 Delta Delta CQI vectors over M subband index values j=1, 2, ... M For the R−1 codeword index values r=2, ... R. The rank value R is implicit in the UE reporting. eNB counts the number of feedback indices J in the feedback or counts the number of wideband deltas $D_{0,r}$ therein plus one, or counts all the feedback values and divides by two (by count shifting rightward one), or executes some other suitable counting process. Alternatively, the rank value R is explicitly fed back to eNB.

In FIG. 38, for the base station eNB, operations commence with a BEGIN 2601 and execute a decision step 2605 that determines whether any codebook feedback is involved. In the meantime, feedback vectors are incoming to eNB from numerous UEs indexed i. If Yes at step 2605, operations proceed to a step 2610 and 2614 for codebook accesses. Step 2610 uses codebook index $J_{i1}$ ($J_1$ from UE i) to retrieve the subband deltas $D_{j,1}$ for UEi for each of the subband index values j=1, 2, ... M for codeword CW1. Step 2614 uses each of the R−1 codebook indices $J_{i,r}$ ($J_r$ from UE i) to codebook-retrieve the Delta Delta vector $\Delta D_{j,r}$ for UEi for each of the subband index values j=1, 2, ... M and R−1 codeword index values r=2, ... R, whereupon a step 2618 is reached. In FIG. 38, eNB step 2618 is reached after step 2614 or in case codebook feedback is not applicable at decision step 2605. Step 2618 uses the Delta Deltas and the CW1 deltas and recovers the differentials (subband deltas) for each UEi and for all the codewords by a summing process expressed as $D_{i,j,r}=\Delta D_{i,j,r}+D_{i,j,1}$ for each of the subband index values j=1, 2, ... M and codeword index values r=2, ... R. A succeeding step 2620 recovers the wideband CQIs $F_{i,0,r}=D_{i,0,r}+F_{i,0,1}$ for codeword index values r=2, ... R and all UEs i. Next a step 2625 recovers the original CQIs $S_{i,j,r}$ for all UEs i by a process expressed as $S_{i,j,r}=D_{i,j,r}+F_{i,0,r}$ for each of the subband index values j=1, 2, ... M and for codeword index values r=1, ... R. At this point the CQI information is recovered, and operations proceed to the eNB scheduler 2630 to allocate subbands to UEs followed by a precoder that establishes precoding matrices for the UEs based on the subband allocations. In a step 2640, the base station eNB transmits over the downlink to the UEs using a composite precoding matrix PM based on the precoding matrices thus established.

In FIG. 39, a process flow for Pairwise Delta and Delta Delta CQI reporting based on Pairwise-Delta of the adjacent subbands can be compared with FIG. 19. In the UE, a step 2810 quantizes CQI for a reference subband $F_{REF,r}$ for subband j-REF for each codeword r. Depending on embodiment, each reference position j=REF or j(r)=REF(r) is configured by eNB so that no reference position reporting need be transferred on the uplink. Alternatively, UE determines the reference position(s) and feeds them back on the uplink as well. Then a step 2815 generates reference subband Deltas $\Delta_{REF,r}=F_{REF,r}-F_{REF,1}$ for codeword index values r=2, ... R. Next a step 2820 pairwise generates M−1 adjacent subband differential vectors for the adjacent subband deltas $\Delta_{j,r}=S_{j,r}-S_{j-1,r}$, for each of the subband index values j=2, ... M and for codeword index values r=1, ... R. A succeeding step 2825 generates differentials (Delta Deltas) $\Delta\Delta_{j,r}=\Delta_{j,r}-\Delta_{j,1}$ for each of the M−1 adjacent subband differentials for each of the codeword index values r=2, ... R.

In FIG. 39, uplink feedback 2840 is sent from UE to eNB. Uplink feedback 2840 includes CQI report vector $(F_{REF,1}, \Delta_{REF,r}, R, \Delta_{j,1}, \Delta\Delta_{j,r})$ respectively representing reference subband CQI for codeword CW1; reference subband Deltas for codeword index values r=2, ... R; the rank value R; adjacent subband Deltas for codeword CW1; and adjacent subband Delta Deltas for codeword index values r=2, ... R.

In FIG. 39, an alternative form of the uplink feedback includes a CQI report vector $(F_{REF,1}, \Delta_{REF,r}, J_1, J_r)$ respectively representing reference subband CQI for codeword CW1; reference subband Deltas for codeword index values r=2, ... R; joint quantized vector subband Deltas $\Delta_{j,1}$ delivered as a codebook index $J_1$ for codeword CW1 from step 2830; and joint quantized Delta Deltas delivered as R−1 respective codebook indices $J_r$ from step 2835. The rank value R is implicit, and eNB suitably counts the feedback values to obtain the value of rank R. Alternatively, the rank value R is implicitly reported to the eNB. Some embodiments also joint quantize the reference subband deltas $\Delta_{REF,r}$ and send a single index $J_{REF}$ in place of $\Delta_{REF,r}$.

In FIG. 39, for the base station eNB, operations commence with a BEGIN 3001 and execute a decision step 3005 that determines whether any codebook feedback from UE is involved. In the meantime, feedback vectors are incoming from each UEi. If Yes at step 3005, operations proceed to a step 3010 and a step 3015 for codebook accesses. Step 3010 uses fed-back codebook index $J_{i1}$ ($J_1$ from UE i) to retrieve the adjacent subband deltas $\Delta_{j,1}$ for each of the subband index values j=2, ... M for codeword CW1. Step 3015 uses each of the R−1 codebook indices $J_{i,r}$ ($J_r$ from UE i) to codebook-retrieve the adjacent subbands Delta Delta vector $\Delta\Delta_{i,j,r}$ for each UEi for subband index values j=2, ... M and R−1 codeword index values r=2, ... R, whereupon a step 3020 is reached.

In FIG. 39, eNB step 3020 is reached after step 3015 or directly from step 3005 in case codebook feedback is not applicable at decision step 3005. Step 3020 recovers the reference subband CQIs $F_{i,REF,r}=\Delta_{i,REF,r}+F_{i,REF,1}$ for codeword index values r=2, ... R and all UEs i. A succeeding step 3025 uses the Delta Deltas from step 3015 and the CW1 deltas from step 3010 and recovers the differentials (adjacent-subband deltas) for each UEi and for all the codewords by a summing process expressed as $\Delta_{i,j,r}=\Delta\Delta_{i,j,r}+\Delta\Delta_{i,j,1}$ for each of the subband index values j=2, ... M and codeword index values r=2, ... R. Next a step 3030 first recovers the reference subband CQIs for each codeword r for the UEs i by a process that establishes reference subband values $S_{i,REF,r}=F_{i,REF,r}$. Then step 3030 reconstructs the original subband CQIs for subbands j>REF by the repeated addition $S_{i,j,r}=S_{i,j+1,r}-\Delta_{i,j,r}$ for codeword index values r=1, ... R. Step 3030 goes on and reconstructs the original subband CQIs for subbands j<REF by the repeated subtraction $S_{i,j,r}=S_{i,j+1,r}-\Delta_{i,j,r}$ for codeword index values r=1, ... R. At this point the original subband CQI information is recovered, and operations proceed to the eNB scheduler 2630 to allocate subbands to UEs followed by a precoder that establishes precoding matrices for the UEs based on the subband allocations. In a step 2640, the base station eNB transmits over the downlink to the UEs using a composite precoding matrix PM based on the precoding matrices thus established.

Figure 40:
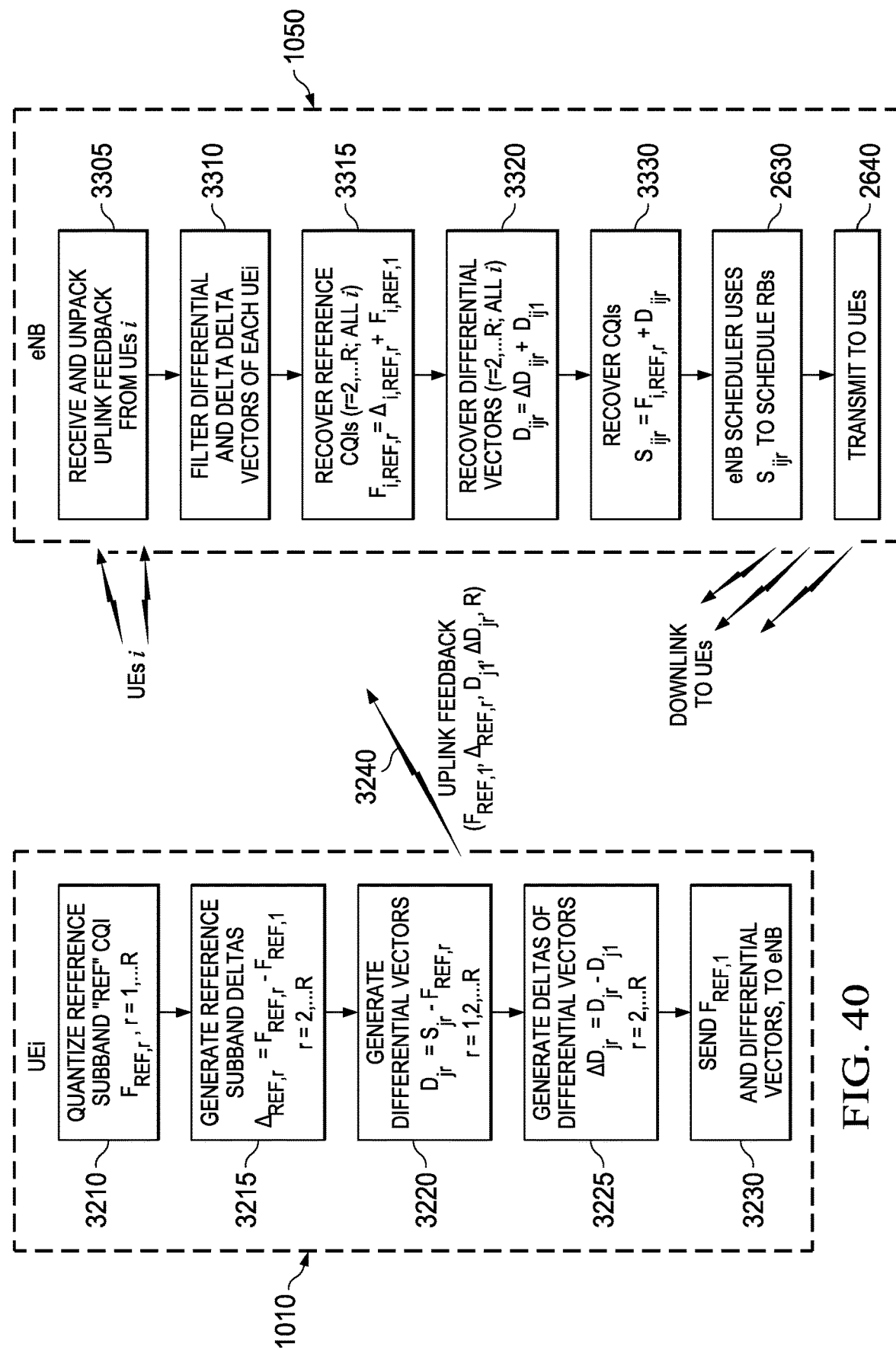

In FIG. 40, a process flow for Reference Delta and Delta Delta CQI reporting can be compared with FIG. 20. In the UE, a step 3210 configures the position of, and quantizes, a respective Reference subband CQI $F_{REF,r}$ for each codeword r. Then a step 3215 generates Reference Deltas (differentially encoded relative to reference subband) expressed as $\Delta_{REF,r}=F_{REF,r}-F_{REF,r}$ for codeword index values r=2, ... R. Next a step 3220 generates Subband Deltas $D_{j,r}=S_{j,r}-F_{REF,r}$ for each of the subband index values j=1, 2, ... M and for codeword index values r=1, ... R. Consequently, a zero (0) conveniently appears at the reference subband position in the Subband Delta vector. A succeeding step 3225 generates differentials of the differentials (Delta Deltas) $\Delta D_{j,r}=D_{j,r}-D_{j,1}$ for each of the subband index values j=1, ... M and codeword index values r=2, ... R. A further step 3230 sends uplink feedback 3240. Uplink feedback 3240 includes CQI report vector ($F_{REF,1}$, $\Delta_{REF,r}$, $D_{j,1}$, $\Delta D_{j,r}$, R) respectively representing Reference subband CQI for codeword CW1; Reference Deltas for codeword index values r=2, ... R; Subband Deltas for codeword CW1; Delta Deltas for codeword index values r=2, ... R; and the rank value R. Alternative reporting for FIG. 40 uses joint quantized feedback Index J in some embodiments, analogous to FIG. 38.

In FIG. 40, for the base station eNB, operations at step 3305 receive signals and unpack uplink feedback from UEs i. At a step 3310, the Reference Deltas $\Delta_{REF,r}$, Subband Deltas $D_{j,1}$ (CW1), and Delta Delta vectors $\Delta D_{j,r}$ from each UEi are filtered to eliminate unusual outlying values potentially due to noise error. A step 3315 recovers the reference subband CQIs $F_{i,REF,r}=\Delta_{i,REF,r}+F_{i,REF,1}$ for codeword index values r=2, ... R and all UEs i. A succeeding step 3320 uses the Delta Deltas and the CW1 Subband Deltas and recovers the Subband Deltas for each UEi and for the codewords by a summing process $D_{i,j,r}=\Delta D_{i,j,r}+D_{i,j,1}$ for each of the subband index values j=1, 2, ... M and codeword index values r=2, ... R. Next a step 3330 uses the results of steps 3315 and 3320 and recovers the original CQIs for all UEs i by a process $S_{i,j,r}=D_{i,j,r}+F_{i,REF,r}$ each of the subband index values j=1, 2, ... M and for codeword index values r=1, ... R. At this point the CQI information is recovered, and operations proceed to the eNB scheduler 2630 to allocate subbands to UEs followed by a precoder that establishes precoding matrices for the UEs based on the subband allocations. In a step 2640, the base station eNB transmits over the downlink to the UEs using a composite precoding matrix PM based on the precoding matrices thus established.

Figure 41:
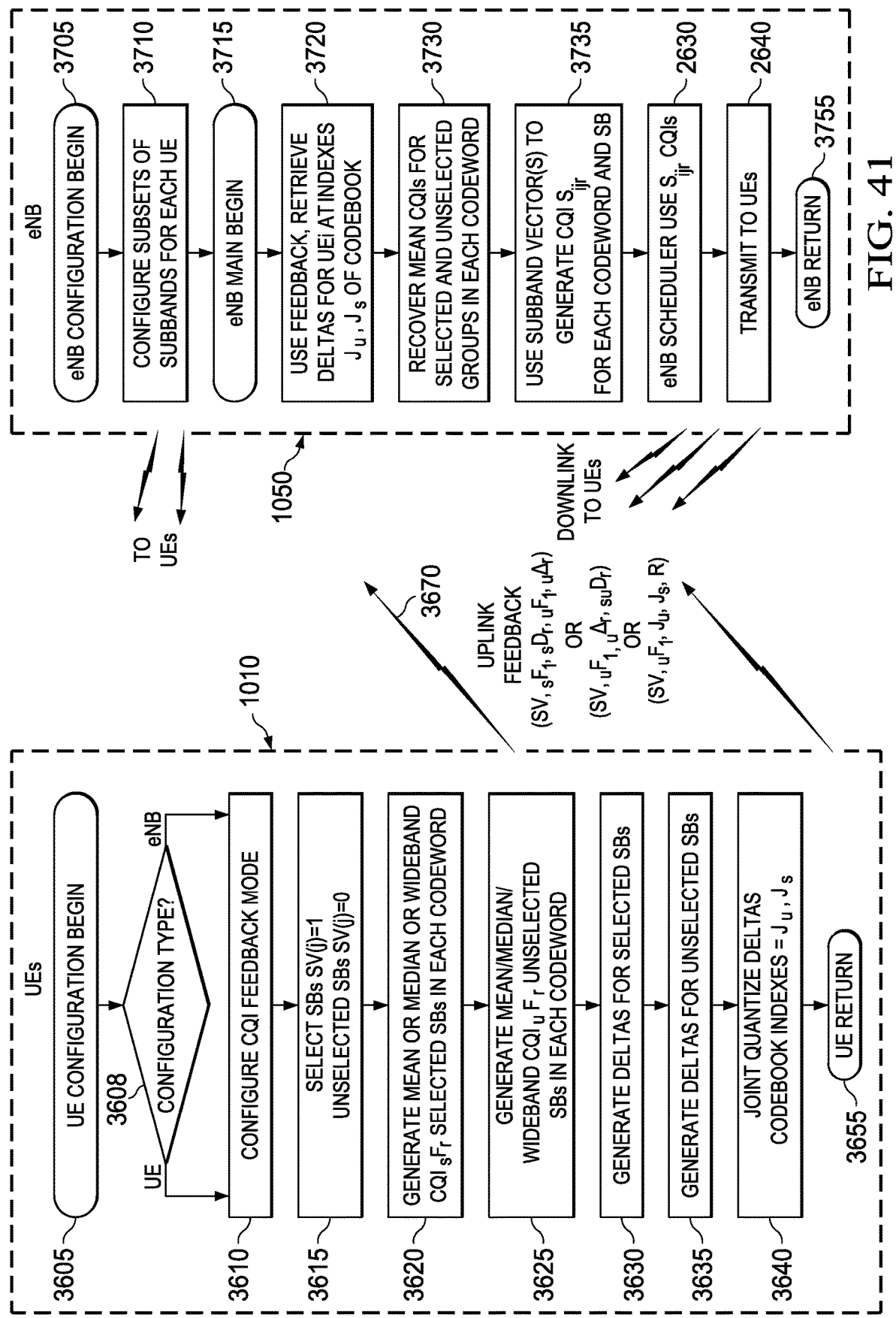

In FIG. 41, a process flow for Best-m Average CQI reporting, with joint quantization and horizontal/vertical forms of the reporting, can be compared with FIG. 24A/B. In the UE, operations commence with UE configuration at a step 3605. The configuration type is found in decision step 3608 and can be established by UE or eNB. Then a step 3610 configures the CQI reporting mode, and Best-m CQI reporting mode is illustrated. A succeeding step 3615 selects the best subbands as in FIG. 7 and reports their positions by setting corresponding bits of subband vector SV(j)=1. Alternatively, the selected subbands vector (SV), or the indication of the position of the m-selected subbands, can be jointly reported using a compressed label with $\log_2(C_M^m)$ bits. Unselected subbands have SV(j)=0. Next a step 3620 generates the mean or median or wideband CQI $_sF_r$ for the selected subbands "s" for each r-th codeword CW1, CW2, etc. Another step 3625 generates mean or median or wideband CQI $_uF_r$ for the unselected subbands "u" for each r-th codeword CW1, CW2, etc.

In FIG. 41, differential encoding at a step 3630 generates deltas for the selected subbands $_sD_r=_sF_r-_sF_1$ for each codeword CW2, etc., i.e. for index r=2, ... R. Analogously, a step 3635 also generates deltas for the unselected subbands $_u\Delta_r=_uF_r-_uF_1$ for each codeword CW2, etc., i.e. for index r=2, ... R. Then a step 3640 joint quantizes the delta $_sD_r$ and outputs a codebook index $J_s$. Step 3640 also joint quantizes the delta $_u\Delta_r$ and outputs a codebook index $J_u$ as well, whereupon a UE RETURN 3655 is reached.

Uplink feedback 3670 is provided in any of a variety of embodiments related to FIG. 41 and described next. In a first embodiment, a CQI report vector is expressed as (SV, $_uF_1$, $_sF_1$, $_u\Delta_r$, $_sD_r$). In words, the CQI report vector has subband vector SV, the FIG. 21 mean/median/wideband collective CQI $_sF_1$ for the selected subbands for codeword CW1 and the FIG. 21 mean/median/wideband collective CQI $_uF_1$ for the unselected subbands for codeword CW1. The CQI report also includes the spatial CQI differences $_sD_r$ between collective CQI $_sF_r$ for the selected subbands relative to $_sF_1$ for codeword CW1. The CQI report further has the spatial CQI differences $_u\Delta_r$ relative to CQI $_uF_1$ for the unselected subbands for codeword CW1. This is called vertical CQI reporting herein because the spatial CQI differences can be listed in columns vertically in TABLE 2. When spatial CQIs are quite similar in magnitude across code words r, and vertical CQI reporting delivers compression because both the spatial CQI differences $_sD_r$ and the spatial CQI differences $_u\Delta_r$ are small and easily represented with just a few bits.

TABLE 2

| CQI REPORTING ("VERTICAL") | | |
|---|---|---|
| | Unselected Sub-bands | Selected Sub-bands |
| CW1 | $_uF_1$ | $_sF_1$ |
| CW2, etc. | $_u\Delta_r$ | $_sD_r$ |

In a second embodiment related to FIG. 41, a CQI report vector is expressed as (SV, $_uF_1$, $_u\Delta_r$, $_{su}D_r$), see also TABLE 3. In words, the CQI report vector has subband vector SV, the FIG. 21 mean/median/wideband collective CQI $_uF_1$ for the unselected subbands for codeword CW1. ($_sF_1$ need not be explicitly reported.) The CQI report also includes the spatial CQI differences $_u\Delta_r$ relative to CQI $_uF_1$ for the unselected subbands for codeword CW1. Instead of analogous vertical report data $_sD_r$ for the selected subbands, a horizontal CQI report $_{su}D_r=_sF_r-_uF_r$ delivers CQI differences in a given row for each codeword, r=1, 2, ... R. Variants of the second embodiment $_{su}D'_r=_sF_{(r+1)modR}-_uF_r$ for each codeword, r=1, 2, ... R, also can provide useful correlation in a zig-zag or other scanning pattern for generating the spatial CQI differences. In other words, the scanning process teachings herein for FIGS. 32-37 are not only useful for generating the order of uplink transmission of CQI report data but also useful for independently or dependently establishing pairs of values for differencing and/or the order of transmission of difference-based CQI report data.

TABLE 3

| BEST-m CQI REPORTING ("HORIZONTAL") | | |
| --- | --- | --- |
| | Unselected Sub-bands | Selected Sub-bands |
| CW1 | $_uF_1$ | $_{su}D_1$ |
| CW2, etc. | $_u\Delta_r$ | $_{su}D_r$ |

In a third embodiment related to FIG. 41, a CQI report vector is expressed as (SV, $_sF_1$, $_sD_r$, $-_{su}D_r$), see also TABLE 4. In words, the CQI report vector has subband vector SV, the FIG. 21 mean/median/wideband collective CQI $_sF_1$ for the selected subbands for codeword CW1. ($_sF_1$ need not be explicitly reported.) The CQI report also includes the spatial CQI differences $_sD_r$ for other spatial codewords relative to CQI $_sF_1$ for the selected subbands for codeword CW1. A reverse-horizontal CQI report $_{us}D_r=-_{su}D_r=_uF_r-_sF_r$ delivers CQI differences in a given row for each codeword, r=1, 2, . . . R.

TABLE 4

| BEST-m CQI REPORTING ("REVERSE-HORIZONTAL") | | |
| --- | --- | --- |
| | Unselected Sub-bands | Selected Sub-bands |
| CW1 | $-_{su}D_1$ | $_sF_1$ |
| CW2, etc. | $-_{su}D_r$ | $_sD_r$ |

In a fourth embodiment category related to FIG. 41, any of the first three embodiments are subjected to joint quantization in step 3640. The CQI report vector has the form (SV, $_uF_1$, $_sF_1$, $J_u$, $J_s$, R) for vertical reporting, and the form (SV, $_uF_1$, $J_s$, $J_{us}$, R) or (SV, $_sF_1$, $J_s$, $J_{us}$, R) for horizontal reporting. In the latter case, $J_{su}$ signifies a codebook index resulting from joint quantization of the horizontal difference vector $_{su}D_r$. Alternatively, $J_{us}$ signifies a codebook index resulting from joint quantization of the horizontal difference vector $-_{su}D_r$. For substantially correlated difference vectors of either the vertical or horizontal or other type, joint quantization can offer useful compression.

In FIG. 41, base station eNB operations commence with eNB configuration BEGIN 3705 and configure subsets of subbands for each UEi in a step 3710. Operations continue via eNB Main BEGIN 3715 to a step 3720 that uses the feedback from each given UE to retrieve delta vectors from a delta codebook(s) using fed-back indices such as $J_u$ and $J_s$. A step 3730 recovers the CQI (e.g., mean CQI) for the selected subbands and CQI (e.g., mean CQI) for the unselected subbands for each codeword r. In step 3730 applied to TABLE 2 vertical reporting, the recovered mean CQI of selected subbands is $_sF_r=_sD_r+_sF_1$, and the recovered mean CQI of un-selected subbands is $_uF_r=_u\Delta_r+_uF_1$, applied for each codeword CW2, etc., i.e. for index r 2, . . . R. In step 3730 applied to TABLE 3 horizontal reporting, the recovered mean CQI of un-selected subbands is $_uF_r=_u\Delta_r+_uF_1$, and the recovered mean CQI of selected subbands is $_sF_r=_{su}D_r+_uF_r$, applied for each codeword CW2, etc., i.e. for index r=1, . . . R. In step 3730 applied to horizontal zig-zag reporting, the recovered mean CQI of un-selected subbands is $_uF_r=_u\Delta_r+_uF_1$, and the recovered mean CQI of selected subbands is, e.g., $_sF_r=_sD_r+_sF_1$, applied for each codeword, r=1, 2, . . . R. In step 3730 applied to TABLE 4 reverse-horizontal reporting, the recovered mean CQI of selected subbands is $_sF_r=_sD_r+_sF_1$, and the recovered mean CQI of un-selected subbands is $_uF_r=_sF_r-_{su}D_r$, applied for each codeword CW2, etc., i.e. for index r=1, . . . R.

In FIG. 41, eNB step 3735 applies the recovered CQI information together with the subband vector SV by a process such as in FIG. 43 to establish approximated CQI information $S_{i,j,r}\sim=_uF_r$ or $_sF_r$ on all subbands j for all code words r and UEs i, ready for use by the eNB scheduler 2630. Operations proceed to the eNB scheduler 2630 to allocate subbands to UEs followed by a precoder that establishes precoding matrices for the UEs based on the subband allocations. In a step 2640, the base station eNB transmits over the downlink to the UEs using a composite precoding matrix PM based on the precoding matrices thus established, whence eNB RETURN 3755 is reached.

Note that the various vertical, horizontal, etc. embodiments are straightforwardly applied to all types of CQI reporting either in Best-m CQI reporting or in other types of CQI reporting. Instead of identifying a datum as "u" or "s", the other types have more than two subband index values that are enumerated instead of having subscripts "u" and "s".

Figure 41A:
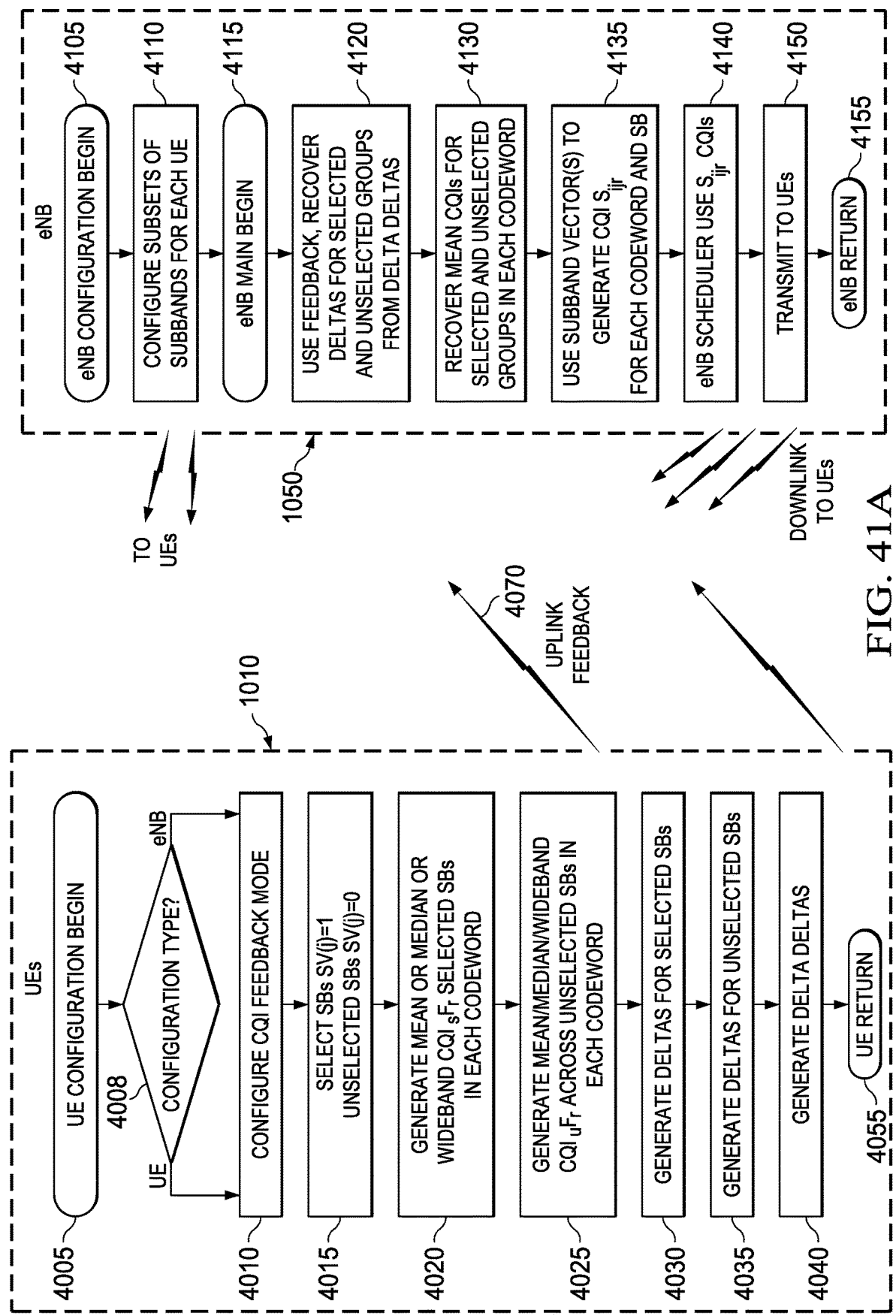

Turning to FIG. 41A, a process flow for Delta Delta Best-m Average CQI reporting, with horizontal/vertical forms of the reporting, can be compared with FIG. 25A/B. In the UE, operations commence with UE configuration at a step 4005. The configuration type is found in decision step 4008 and can be established by UE or eNB. Then a step 4010 configures the CQI reporting mode, and Delta Delta Best-m Average CQI reporting mode is illustrated. A succeeding step 4015 selects the best subbands and reports their positions by setting corresponding bits of subband vector SV(j)= 1. Unselected subbands have SV(j)=0. Next in a step 4020 generates the mean or median or wideband CQI $_sF_r$ across the selected subbands for each codeword CW1, CW2, etc. Another step 4025 generates mean or median or wideband CQI $_uF_r$ for the unselected subbands for each codeword CW1, CW2, etc.

In FIG. 41A, differential encoding at a step 4030 generates deltas for the selected subbands $_sD_r=_sF_r-_sF_1$ for each codeword CW2, etc., i.e. for index r 2, . . . R. Analogously, a step 4035 also generates deltas for the unselected subbands $_u\Delta_r=_uF_r-_uF_1$ for each codeword CW2, etc., i.e. for index r=2, . . . R. Then a step 4040 generates Delta Deltas in various embodiments described in succeeding paragraphs for FIG. 41A. Some embodiments at step 4040 additionally joint quantize the Delta Deltas and output a codebook index $J_{DD}$ for them along with a codebook index $J_s$ for delta $_sD_r$ or a codebook index $J_u$ for delta $_s\Delta_r$. After step 4040 a UE RETURN 4055 is reached.

For the Delta Delta embodiments of FIG. 41A, uplink feedback 4070 is provided in any of a variety of embodiments described next in the same order as analogous embodiments of FIG. 41. A first embodiment of TABLE 2A, is called vertical Delta Delta CQI reporting herein and applicable for rank 3 or higher. The CQI report vector is expressed as (SV, $_uF_1$, $_sF_1$, $_u\Delta_2$, $_sD_2$, $_u\Delta\Delta_r$, $_s\Delta D_r$). In words, the CQI report vector has subband vector SV, the FIG. 21 mean/median/wideband collective CQI $_sF_1$ for the selected subbands for codeword CW1 and the FIG. 21 mean/median/wideband collective CQI $_uF_1$ for the unselected subbands for codeword CW1. The CQI report also includes the spatial CQI difference in $_sD_2$ between collective CQI $_uF_2$ for the CW2 selected subbands relative to $_sF_1$ for codeword CW1. The CQI report further has the spatial CQI difference $_u\Delta_2$ for codeword CW2 unselected subbands relative to CQI $_uF_1$ for the CW1 unselected subbands. For the higher code words CW3, etc., Delta Deltas are provided, e.g., $_u\Delta\Delta_r=_u\Delta_r-_u\Delta_2$ and $_s\Delta D_r=_sD_r-_sD_2$ for codeword index r=3, . . . R. If spatial Delta CQIs $_sD_r$ are quite similar in magnitude across code words r, vertical Delta Delta CQI reporting delivers compression because the quantities are represented with just a few bits.

TABLE 2A

BEST-m CQI REPORTING ("VERTICAL Δ Δ")

|  | Unselected Sub-bands | Selected Sub-bands |
|---|---|---|
| CW1 | $_uF_1$ | $_sF_1$ |
| CW2 | $_u\Delta_2$ | $_sD_2$ |
| CW3, etc. | $_u\Delta\Delta_r$ | $_s\Delta D_r$ |

A second Delta Delta embodiment related to FIG. 41A is shown in TABLE 3A, and a CQI report vector is expressed as (SV, $_uF_1$, $_u\Delta_r$, $_{su}D_1$, $\Delta D_r$). In words, the CQI report vector has subband vector SV, the FIG. 21 mean/median/wideband collective CQI $_uF_1$ for the unselected subbands for codeword CW1. ($_sF_1$ need not be explicitly reported.) The CQI report also includes the spatial CQI differences $_u\Delta_r$ relative to CQI $_uF_1$ for the unselected subbands for codeword CW1. Horizontal CQI Deltas are generated and expressed by $_{su}D_r=_sF_r-_uF_r$. The CQI report includes $_{su}D_1$ for codeword CW1. Horizontal CQI Delta Deltas are generated and fed back as expressed by $_{su}\Delta D_r=_{su}D_r-_{su}D_1$ for each codeword index r=2, . . . R. When Delta CQIs $_{su}D_r$ are not small but quite similar in magnitude across codewords r, horizontal Delta Delta CQI reporting of TABLE 3A delivers compression because the Delta Deltas $_{su}\Delta D_r$ are small and easily represented with just a few bits. Variants of the second embodiment $_{su}D'_r=_sF_{(r+1)modR}-_uF_r$ for each codeword, r=1, 2, . . . R, also can provide useful correlation in a zig-zag or other scanning pattern for generating the spatial CQI differences, whereupon the Delta Delta provides compression using a process expressed by $_{su}\Delta D'_r=_{su}D'_r-_{su}D'_1$. Thus, the scanning process teachings herein for FIGS. 32-37 are not only useful for generating the order of uplink transmission of CQI reporting data but also useful for independently or dependently establishing pairs of values for Delta Delta and/or the order of transmission of Delta Delta-based CQI reporting data.

TABLE 3A

BEST-m CQI REPORTING ("HORIZONTAL Δ Δ")

|  | Unselected Sub-bands | Selected Sub-bands |
|---|---|---|
| CW1 | $_uF_1$ | $_{su}D_1$ |
| CW2, etc. | $_u\Delta_r$ | $_{su}\Delta D_r$ |

In a third embodiment related to FIG. 41A and shown in TABLE 4A, a CQI report vector is expressed as follows: (SV, $_sF_1$, $_sD_r$, $-_{su}D_1$, $-_{su}\Delta D_r$). In words, the CQI report vector has subband vector SV, the FIG. 21 mean/median/wideband collective CQI $_sF_1$ for the selected subbands for codeword CW1. ($_uF_1$ need not be explicitly reported.) The CQI report also includes the spatial CQI differences $_sD_r$ relative to CQI $_sF_1$ for the selected subbands for codeword CW1. A reverse-horizontal Delta CQI is generated by a process expressed by $_{us}D_r=-_{su}D_r=_uF_r-_sF_r$ that delivers CQI differences in a given row for each codeword, r=1, 2, . . . R. One of these CQI differences is fed back from UE to eNB, e.g. $-_{du}D_1$. Since the reverse horizontal CQI differences $_{us}D_r=-_{su}D_r=_uF_r-_sF_r$ may have magnitudes of differences that could be small, if compressed, yet are likely to have substantial spatial correlation across code words anyway, a difference encoding of these differences (Delta Delta) is generated and fed back by a reverse-horizontal Delta Delta process expressed by $-_{su}\Delta D_r=_{su}D_1-_{su}D_r$ for each codeword index r=2, . . . R.

TABLE 4A

BEST-m CQI REPORTING ("REVERSE-HORIZONTAL Δ Δ")

|  | Unselected Sub-bands | Selected Sub-bands |
|---|---|---|
| CW1 | $-_{su}D_1$ | $_sF_1$ |
| CW2, etc. | $-_{su}\Delta D_r$ | $_sD_r$ |

In a fourth embodiment category related to FIG. 41A, any of the first three embodiments are subjected to joint quantization in step 4040. For instance, the CQI report vector has the form (SV, $_uF_1$, $_{su}D_1$, $J_u$, $J_{DD}$, R) or (SV, $_sF_1$, $-_{su}D_1$ $J_s$, $J_{DD}$, R) for horizontal reporting in TABLE 3A or 4A. $J_{DD}$ signifies a codebook index resulting from joint quantization of the horizontal Delta Delta vector $_{su}\Delta D_r$ or $-_{su}\Delta D_r$. (The codebook index is likely to be independent of the plus/minus sign while the codebook entry has the plus-minus sign.) For substantially correlated difference vectors of either the vertical or horizontal or other type, joint quantization can offer additional useful compression.

In FIG. 41A, base station eNB operations commence with eNB configuration BEGIN 4105 and configure subsets of subbands for each UEi in a step 4110. Operations continue via eNB Main BEGIN 4115 to a step 4120 that uses the feedback from each given UE to retrieve delta vectors from a delta codebook(s) using fed-back indices such as $J_{DD}$ and/or $J_u$ and $J_s$. In step 4120 applied to vertical reporting TABLE 2A, recovered Delta $_sD_r=_sD_2+_s\Delta D_r$ and recovered Delta is expressed by $_u\Delta_r=_u\Delta_2+_u\Delta\Delta_r$ for index r=3, . . . R. In corresponding step 4130, the vertically recovered mean CQI of selected subbands is $_sF_r=_sD_r+_sF_1$, and the recovered mean CQI of un-selected subbands is $_uF_r=_u\Delta_r+_uF_1$, applied for each codeword CW2, etc., i.e. for index r=2, . . . R. In step 4120 applied to horizontal reporting TABLE 3A, recovered Delta $_{su}D_r=_{su}D_1+_{su}\Delta D_r$ for index r=2, . . . R. The corresponding step 4130 horizontally recovered mean CQI of selected subbands is $_sF_r=_{su}D_r+_uF_r$, applied for each codeword CW2, etc., i.e. for index r=1, . . . R, and obtained after computing the recovered mean CQI of un-selected subbands $_uF_r=_u\Delta_r+_uF_1$. In step 4120 applied to horizontal zig-zag reporting, recovered Delta $_{su}D'_r=_{su}D'_1+_{su}\Delta D'_r$ for index r=2, . . . R. The corresponding step 4130 horizontal zig-zag recovered mean CQI of selected subbands is $_sF_{(r+1)modR}=_{su}D'_r+_uF_r$, applied for each codeword, r=1, 2, . . . R, and obtained after computing the recovered mean CQI of un-selected subbands $_uF_r=_u\Delta_r+_uF_1$. In step 4120 applied to reverse-horizontal reporting, recovered Delta $_{su}D_r=_{su}D_1+_{su}\Delta D_r$ for index r=2, . . . R. The corresponding step 4130 reverse-horizontal recovered mean CQI of selected subbands is $_sF_r=_sD_r+_sF_1$, and the recovered mean CQI of un-selected subbands is $_uF_r=_sF_r-_{su}D_r$, applied for each codeword CW2, etc., i.e. for index r=1, . . . R.

In FIG. 41A, a step 4135 applies the recovered CQI information together with the subband vector SV by a process such as in FIG. 43 so that the CQI information $S_{i,j,r}$ on all subbands for all code words r and UEs i, is ready for use by the eNB scheduler at step 4140. Operations proceed to the eNB scheduler to allocate subbands to UEs followed by a precoder that establishes precoding matrices for the UEs based on the subband allocations. In a step 4150, the base station eNB transmits over the downlink to the UEs using a composite precoding matrix PM based on the precoding matrices thus established whence eNB RETURN 4155 is reached.

In FIG. 42, a process flow for Best-m Individual Mean-Delta CQI reporting with joint quantization and TABLE 5 Best-m horizontal or (TABLE 6 Best-m vertical) forms of the CQI feedback can be compared with FIGS. 27A/B and FIG. 28A/B. In the UE, operations commence with UE configuration at a step 4405. The configuration type is found in a decision step and established by UE or eNB. The selected subbands are determined as in FIG. 7. Then a step 4410 configures the CQI reporting mode, e.g., Best-m Individual Mean-Delta CQI reporting mode, whereupon a Main Begin 4415 is reached. The process symbols are illustrated in TABLE 5. (Alternative process operations are described by sentences in parentheses ( ) and alternative process symbols are illustrated in TABLE 6.) Next a step 4420 generates the mean or median or wideband CQI $F_{0,r}$ for each codeword CW1, CW2, etc. Differential encoding at step 4420 generates wideband deltas $\Delta F_{0,r}=F_{0,r}-F_{0,1}$ for each codeword CW2, etc., i.e. for index r=2, . . . R. (Alternatively, selected-subband deltas only for CW1 are generated instead, as represented by $\Delta_{j,i}=S_{j,1}-F_{0,1}$.) Next, a step 4430 generates selected-subband deltas expressed by $\Delta_{j,r}=S_{j,r}-F_{0,r}$ for each codeword CW2, etc., i.e. for selected subbands j indicated by subband vector SV (FIG. 43) and for index r=2, . . . R. (Alternatively at step 4430, subband spatial deltas are generated instead, as represented by $D_{j,r}=S_{j,r}-S_{j,1}$, for selected subbands j and code words indexed r=2, . . . R.) Then a step 4440 joint quantizes the subband deltas $\Delta_{j,r}$ and repeatedly uses a subband delta vector codebook and outputs codebook index $J_r$ for each index r=1, 2, . . . R (or joint quantizes subband spatial deltas $D_{j,r}$ instead and repeatedly uses a subband spatial delta vector CQI codebook and outputs codebook index $J_j$ for each of the selected best-m subbands j). Various forms of the CQI feedback 4470 are depicted in FIG. 42. After step 4440 a UE RETURN 4455 is reached.

TABLE 5

BEST-m MEAN-DELTA CQI REPORTING ("HORIZONTAL")

|  | Mean/Median/Wideband | Sub-bands |
|---|---|---|
| CW1 | $F_{0,1}$ | $\Delta_{j,1}$ |
| CW2, etc. | $\Delta F_{0,r}$ | $\Delta_{j,r}$ |

TABLE 6

BEST-m MEAN-DELTA CQI REPORTING ("VERTICAL")

|  | Mean/Median/Wideband | Sub-bands |
|---|---|---|
| CW1 | $F_{0,1}$ | $\Delta_{j,1}$ |
| CW2, etc. | $\Delta F_{0,r}$ | $D_{j,r}$ |

In FIG. 42, base station eNB operations commence with eNB configuration BEGIN 4505 and configure subsets of subbands for each UEi in a step 4510. In cases where eNB configures Directed Mode and configures and sends subband vector SV of FIG. 43 to identify the selected subbands for UEi in accordance with the subsets, then UE has no need to feed back the SV that eNB already has established. Operations continue via eNB Main BEGIN 4515 to a step 4520 that uses the feedback 4470 from each given UE to retrieve delta vectors $\Delta_{i,j,r}$ from a delta codebook(s) using fed-back indices $J_r$. (Alternatively at step 4520, UE retrieves spatial delta vectors $D_{i,j,r}$ using fed-back indices $J_j$.) A step 4525 recovers the CQI (e.g., mean/median/wideband CQI) for each codeword using a process expressed by $F_{i,0,r}=\Delta F_{i,0,r}+F_{i,0,1}$, applied for each codeword CW2, etc., i.e. for index r=2, . . . R. (Alternatively in step 4525, the CQIs for the subbands j of CW1 are recovered using a process $S_{i,j,1}=\Delta_{i,j,1}+F_{i,0,1}$, applied for codeword CW1.) In a step 4530, the CQIs for the subbands j of the other codewords are recovered using a horizontal recovery process $S_{i,j,r}=\Delta_{i,j,r}+F_{i,0,r}$, applied for each codeword CW2, etc., i.e. for selected subbands j indicated by subband vector SV (FIG. 43) and for index r=2, . . . R. (Alternatively in step 4530, in a vertical recovery process use $S_{i,j,r}=D_{i,j,r}+S_{i,j,1}$, for the selected subbands j and for the code words indexed r=2, . . . R.) Alternatively, the position of the selection subbands, instead of being reported using the bitmap vector SV, is jointly quantized and reported using $\log_2(C_M^m)$ bits. In a process that uses CQI of a reference subband k(r) as a reference REF instead of mean/median/wideband CQI, a step 4534 recovers the position k(r) and a step 4538 establishes CQI at that position, i.e. $S_{i,j=k(r),r}=F_{i,0,r}$.

In FIG. 42, a step 2630 applies the recovered CQI information so that the CQI information $S_{i,j,r}$ on all subbands for all code words r and UEs i, for use by the eNB scheduler. Operations by eNB scheduler 2630 allocate subbands to UEs followed by a precoder that establishes precoding matrices for the UEs based on the subband allocations. In a step 2640, the base station eNB transmits over the downlink to the UEs using a composite precoding matrix PM based on the preceding matrices thus established. eNB RETURN is reached at step 4555.

Figure 42A:
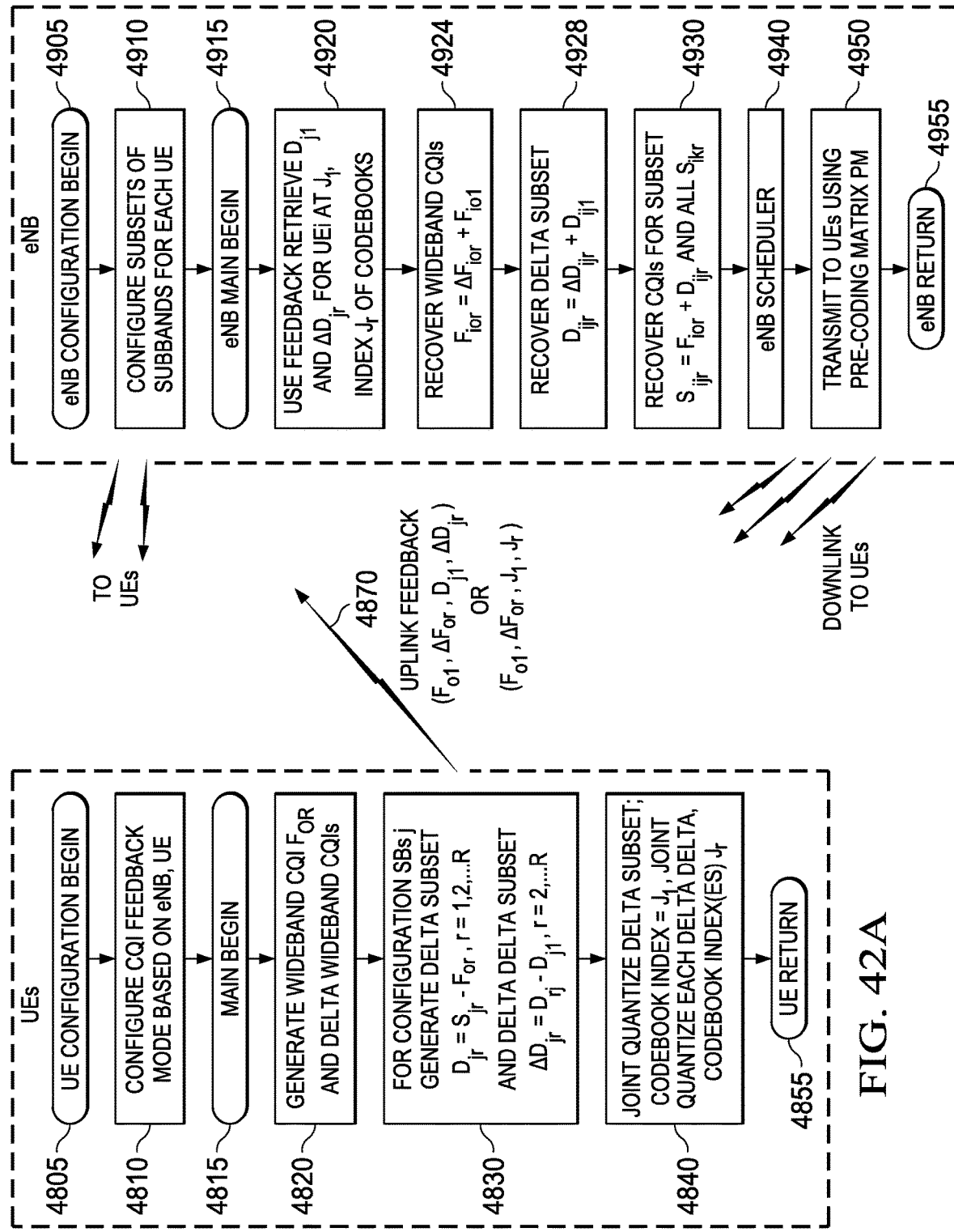

In FIG. 42A, a process flow for Best-m Individual Mean-Delta & Delta Delta CQI reporting, with joint quantization of the Delta Delta and wherein eNB counts the feedback, can be compared with FIG. 31A/B. In the UE, operations commence with UE configuration at a step 4805. The configuration type is found in a decision step and established by UE or eNB. The selected subbands are determined as in FIG. 7. Then a step 4810 configures the CQI reporting mode, e.g., Best-m Individual Mean-Delta & Delta Delta CQI reporting mode, whereupon a Main Begin 4815 is reached. The process symbols are illustrated in TABLE 6A. Next a step 4820 generates the mean or median or wideband CQI $F_{0,r}$ for each codeword CW1, CW2, etc. Differential encoding at step 4820 generates wideband deltas $\Delta F_{0,r}=F_{0,r}-F_{0,1}$ for each codeword CW2, etc., i.e. for index r=2, . . . R. Next, for the selected subbands j indicated by subband vector SV (FIG. 43), a step 4830 generates subband deltas $D_{j,r}=S_{j,r}-F_{0,r}$, for each codeword CW1, CW2, etc., i.e. for index r=1, 2, . . . R. Then step 4830 forms the Delta Deltas by a process represented by $\Delta D_{j,r}=D_{j,r}-D_{j,1}$ for the selected subbands j and the code words indexed r=2, . . . R. These can be fed back directly as shown in one form of the uplink feedback 4870 of FIG. 42A. Or further operation in a step 4840 joint quantizes the subband delta vector $D_{j,1}$ and/or also joint quantizes each Delta Delta vector $\Delta D_{j,r}$ using a Delta Delta vector codebook. Step 4840 outputs Delta Delta codebook index $J_r$ for r=2, . . . R for another form of the uplink feedback 4870. Step 4840 also outputs Delta codebook index $J_1$ for index r=1. Rank R to which the reporting pertains is implicit in the number of fed-back indices. After step 4840 a UE RETURN 4855 is reached.

For brevity of description, an alternative Delta Delta process has quantities in TABLE 5A Best-m Individual CQI reporting analogous to Best-m Average CQI reporting TABLE 2A already described.

TABLE 5A

BEST-m MEAN-DELTA CQI REPORTING ("VERTICAL Δ Δ")

| | Mean/Median/Wideband | Sub-bands |
|---|---|---|
| CW1 | $F_{0,1}$ | $\Delta_{j,1}$ |
| CW2, etc. | $\Delta F_{0,r}$ | $\Delta_{j,r}$ |
| CW3, etc. | $_u\Delta \Delta_r$ | $\Delta D_{j,r}$ |

TABLE 6A

BEST-m MEAN-DELTA CQI REPORTING ("HORIZONTAL Δ Δ")

| | Mean/Median/Wideband | Sub-bands |
|---|---|---|
| CW1 | $F_{0,1}$ | $D_{j,1}$ |
| CW2, etc. | $\Delta F_{0,r}$ | $\Delta D_{j,r}$ |

In FIG. 42A, base station eNB operations commence with eNB configuration BEGIN 4905 and configures subsets specifying selected subbands for each UEi in a step 4910. In cases where eNB configures Directed Mode and configures and sends subband vector SV of FIG. 43 to identify the selected subbands for UEi in accordance with the subsets, then UE has no need to feed back the SV that eNB already has established. eNB determines rank R either from its own configuration of UEi or by counting the number of the CQI report indices sent over the uplink from UEi. Operations continue via eNB Main BEGIN 4915 to a step 4920 that uses the report from each given UEi to retrieve the delta vector $D_{i,j,1}$, from a delta codebook(s) using fed-back index $J_1$. eNB also uses fed-back indices $J_r$ to access a Delta Delta codebook and thereby recover $\Delta D_{i,j,r}$ for UEi. In step 4924 applied to Best-m Delta Delta reporting of TABLE 6A, the recovered wideband CQI is $F_{i,0,r} = \Delta F_{i,0,r} + _{i,0,1}$, applied for each codeword CW2, etc., i.e. for index $r=2, \ldots R$. In a step 4928, the Delta subset is recovered by a process expressed by $D_{i,j,r} = \Delta D_{i,j,r} + D_{i,j,1}$. In step 4930, the recovered CQI of subbands are obtained by a process $S_{i,j,r} = F_{i,0,r} + D_{i,j,r}$ for each selected-subband index j and for each codeword CW2, etc., i.e. for index $r=1, \ldots R$, for each UEi. For unselected subbands k, the process establishes $S_{i,k,r} = F_{i,0,r}$ using wideband CQIs $F_{i,0,r}$. In FIG. 42A, a step 4940 applies the recovered CQI information so that the CQI information $S_{i,j,r}$ on all subbands for all code words r and UEs i, is ready for use by the eNB scheduler. The eNB scheduler 2630 allocates subbands to UEs. In a step 4950, a precoder establishes precoding matrices for the UEs based on the subband allocations. Base station eNB transmits over the downlink to the UEs using a composite precoding matrix PM based on the precoding matrices thus established, whence eNB RETURN 4955 is reached.

Description turns to various matrix-based processes for CQI reporting. A matrix-based process embodiment for Mean-Delta & ΔΔCQI Reporting resembles the process of FIG. 38 or FIG. 42A and TABLE 6A. In the UE, a process for generating a CQI reporting matrix Φ (dimensions R×(M+1)) includes a rank-related differencing matrix Δ (e.g., TABLE 7) matrix-premultiplied times a matrix S of subband CQIs that is in turn matrix post-multiplied by a weight matrix W, as expressed by the following process embodiment equation Φ=ΔSW. (Dimensionally, R×(M+1)=product of R×R, R×M, M×(M+1) in one example.) Subband CQI matrix S has rows of subband CQIs for each spatial codeword, as in FIG. 31A/B. Weight matrix W in one example is shown in Mean-Delta TABLE 8. In general, however, weight matrix W represents any compression process expressible by matrix multiplication and applicable to rank as low as one (R=1), except that it is applied here also for MIMO rank of two or more (R>=2). The product SW compactly expresses the mean CQIs for the codewords respectively, as well as subband CQI differences (Deltas) relative to the mean for their codeword. The pre-multiplying by matrix Δ both delivers differentially encoded means relative to the mean CQI for a first codeword and also delivers the Delta Deltas of TABLE 6A. The differencing matrix Δ is selected as in TABLE 7 or otherwise, and a suitable differencing matrix Δ is represented by a square matrix R×R having dimensions each equal to the rank R and composed of blocks as follows: 1) upper left hand one element (1, unity), 2) zeroes in rest of first row, 3) minus-ones (−1's) in rest of first column, 4) identity matrix block filling the rest of the matrix, e.g., see TABLE 7.

TABLE 7

DIFFERENCING MATRIX Δ (R × R)

| 1 | 0 | 0 | 0 | ... | 0 |
|---|---|---|---|---|---|
| −1 | 1 | 0 | 0 | | 0 |
| −1 | 0 | 1 | 0 | | 0 |
| −1 | 0 | 0 | 1 | | 0 |
| ... | | | | | ... |
| −1 | 0 | 0 | 0 | ... | 1 |

TABLE 8

MEAN-DELTA WEIGHT MATRIX (M × (M + 1), one example of W)

| 1/M | 1 − 1/M | −1/M | ... | −1/M |
|---|---|---|---|---|
| 1/M | −1/M | 1 − 1/M | | −1/M |
| ... | | | | ... |
| 1/M | −1/M | −1/M | ... | 1 − 1/M |

CQI reporting matrix Φ is scanned out and fed back to eNB in any desired order, applying the CQI feedback scanning embodiments of FIGS. 32-37 to the CQI reporting matrix Φ itself. Alternatively, one or more parts or all of the CQI reporting matrix Φ is/are vector joint quantized and the results of joint quantization scanned out and fed back to eNB in any appropriate manner, applying the embodiments of FIGS. 32-37 to the CQI reporting matrix Φ in parts and joint-quantized vectors thereof. Some of these alternatives are also depicted in the uplink feedback from the UE side in FIGS. 38-42A.

Base station eNB includes a complementary process embodiment, as in FIGS. 38-42A on the eNB side, that recovers Subband CQI matrix S from CQI reporting matrix Φ. The recovery process uses the matrix inverse of differencing matrix Δ matrix-premultiplied times the matrix of CQI feedback Φ that is in turn matrix post-multiplied by the matrix right-inverse (symbolized $-1'$) of generally non-square weight matrix W, as expressed by the process embodiment equation $S = \Delta^{-1} \Phi W^{-1'}$. (Dimensionally, R×M=product of R×R, R×(M+1), (M+1)×M correspondingly.) The above matrix formulation is believed to be relatively robust in that it can be applied to systems with a variety of numbers M of subbands, and a variety of rank numbers R. The weight matrix W is customized somewhat in entries and dimensions for any selected compression approach, such as Mean-Delta, or Reference-Delta, or Pairwise Delta for adjacent subbands, or Transform using orthogonal or nonorthogonal basis vectors, etc.

For an example of FIG. 41A Best-m Average CQI reporting, the matrix process is slightly augmented (or, to put it another way, the weight matrix W is specified in more detail and replaced by a product of matrices, Wσ) because the reporting on subbands is grouped together for selected subbands and unselected subbands. In the UE, a process for Best-m (Horizontal ΔΔ) CQI reporting Φ of TABLE 3A includes a rank-related R×R differencing matrix Δ (TABLE 7) matrix-premultiplied times a matrix S of subband CQIs that is in turn matrix post-multiplied by a weight matrix W (TABLE 8) and further augmented by post-multiplication by a 2×2 matrix σ, as expressed by the process embodiment equation Φ=ΔS Wσ. (Dimensionally, R×2=product of R×R, R×M, M×2, 2×2. The 2×2 matrix σ has first row [1 −1], second row [0 1].)

Not only does CQI Reporting matrix Φ have dimensions R×2 for FIG. 41A and therefore is considerably compressed compared to R×M CQI matrix S, but also the differencing process further compresses the dynamic range to confer highly efficient CQI feedback. For this form of Best-m Average CQI reporting, the M×2 weight matrix W is a transpose of the matrix having first row (1/(M−m)) [[1]−[SV]] and second row (1/m)[SV], where [SV] is the FIG. 43 subband vector SV of positions of m selected subbands, M is the total number of subbands, (M−m) is the number of unselected subbands, and [1] is a row of all ones. (Matrix σ column $[1\ 0]^T$ represents the operation that focuses on TABLE 3A reporting column $[_uF_1,\ _u\Delta_r]^T$, and second column $[-1\ 1]^T$ represents a differencing operation to get intermediate $_{su}D_r$. Pre-multiplication by matrix Δ then delivers CQI reporting matrix Φ of TABLE 3A.)

In base station eNB, a complementary Best-m Horizontal recovery process embodiment to recover Best-m Subband CQI matrix product SW from CQI reporting matrix Φ again uses the matrix inverse $\Delta^{-1}$ of differencing matrix matrix-premultiplied times the matrix of CQI reporting matrix Φ. Now the process is augmented by matrix post-multiplying the inverse $\sigma^{-1}$ of matrix sigma, and recovers Best-m subband CQI matrix product SW as expressed by process embodiment equation $SW=\Delta^{-1}\ \Phi\sigma^{-1}$. (Dimensionally, R×2=product of R×R, R×2, 2×2. 2×2 matrix $\sigma^{-1}$ has first row [1 1], second row [0 1]. First column $[1\ 0]^T$ focuses on recovery of mean CQIs for each rank or other references REF for each rank. Second column $[1\ 1]^T$ enables addition to recover from some differencing.)

Computational optimizations such as pre-computing some of the inverses and products are readily provided. Note also that where ordinary subtractions inside the matrix operations can be replaced in general by specified functions $f_{diff}(\ ,\ )$ and ordinary additions can be replaced in general by specified functions $f_{add}(\ ,\ )$ such as by reversing a sign of an argument value inside $f_{diff}(\ ,\ )$ or otherwise as desired. Some embodiments use matrix operations to accomplish differential compression in UE and reconstruction in eNB along the lines shown or indicated in FIGS. 10-42A. Notice in the matrix operations that post-multiplication of CQI matrix S by weight matrix W provides codeword specific compression. Pre-multiplication by matrix Δ times SW provides differencing across spatial codewords. Some matrix embodiments herein operate on the original CQIs $S_{jr}$ as a CQI image array and compress that CQI image array $S_{jr}$ by using any suitable image transform (2-D).

Various forms of parameterization of vectors are suitably employed for CQI reporting. Embodiments for parameterization of vectors include structures and processes for parameterization of CQI vectors across subbands in a given codeword or across codewords in a given subband, parameterization of CQI difference vectors across subbands in a given codeword or across codewords in a given subband, and/or parameterization of delta delta CQI vectors across subbands in a given codeword or across codewords in a given subband. Positions of zero crossings, widths of positive runs, widths of negative runs, and other parameters of such vectors are suitably encoded for parameterized CQI reporting across codewords, across subbands, and across scanning patterns (e.g. in FIGS. 32-37).

Note that all the above figures/numerical values are exemplary and for illustrative purposes. Various generalizations of the above approaches are specified for any size of sub-band, different number of sub-bands within the system bandwidth, different sub-band sizes, etc. Several CQI reporting embodiments accommodate MIMO-OFDMA systems with multiple codewords (layers) transmitted in the spatial domain simultaneously. Specifically, the following CQI reporting processes and structures apply for Wideband CQI reporting, eNB configured CQI feedback, UE-selected subband CQI feedback, Scanning-based CQI feedback, and other forms of CQI feedback. Any combination, variation, or generalization of the above embodiments can be applied in CQI feedback for MIMO OFDMA.

While the above embodiments are given in the context of an OFDM/OFDMA system, it is also contemplated to apply the techniques taught in this invention to some other data modulation or multiple access schemes that utilize some type of frequency-domain multiplexing. Some examples include but are not limited to the classical frequency-domain multiple access (FDMA), single-carrier FDMA (SC-FDMA), and multi-carrier code division multiple access (MC-CDMA).

FIG. 43 is a flow diagram for depicting a process embodiments for eNB reconstructing original CQIs $S_{jr}$, or intermediately reconstructing CQI differences $D_{jr}$, from the subband vector SV generated in Best-m CQI reporting. FIG. 43 provides substeps for use in FIG. 41 step 3735 or FIG. 41A step 4135, or FIG. 42 steps 4530-4538 or FIG. 42A step 4930. Operations in FIG. 43 commence with a BEGIN 5105 that sets codeword index r=1, and operations proceed to a step 5110 that initializes indices j=1 and L=1. A decision step 5120 is part of a process of scanning subband vector SV. For the A-suffixed FIGS. 25A-31A, SV(j) is independent of codeword index r. For the B-suffixed FIGS. 25B-31B, SV (j,r) is fed back for each spatial codeword r and used in FIG. 43. (The dependence on codeword index r is shown in FIG. 43 and may be omitted for embodiments where it is not applicable.) A particular example of a 10-element subband vector SV is shown below the flow. Decision step 5120 determines whether a given subband vector element SV(j,r) is one (1) or not. If not, the full-length (M) CQI, or differential CQI, vector D of FIG. 43 is set equal to zero (0) at element j so that D(j,r)=0 at step 5125. (In some Best-m Average embodiments, e.g. FIG. 41, instead set D(j,r) equal to the differential encoding $_u\Delta_r$ or CQI $_uF_r$ at step 5125 for the unselected subbands.) Then a step 5130 increments index j. Then a decision step 5140 determines by the criterion j>jmax whether the entire subband vector SV has been scanned in a configured scanning pattern such as in any one of FIGS. 32-37. If not, operations loop back to decision step 5120. At decision step 5120, if the given subband vector element SV(j,r) is one, then operations proceed to a step 5160 to access short differential CQI vector DV(L,r) element L and multiply to generate a full-length differential CQI vector element D(j,r)=SV(j,r)×DV(L,r). Some embodiments simply use the logic IF SV(j,r)=1, THEN D(j,r)=DV(L,r) at this point. (Note: D(j,r) and DV(L,r) correspond to and are suitably made to take the position of various CQI $S_{ijr}$ or $S_{ikr}$ designations or differential D or A designations used in FIG. 41 step 3735, FIG. 41A step 4135, FIG. 42 steps 4530-4538 and FIG. 42A step 4930.) If the scan across the short CQI, or differential CQI, vector DV is completed, L=Lmax at a decision step 5170 and operations reach decision step 5185. (Lmax=m, the number of Best-m selected subbands, and is a constant in some embodiments or is a function Lmax(r) of codeword r in some other embodiments.) Otherwise, operations proceed from decision step 5170 to a step 5180 that increments the index L that scans the short differential CQI vector DV. (Both steps 5170 and 5180 are omitted for Best-m Average CQI reporting of FIGS. 24A/B, 25A/B, 41/41A.) Operations go from step 5180 to step 5130 and the process goes on as already described. If Yes at step 5140 or Yes at step 5170, then step 5185 determines whether codeword index r=Rmax, i.e. equals rank R. In Joint Sub-band Selection in FIG. 25A, Rmax=1 and operations at step 5185 immediately determine that r=Rmax and pass directly to a RETURN 5195. In Independent Sub-band Selection FIG. 25B, operations go from step 5185 to a step 5190 to increment codeword index r=r+1 and loop back to step 5110. In due course, all the codewords r are handled in FIG. 43, and step 5185 determines that codeword index now has r=Rmax, and operations reach the RETURN 5195.

Note that some other embodiments statically or dynamically control the order of looping through the indices according to a configured scanning pattern as identified by a scanning code and discussed and connection with FIGS. 32-37 among other Figures. In some embodiments or variants of FIG. 43, the scanning process includes a scanning loop over a one-dimensional scanning pattern index (e.g., s=1, 2, 3, . . . N, where N=RM) in the loop kernel has a mapping function F(s)==(j, r) from the one-dimensional scanning pattern index to generate indices r, j in a two-dimensional discrete index value space (r, j) for the subbands j of each codeword r, where $1 \leq r \leq R$ and $0 \leq j \leq M$. The loop kernel further includes a computation and/or read or write to storage that involves variables as a function of the indices in two-dimensional discrete index value space (j, r). In terms of FIG. 43, an example of the scanning process of FIGS. 32-37 provides the mapping function F(s)==(j, r) ahead the loop kernel 5120, 5125, 5160 that is written in terms of indices (j, r). The mapping function F(s) instantiates the scanning pattern and is retrieved from a stored codebook in memory indexed by the scanning code. The mapping function and the loop kernel are embedded together in a one-index loop on index s. When the loop executes, its operations are performed according to the scanning pattern. This type of scanning pattern process, such as by FIGS. 32-37, in some embodiments is similarly applied to any the processes of FIGS. 38-42A wherever they loop on indices (r,j) to instantiate a configured scanning pattern therein.

U.S. patent application "Precoding Matrix Feedback Processes, Circuits and Systems," Ser. No. 12/188,767 (TI-65218), incorporated herein by reference, shows an improved communications system 1000 with system blocks and one or more integrated circuits for system on chip as described therein and improved with any one, some or all of the circuits and subsystems shown in various Figures of the drawing herein. Any or all of the system blocks, such as cellular mobile telephone and data handsets 1010 and 1010', a cellular (telephony and data) base station 1050, a WLAN AP (wireless local area network access point, IEEE 802.11 or otherwise) 1060, a Voice over WLAN Gateway 1080 with user voice over packet telephone 1085 (not shown), and a voice enabled personal computer (PC) 1070 with another user voice over packet telephone (not shown), communicate with each other in communications system 1000. Instructions for various processes disclosed herein are suitably stored in whole or in part in flash memory, or volatile or nonvolatile memory on or off chip relative to microprocessor core(s) or other processor block(s). Instructions are suitably conveyed to the device or system in manufacture or in use, by some tangible medium of storage such as optical disc, magnetic disk, flash drive, etc., or by download from another system such as a server and/or website.

Aspects (See Notes Paragraph at End of this Aspects Section.)

1A4A. The electronic device claimed in claim 4 wherein said first circuit is also operable to form a reporting representation identifying which subbands are selected. 1B. The electronic device claimed in claim 1 wherein the first reference CQI includes a mean, median, or wideband CQI for the first spatial codeword and the second reference CQI includes a mean, median, or a wideband CQI for the second spatial codeword. 1C. The electronic device claimed in claim 1 further comprising plural antennas, and a transmitter to transmit a signal from at least one of said plural antennas communicating the CQI report in response to the second circuit, and a user interface coupled to said first circuit, wherein said first circuit is coupled to process received signals from said plural antennas, whereby to form a communication device.

1P. A process of operating an electronic device, the process comprising generating at least a first and a second channel quality indicator (CQI) vector associated with a plurality of subbands for each of at least first and second spatial codewords respectively; generating a first and a second reference CQI for the first and second spatial codewords, and a first and a second differential subbands CQI vector for each spatial codeword, and a differential between the second reference CQI and the first reference CQI; and forming a CQI report derived from the first and the second differential subbands CQI vector for each spatial codeword as well as the differential between the second reference CQI and the first reference CQI. 1PA. The process claimed in claim 1P wherein the first differential subbands CQI vector includes at least one difference of a subband CQI in the first CQI vector relative to the first reference CQI, and the second differential subbands CQI vector includes at least one difference of a subband CQI in the second CQI vector relative to the second reference CQI. 1PB. The process claimed in claim 1P wherein the first differential subbands CQI vector includes at least one difference of at least one subband CQI in the second CQI vector pairwise relative to at least one subband CQI in the first CQI vector. 1PC. The process claimed in claim 1P wherein the first differential subbands CQI vector includes a difference of at least one CQI for selected subbands relative to the first reference CQI, and the second differential subbands CQI vector includes a difference of at least one CQI for selected subbands relative to the second reference CQI.

6A8A. The CQI report scanning circuit claimed in claim 8 wherein wherein said first circuit is operable to determine at least one selected subband for each spatial codeword and the first reference CQI includes a CQI for unselected subbands for the first spatial codeword and the second reference CQI includes a CQI for unselected subbands for the second spatial codeword.

6P. A process of operating a CQI report scanning circuit, the process comprising generating a CQI report derived from at least a first and a second channel quality indicator (CQI) vector associated with a plurality of subbands for each of at least first and second spatial codewords respectively, configurably establishing a scanning pattern for the CQI report across the spatial codewords and subbands, and initiating transmission of a signal communicating the CQI report according to the configurably established scanning pattern. 6PA. The process claimed in claim 17 wherein the generating includes determining at least one selected subband for each spatial codeword, and said initiating transmission includes executing the configurably established scanning pattern for CQI reporting for each selected subband prior to CQI reporting for unselected subbands.

9A. The CQI reporting circuit claimed in claim 9 wherein the CQI report is derived using at least one of: 1) an entry index of a vector codebook, 2) a transform, 3) a parameterization. 9B. The CQI reporting circuit claimed in claim 9 wherein the first circuit is further operable to determine at least one selected subband for each spatial codeword and said signal generated by the second circuit includes information identifying the at least one selected subband. 9C. The CQI reporting circuit claimed in claim 9 further comprising plural antennas, and a transmitter to transmit a signal from at least one of said plural antennas communicating the CQI report in response to the second circuit, and a user interface coupled to said first circuit, wherein said first circuit is coupled to process received signals from said plural antennas, whereby to form a communication device.

9P. A process of operating a CQI reporting circuit, the process comprising generating at least a first and a second channel quality indicator (CQI) vector associated with a plurality of subbands for each of at least first and second spatial codewords respectively and a first and a second differential subbands CQI vector for each of the first and second spatial codewords respectively, and generating a CQI report based on a vector differential between the second differential subbands CQI vector and the first differential subbands CQI vector. 9PA. The process claimed in claim 9P wherein the CQI report also includes information based on at least one of the first or second differential subbands CQI vector. 9PB. The process claimed in claim 9P wherein the first circuit is operable to generate a first and a second reference CQI for the first and second spatial codewords respectively, and the CQI report includes information based on a said reference CQI for at least one of the spatial codewords and on a difference between the first and second reference CQI. 9PC. The process claimed in claim 9P wherein the CQI report is derived using at least one of: 1) an entry index of a vector codebook, 2) a transform, 3) a parameterization.

14A. The MIMO wireless node claimed in claim 14 wherein the first differential subbands CQI vector includes at least one difference of at least one subband CQI in the second CQI vector pairwise relative to at least one subband CQI in the first CQI vector. 14B. The MIMO wireless node claimed in claim 14 wherein the first differential subbands CQI vector includes a difference of at least one CQI for selected subbands relative to the first reference CQI, and the second differential subbands CQI vector includes a difference of at least one CQI for selected subbands relative to the second reference CQI.

14P. A process for operating a MIMO wireless node for multiple-input, multiple-output (MIMO), the process comprising receiving a signal communicating a channel quality indicator (CQI) report for first and second spatial codewords associated with a user equipment wherein the CQI report is derived from a first reference CQI and a first and a second differential subbands CQI vector for each spatial codeword as well as a differential between a second reference CQI and the first reference CQI; and reconstructing a first and second subbands CQI vector from said at least one signal associated with said CQI report. 14PA. The process claimed in claim 14P wherein said reconstructing includes reconstructing the second reference CQI from both the first reference CQI and the differential between the second reference CQI and the first reference CQI. 14PB. The process claimed in claim 14PA wherein said reconstructing further includes reconstructing the first subbands CQI vector for the first spatial codeword from the first differential subbands CQI vector and the first reference CQI, and reconstructing the second subbands CQI vector from the second differential subbands CQI vector and the reconstructed second reference CQI. 14PC. The process claimed in claim 14P further comprising scheduling at least one user equipment based on said at least first and second reconstructed subbands CQI vectors. 14PD. The process claimed in claim 14P further comprising sending data streams to at least one scheduled user equipment. 14PE. The process claimed in claim 14P wherein the first differential subbands CQI vector includes a difference of at least one CQI for selected subbands relative to the first reference CQI, and the second differential subbands CQI vector includes a difference of at least one CQI for selected subbands relative to the second reference CQI.

16A. The MIMO wireless node claimed in claim 16 wherein the CQI report includes information based on a first reference CQI for unselected subbands for a first spatial codeword and a second reference CQI for unselected subbands for a second spatial codeword, and said processing circuitry is operable to determine at least one selected subband for each spatial codeword and use the configurably established scanning pattern for processing the CQI report across the spatial codewords and each selected subband.

16P. A process for operating a wireless node for multiple-input, multiple-output (MIMO), the process comprising receiving at least one signal, each communicating a compressed channel quality indicator (CQI) report associated with a user equipment for spatial codewords and subbands; and reconstructing at least a first and a second CQI vector from said at least one signal according to a configurably established scanning pattern for processing the CQI report across the spatial codewords and subbands wherein each reconstructed CQI vector is associated with a plurality of subbands for each of at least first and second spatial codewords respectively. 16PA. The process claimed in claim 16P further comprising scheduling at least one user equipment based on said at least first and second reconstructed CQI vector. 16PB. The process claimed in claim 16PA further comprising sending data streams to at least one scheduled user equipment.

18A. The MIMO wireless node claimed in claim 18 wherein the reconstruction includes reconstruction from at least one of: 1) an entry index of a vector codebook, 2) a transform, 3) a parameterization.

18P. A process for operating a wireless node for multiple-input, multiple-output (MIMO), the process comprising receiving at least one signal, each communicating a channel quality indicator (CQI) report associated with a user equipment for at least first and second spatial codewords and subbands, and reconstructing at least a first and a second CQI vector, associated with subbands for each of the at least first and second spatial codewords respectively, from the CQI report including information based on a vector differential between a second differential subbands CQI vector and a first differential subbands CQI vector for the spatial codewords respectively. 18PA. The process claimed in claim 18 further comprising scheduling at least one user equipment based on said at least first and second reconstructed CQI vector. 18PB. The process claimed in claim 18PA further comprising sending data streams to at least one scheduled user equipment. 18PC. The process claimed in claim 18 wherein the reconstructing includes reconstructing from the CQI report including information based on a said differential subbands CQI vector itself.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Those skilled in the art to which the invention relates will appreciate that other and further additions, deletions, substitutions and modifications may be made to the described embodiments without departing from the scope of the invention. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Block diagrams herein are also representative of flow diagrams for operations of any embodiments whether of hardware, software, or firmware, and processes of manufacture thereof, and vice-versa. While the methods disclosed herein have been described and shown with reference to particular steps performed in a particular order, it will be understood that these steps may be combined, omitted, subdivided, or reordered to form an equivalent method without departing from the teachings of the present disclosure. Accordingly, unless specifically indicated herein, the order or the grouping of the steps is not a limitation of the present invention. Illustrative embodiments are not to be construed in a limiting sense. It is therefore contemplated that the appended claims and their equivalents cover any such embodiments, modifications, and embodiments as fall within the true scope of the invention.

What is claimed is:

1. A method of operating a user equipment comprising:
   generating a first wideband channel quality indicator (CQI) for a first codeword, the first CQI being a CQI for all subbands of a system bandwidth;
   generating a second wideband CQI for a second codeword, the second CQI being a CQI for all the subbands of the system bandwidth;
   generating a first differential CQI as a function of the first wideband CQI and the second wideband CQI;
   generating a first subband CQI for the first codeword, the first subband CQI corresponding to a subband of the system bandwidth;
   generating a second differential CQI as a function of the first wideband CQI and the first subband CQI;
   generating a second subband CQI for the second codeword, the second subband CQI corresponding to the subband of the system bandwidth;
   generating a third differential CQI as a function of the second wideband CQI and the second subband CQI; and
   transmitting the first wideband CQI and the first, second, and third differential CQIs.

2. The method of claim 1 wherein the spatial differential CQI is formed by computing an offset level equal to the difference between the wideband CQI of the first codeword and the wideband CQI of the second codebook and quantizing the offset level.

3. The method of claim 1 wherein the CQIs are transmitted using a physical uplink control channel (PUCCH).

4. A user equipment, comprising:
   circuitry configured to:
   generate a first wideband channel quality indicator (CQI) for a first codeword, the first CQI being a CQI for all subbands of a system bandwidth;
   generate a second wideband CQI for a second codeword, the second CQI being a CQI for all the subbands of the system bandwidth;
   generate a first differential CQI as a function of the first wideband CQI and the second wideband CQI;
   generate a first subband CQI for the first codeword, the first subband CQI corresponding to a subband of the system bandwidth;
   generate a second differential CQI as a function of the first wideband CQI and the first subband CQI;
   generate a second subband CQI for the second codeword, the second subband CQI corresponding to the subband of the system bandwidth; and
   generate a third differential CQI as a function of the second wideband CQI and the second subband CQI, the user equipment further comprising a transmitter configured to transmit the first wideband CQI and the first, second, and third differential CQIs.

5. The user equipment of claim 4 wherein the spatial differential CQI is formed by computing an offset level equal to the difference between the wideband CQI of the first codeword and the wideband CQI of the second codebook and quantizing the offset level.

6. The user equipment of claim 4 wherein the CQIs are transmitted using a physical uplink control channel (PUCCH).

* * * * *